(12) United States Patent
Baghdadi et al.

(10) Patent No.: US 11,859,067 B2
(45) Date of Patent: Jan. 2, 2024

(54) FOOTWEAR MOLD ASSEMBLY FOR INJECTION-MOLDING

(71) Applicant: NIKE, Inc., Beaverton, OR (US)

(72) Inventors: Hossein Allen Baghdadi, Portland, OR (US); Sami Mohamad Fakhouri, Portland, OR (US); Floyd Whitney Miles, Beaverton, OR (US); Joseph Thomas Muth, North Plains, OR (US); Bradley C. Tutmark, Aloha, OR (US)

(73) Assignee: NIKE, Inc., Beaverton, OR (US)

(*) Notice: Subject to any disclaimer, the term of this patent is extended or adjusted under 35 U.S.C. 154(b) by 206 days.

(21) Appl. No.: 17/194,815

(22) Filed: Mar. 8, 2021

(65) Prior Publication Data

US 2021/0276293 A1 Sep. 9, 2021

Related U.S. Application Data

(60) Provisional application No. 63/137,872, filed on Jan. 15, 2021, provisional application No. 63/071,393, (Continued)

(51) Int. Cl.
  *C08J 9/12* (2006.01)
  *B29D 35/00* (2010.01)
  (Continued)

(52) U.S. Cl.
  CPC ............. *C08J 9/12* (2013.01); *A43B 1/14* (2013.01); *A43D 119/00* (2013.01);
  (Continued)

(58) Field of Classification Search
  CPC .. C08J 9/12; A43B 1/14; A43D 119/00; B25J 15/0019; B29C 44/105; B29C 44/58;
  (Continued)

(56) References Cited

U.S. PATENT DOCUMENTS 3,447,251 A 6/1969 Drexler
3,682,579 A 8/1972 Hujik
(Continued)

FOREIGN PATENT DOCUMENTS

CA 2462150 A1 4/1999
CN 102167840 A 8/2011
(Continued)

OTHER PUBLICATIONS

International Search Report and Written Opinion received for PCT Patent Application No. PCT/US2021/021451, dated Jun. 9, 2021, 14 pages.
(Continued)

*Primary Examiner* — Francisco W Tschen
*Assistant Examiner* — Elisa H Vera
(74) *Attorney, Agent, or Firm* — SHOOK, HARDY & BACON L.L.P.

(57) ABSTRACT

Tooling and components of an injection-molding system may be used to mold a foam article. The tooling and components may include features that control parameters of the injection-molding and foaming process, such as temperature, pressure, shot size, shot placement, and the like.

20 Claims, 39 Drawing Sheets

Related U.S. Application Data filed on Aug. 28, 2020, provisional application No. 63/042,324, filed on Jun. 22, 2020, provisional application No. 62/987,648, filed on Mar. 10, 2020, provisional application No. 62/987,329, filed on Mar. 9, 2020, provisional application No. 62/987,224, filed on Mar. 9, 2020, provisional application No. 62/987,227, filed on Mar. 9, 2020.

(51) Int. Cl.

| | | |
|---|---|---|
| *B29D 35/12* | (2010.01) | |
| *A43B 1/14* | (2006.01) | |
| *B29D 35/08* | (2010.01) | |
| *B29D 35/14* | (2010.01) | |
| *B25J 15/00* | (2006.01) | |
| *B29C 44/10* | (2006.01) | |
| *B29C 45/00* | (2006.01) | |
| *G06K 19/04* | (2006.01) | |
| *A43D 119/00* | (2006.01) | |
| *B29C 44/58* | (2006.01) | |
| *B29C 44/60* | (2006.01) | |
| *B29C 45/04* | (2006.01) | |
| *B29C 45/78* | (2006.01) | |
| *B29K 67/00* | (2006.01) | |
| *B29L 31/50* | (2006.01) | |
| *B29K 21/00* | (2006.01) | |
| *B29K 105/04* | (2006.01) | |

(52) U.S. Cl.
CPC ......... *B25J 15/0019* (2013.01); *B29C 44/105* (2013.01); *B29C 44/58* (2013.01); *B29C 44/60* (2013.01); *B29C 45/0001* (2013.01); *B29C 45/04* (2013.01); *B29C 45/78* (2013.01); *B29D 35/0036* (2013.01); *B29D 35/0045* (2013.01); *B29D 35/081* (2013.01); *B29D 35/122* (2013.01); *B29D 35/128* (2013.01); *B29D 35/148* (2013.01); *G06K 19/045* (2013.01); *B29C 2945/76531* (2013.01); *B29C 2945/76752* (2013.01); *B29K 2021/003* (2013.01); *B29K 2067/00* (2013.01); *B29K 2105/04* (2013.01); *B29L 2031/50* (2013.01); *B29L 2031/504* (2013.01); *C08J 2367/00* (2013.01); *C08J 2467/00* (2013.01)

(58) Field of Classification Search
CPC ..... B29C 44/60; B29C 45/0001; B29C 45/04; B29C 45/78; B29C 2945/76531; B29C 2945/76752; B29C 44/424; B29C 44/427; B29D 35/0036; B29D 35/0045; B29D 35/081; B29D 35/122; B29D 35/128; B29D 35/148; B29D 35/061; B29K 2021/003; B29K 2105/04; B29L 2031/50; B29L 2031/504

See application file for complete search history.

(56) References Cited

U.S. PATENT DOCUMENTS

| | | | |
|---|---|---|---|
| 3,871,806 A | 3/1975 | Leunig | |
| 3,891,362 A | 6/1975 | Devita | |
| 4,372,525 A | 2/1983 | Uhlig | |
| 5,288,451 A * | 2/1994 | Schad | B29C 45/36 264/328.8 |
| 6,007,748 A | 12/1999 | Krajcir | |
| 6,146,423 A | 11/2000 | Cohen et al. | |
| 6,266,897 B1 | 7/2001 | Seydel et al. | |
| 6,599,597 B1 | 7/2003 | Bonk et al. | |
| 6,688,956 B1 | 2/2004 | Yokley et al. | |
| 8,869,430 B2 | 10/2014 | Chao et al. | |
| 9,021,720 B2 | 5/2015 | Hazenberg et al. | |
| 9,956,732 B2 | 5/2018 | Murphy et al. | |
| 10,448,704 B2 | 10/2019 | Dupre et al. | |
| 2001/0023510 A1* | 9/2001 | Masubuchi | B29C 44/427 5/636 |
| 2003/0071386 A1 | 4/2003 | Lilienthal et al. | |
| 2005/0037104 A1* | 2/2005 | Kao | B29C 45/0025 264/272.17 |
| 2006/0046004 A1 | 3/2006 | Ekart et al. | |
| 2006/0082009 A1 | 4/2006 | Quail et al. | |
| 2006/0082010 A1 | 4/2006 | Quail | |
| 2008/0175942 A1 | 7/2008 | Chi-jin | |
| 2008/0193585 A1 | 8/2008 | Glaesener et al. | |
| 2010/0242312 A1 | 9/2010 | Lim et al. | |
| 2012/0052143 A1 | 3/2012 | Chen et al. | |
| 2012/0137449 A1 | 6/2012 | Ransom et al. | |
| 2012/0196115 A1 | 8/2012 | Choe et al. | |
| 2014/0179818 A1 | 6/2014 | Takashima et al. | |
| 2014/0259801 A1 | 9/2014 | Grondin | |
| 2014/0265016 A1 | 9/2014 | Nguyen et al. | |
| 2015/0047775 A1 | 2/2015 | Ginns et al. | |
| 2015/0174803 A1 | 6/2015 | Newman et al. | |
| 2015/0298413 A1* | 10/2015 | Yang | B29C 45/2673 425/183 |
| 2016/0039162 A1 | 2/2016 | Murphy et al. | |
| 2016/0144546 A1 | 5/2016 | Song et al. | |
| 2016/0318267 A1 | 11/2016 | Koiso et al. | |
| 2017/0203529 A1* | 7/2017 | Wu | B29D 35/02 |
| 2018/0065287 A1 | 3/2018 | Park et al. | |
| 2018/0133943 A1 | 5/2018 | Aiba et al. | |
| 2018/0147752 A1 | 5/2018 | NÜrnberg et al. | |
| 2018/0213886 A1 | 8/2018 | Connell et al. | |
| 2019/0073709 A1 | 3/2019 | Hayes et al. | |
| 2019/0276626 A1 | 9/2019 | Baghdadi | |
| 2019/0351592 A1 | 11/2019 | Falken | |
| 2019/0366590 A1 | 12/2019 | Farris et al. | |
| 2021/0031474 A1* | 2/2021 | Tsai | B29C 44/58 |

FOREIGN PATENT DOCUMENTS

| | | |
|---|---|---|
| CN | 106182664 A | 12/2016 |
| CN | 107415131 A | 12/2017 |
| CN | 108115946 A | 6/2018 |
| DE | 3145346 A1 | 5/1983 |
| DE | 3319967 A1 | 12/1984 |
| DE | 3723830 A1 | 1/1989 |
| DE | 4022778 A1 | 1/1992 |
| EP | 1166991 A2 | 1/2002 |
| EP | 1266928 A1 | 12/2002 |
| EP | 3025844 A1 | 6/2016 |
| EP | 3326774 A1 | 5/2018 |
| IT | 201700072079 A1 | 12/2018 |
| JP | 5-104583 A | 4/1993 |
| JP | 8-207188 A | 8/1996 |
| JP | 2002-355872 A | 12/2002 |
| JP | 2004-314625 A | 11/2004 |
| JP | 2009-190251 A | 8/2009 |
| KR | 10-0757966 B1 | 9/2007 |
| NO | 2018/222968 A1 | 12/2018 |
| TW | I256961 B | 6/2006 |
| TW | 200922769 A | 6/2009 |
| TW | 201512262 A | 4/2015 |
| TW | 201902666 A | 1/2019 |
| WO | 02/38674 A2 | 5/2002 |
| WO | 2016/022829 A1 | 2/2016 |
| WO | 2016/077820 A1 | 5/2016 |
| WO | 2017/202840 A1 | 11/2017 |
| WO | 2018/222714 A1 | 12/2018 |
| WO | 2019/101375 A1 | 5/2019 |
| WO | 2019/236500 A1 | 12/2019 |

OTHER PUBLICATIONS

International Search Report and Written Opinion received for PCT Patent Application No. PCT/US2021/021535, dated Jun. 23, 2021, 14 pages.

(56) References Cited

OTHER PUBLICATIONS

Rodriguez-Perez et al., "Mechanical Behaviour at Low Strains of LDPE Foams with Cell Sizes in the Microcellular Range: Advantages of Using These Materials in Structural Elements", Cellular Polymers, vol. 27 No. 6, Available online at: <https://www.researchgate.net/publication/43945663>, Nov. 2008, pp. 347-362.
Extended European Search Report received for European Application No. 22196248.3, dated Nov. 18, 2022, 10 pages.
Final Office Action received for U.S. Appl. No. 17/195,161, dated Dec. 14, 2022, 8 pages.
International Search Report and Written Opinion for PCT application No. PCT/US2021/021499, dated Aug. 2, 2021, 20 pages.
International Search Report and Written Opinion for PCT application No. PCT/US2021/021500, dated Aug. 6, 2021, 18 pages.
International Search Report and Written Opinion received for PCT Patent Application No. PCT/US2021/021534, dated Jun. 15, 2021, 14 pages.
International Preliminary Report on Patentability received for PCT Patent Application No. PCT/US2021/021451, dated Jun. 14, 2022, 11 pages.
International Preliminary Report on Patentability received for PCT Patent Application No. PCT/US2021/021499, dated Sep. 22, 2022, 12 pages.
International Preliminary Report on Patentability received for PCT Patent Application No. PCT/US2021/021500, dated Sep. 22, 2022, 11 pages.
International Preliminary Report on Patentability received for PCT Patent Application No. PCT/US2021/021534, dated Sep. 22, 2022, 9 pages.
International Preliminary Report on Patentability received for PCT Patent Application No. PCT/US2021/021535, dated Sep. 22, 2022, 9 pages.
Non-Final Office Action received for U.S. Appl. No. 17/195,067, dated Aug. 29, 2022, 15 pages.
Non-Final Office Action received for U.S. Appl. No. 17/195,161, dated Sep. 1, 2022, 12 pages.
Non-Final Office Action received for U.S. Appl. No. 17/195,086, dated Sep. 14, 2022, 8 pages.
Office Action received for European Patent Application No. 21715087.9, dated Jan. 31, 2023, 5 pages.
Final Office Action received for U.S. Appl. No. 17/195,067, dated Mar. 10, 2023, 12 pages.
Non-Final Office Action received for U.S. Appl. No. 17/194,812, dated Feb. 17, 2023, 15 pages.
Notice of Allowance mailed on U.S. Appl. No. 17/195,086, dated Mar. 1, 2023, 5 pages.
Notice of Allowance mailed on U.S. Appl. No. 17/195,161, dated Mar. 1, 2023, 9 pages.
Extended European Search Report received for European Patent Application No. 23172527.6, dated Aug. 30, 2023, 5 pages.
Extended European Search Report received for European Patent Application No. 23178056.0, dated Aug. 30, 2023, 8 pages.
Extended European Search Report received for European Patent Application No. 23179009.8, dated Aug. 31, 2023, 7 pages.
Notice of Allowance received for U.S. Appl. No. 17/194,812, dated Aug. 23, 2023, 7 pages.
Notice of Allowance received for U.S. Appl. No. 17/195,067, dated Sep. 15, 2023, 10 pages.
Office Action received for European Patent Application No. 21714773.5, dated Nov. 6, 2023, 6 pages.
Office Action received for European Patent Application No. 21715095.2, dated Nov. 6, 2023, 5 pages.

\* cited by examiner

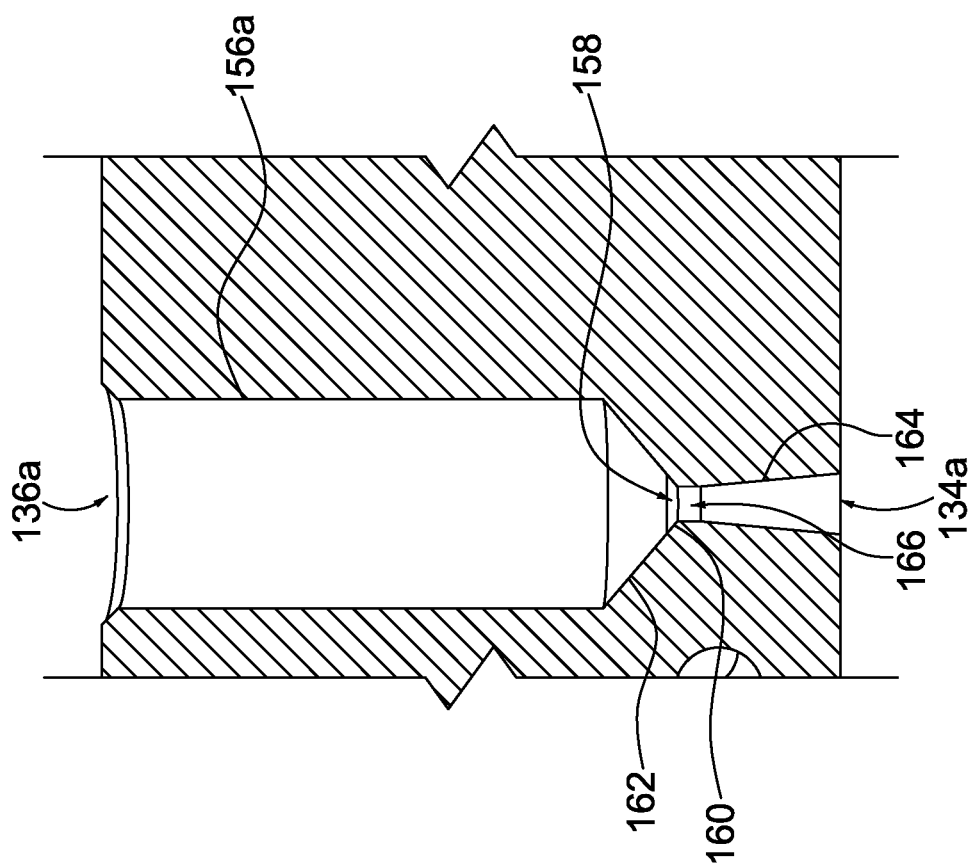

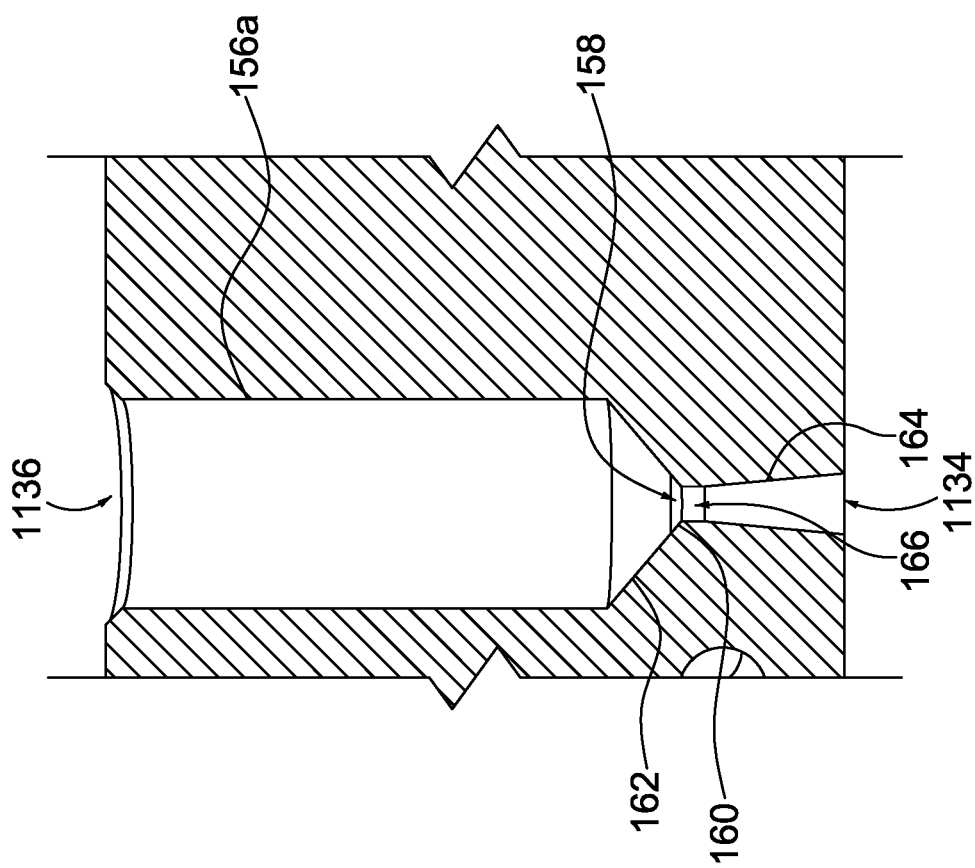

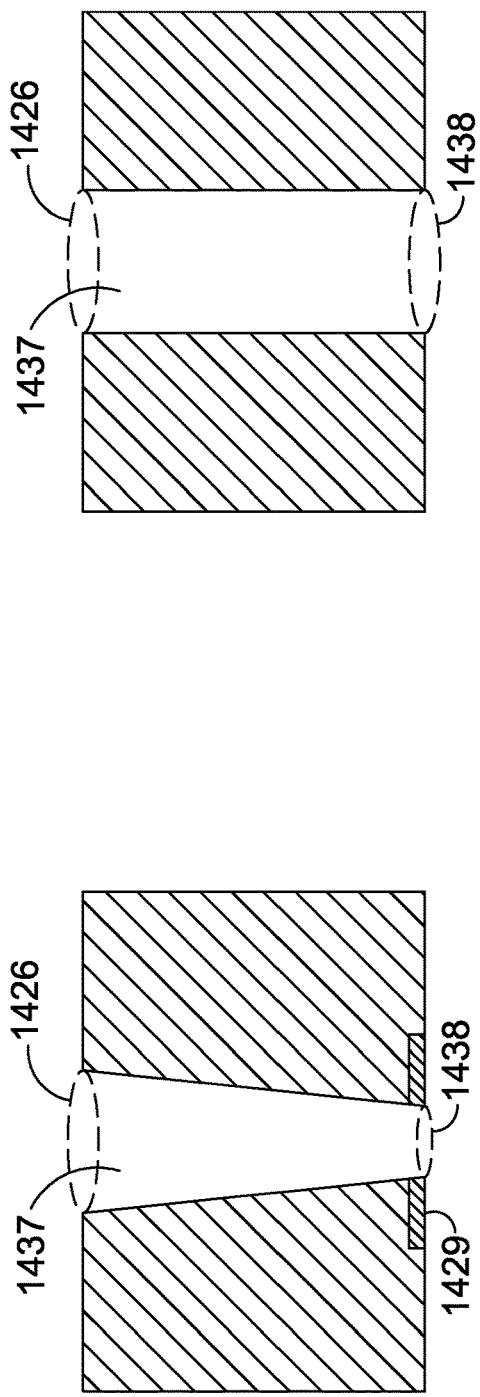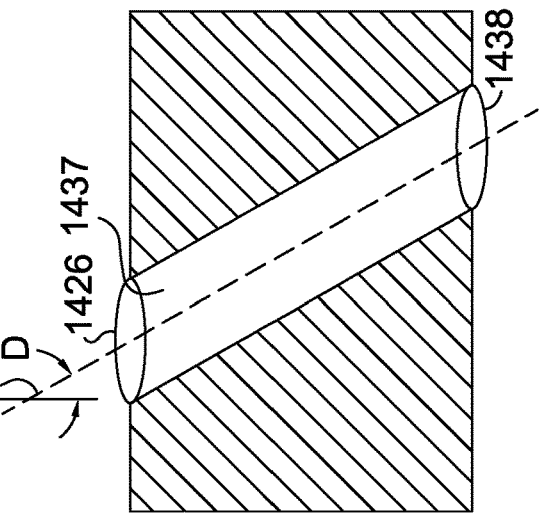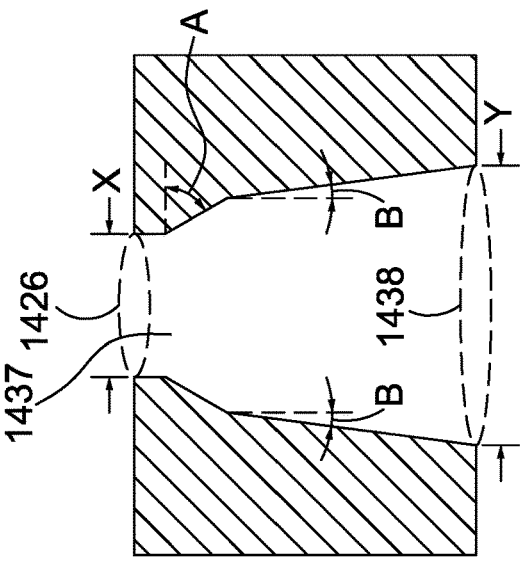

US 11,859,067 B2

FOOTWEAR MOLD ASSEMBLY FOR INJECTION-MOLDING

CROSS-REFERENCE TO RELATED APPLICATIONS

This application claims priority to U.S. Provisional Patent App. No. 62/987,227, filed Mar. 9, 2020, and titled "Injection Molding System and Tooling" and to U.S. Provisional Patent App. No. 63/137,872, filed Jan. 15, 2021, and titled "Injection Molding System and Tooling" and to U.S. Provisional Patent App. No. 62/987,329, filed Mar. 9, 2020, and titled "Foam Article with Enhanced Properties" and to U.S. Provisional Patent App. No. 62/987,648, filed Mar. 10, 2020, and titled "Foam Article with Enhanced Properties" and to U.S. Provisional Patent App. No. 62/987,224, filed Mar. 9, 2020, and titled "Footwear Component Manufacturing System and Methods" and to U.S. Provisional Patent App. No. 63/042,324, filed Jun. 22, 2020, and titled "Manufacturing Processes and Systems for Forming Footwear Soles Using Recycled Thermoplastic Copolyester Recyclate" and to U.S. Provisional Patent App. No. 63/071,393, filed Aug. 28, 2020, and titled "Manufacturing Processes and Systems for Forming Footwear Soles Using Recycled Thermoplastic Copolyester Recyclate." These applications are assigned to the same entity as the present application, and are incorporated herein by reference in the entirety.

TECHNICAL FIELD

The present invention relates to tooling and components of an injection-molding system for molding a foam article, including a mold assembly for forming a three-dimensional article, such as a cushioning element for an article of footwear or other apparel or equipment item.

BACKGROUND

Injection molding may be used to manufacture various components of a footwear article, such as a footwear sole, a footwear upper, and parts of a footwear sole or a footwear upper (e.g., cushioning elements, trim, etc.). For example, an injection molding system may be used to distribute a polymer melt into a cavity of a mold, after which the polymer melt solidifies into a polymer product having the shape of the mold cavity. In some instances, it may be advantageous for the polymer product to include a foamed material, such as when manufacturing a footwear sole (e.g., all of, or a portion of, a footwear midsole). Systems configured to mold foam polymer products may include some components that are different from systems configured to mold non-foam polymer products. For example, some injection molding systems both foam and mold the polymeric material.

SUMMARY

This Summary is provided to introduce a selection of concepts in a simplified form that are further described below in the Detailed Description. This Summary is not intended to identify key features or essential elements of the claimed subject matter, nor is it intended to be used as an aid in determining the scope of the claimed subject matter. The present invention is defined by the claims. At a high level, the present disclosure is directed to tooling and components of an injection molding system configured to mold various articles.

BRIEF DESCRIPTION OF THE DRAWINGS

Some subject matter described in this disclosure includes tooling of an injection-molding system for molding a foam component. This subject matter is described in detail below with reference to the drawing figures, which are submitted together with this Specification and are incorporated herein by reference.

FIG. 7B depicts a cross-sectional view from the 7B reference line in FIG. 7A, in accordance with an aspect of the present disclosure;

FIG. 18B depicts a cross-sectional view from the 18B reference line in FIG. 18A, in accordance with another aspect of the present disclosure;

FIG. 20A depicts a cross-sectional view of the second mold taken along the 20-20 reference line in FIG. 19A, in accordance with another aspect of the present disclosure;

FIG. 20B depicts a cross-sectional view of the second mold taken along the 20-20 reference line in FIG. 19A, in accordance with another aspect of the present disclosure;

FIG. 20C depicts a cross-sectional view of the second mold taken along the 20-20 reference line in FIG. 19A, in accordance with another aspect of the present disclosure;

FIG. 20 D depicts a cross-sectional view of the second mold taken along the 20-20 reference line in FIG. 19A, in accordance with another aspect of the present disclosure;

DETAILED DESCRIPTION

Figure 1A:
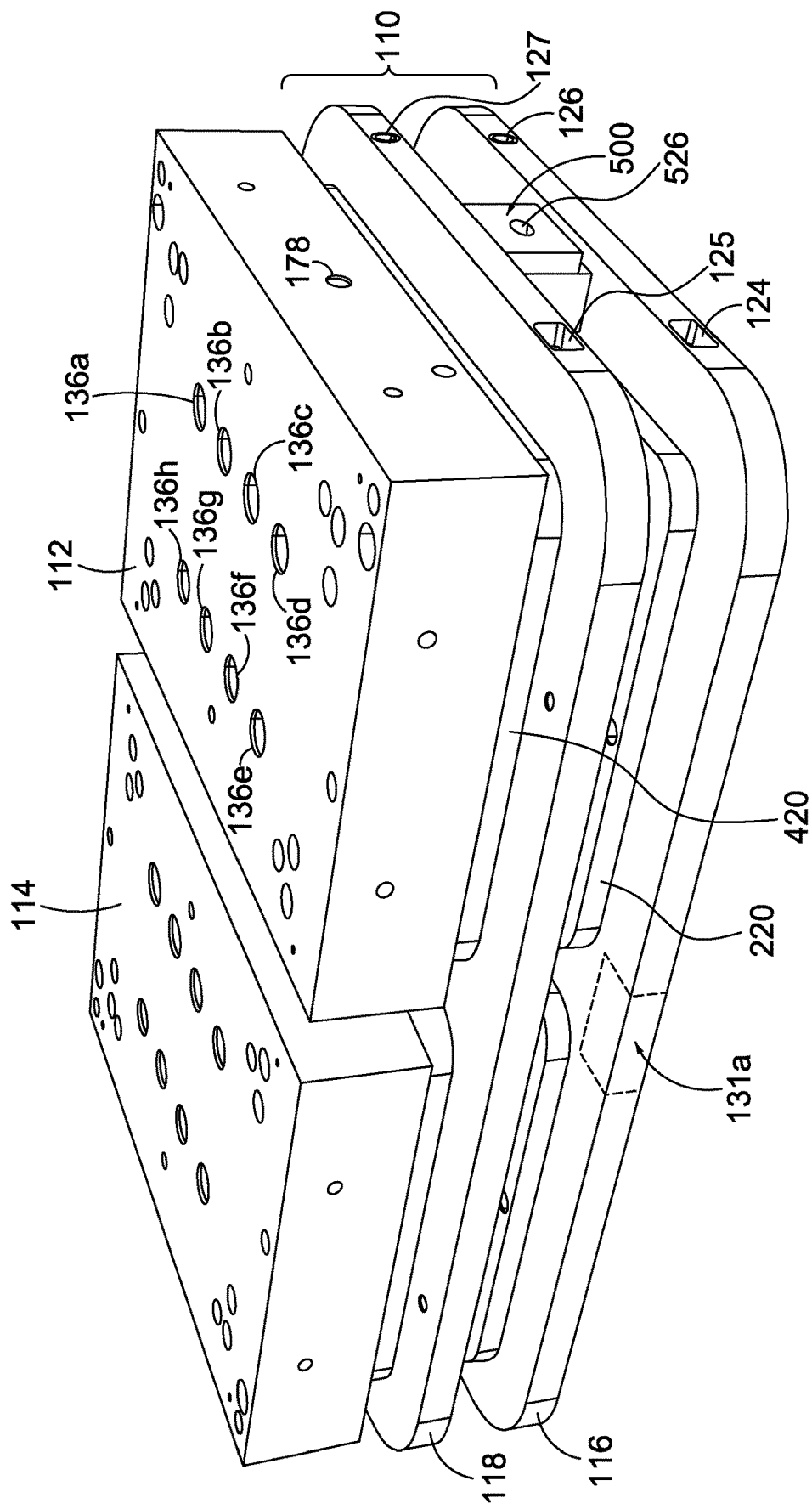
FIGS. 1A-1E depicts various perspectives of a pair of hot-runner plates combined with a tooling assembly, in accordance with an aspect of the present disclosure.

Subject matter is described throughout this Specification in detail and with specificity in order to meet statutory requirements. The aspects described throughout this Specification are intended to be illustrative rather than restrictive, and the description itself is not intended necessarily to limit the scope of the claims. Rather, the claimed subject matter might be practiced in other ways to include different elements or combinations of elements that are equivalent to the ones described in this Specification and that are in conjunction with other present technologies or future technologies. Upon reading the present disclosure, alternative aspects may become apparent to ordinary skilled artisans that practice in areas relevant to the described aspects, without departing from the scope of this disclosure. It will be understood that certain features and subcombinations are of utility and may be employed without reference to other features and subcombinations. This is contemplated by, and is within the scope of, the claims.

The subject matter described in this Specification generally relates to, among other things, tooling and components of an injection molding system configured to mold various articles. For example, the tooling and components of the present disclosure may be configured to mold foam articles having properties (e.g., size, thickness, density, energy return, consistency, uniformity, etc.) that may be difficult to achieve using conventional systems. For example, according to this disclosure, parameters (e.g., pressure, temperature, shot size, shot location, dwell time, etc.) may be controlled to influence the foaming activity of a single phase solution (SPS), which may ultimately affect the thickness, consistency, density, surface texture and appearance, etc. of the part, and when the foam polymer product is a component of a footwear article (e.g., a midsole) or other apparel or equipment item (e.g., athletic foam padding), these properties may affect the performance and usability.

One type of injection molding system that both foams and molds polymeric materials uses a microcellular injection molding process, in which one or more supercritical fluids (SCFs)—e.g., supercritical nitrogen, supercritical carbon dioxide, etc.—are used as physical blowing agents. For example, the SCF may be injected into a polymer melt contained in an injection barrel of the injection molding system, where the SCF dissolves in the polymer melt to form the SPS. The SPS may then be flowed into the mold cavity, at which point conditions are adjusted to cause the SCF to transition to a gas (e.g., nucleation to a gas) and the polymer to solidify. This transition of the polymer composition in the mold cavity may cause the polymer composition to expand (e.g., due to foaming) to fill the mold cavity, and once solidified, retain the shape of the foam polymer product.

These types of injection molding systems that use a microcellular injection molding process are often configured to control system parameters, which may affect properties of the foam polymer product. System parameters may be controlled at various stages of the injection molding process. For example, parameters may be controlled at the melting and mixing components forming the SPS, as well as among the components that transport the SPS to the mold. In addition, parameters may be controlled among the mold tooling. Theses stages may independently and/or collectively influence the melt, mixing, and molding processes.

Conventional injection molding systems have been configured to execute a microcellular injection molding process. However, the attributes of parts typically molded with these systems is often limited, such that the operating parameters and tooling of a conventional system are often not calibrated to mold parts having different attributes. For example, the part thickness or wall thickness of a part typically molded in a conventional system may be relatively thin, such that conventional systems may not produce thicker parts having desired properties. In some instances, operating parameters and tooling of a conventional system may not be calibrated to mold a foam part having the properties and characteristics for a footwear article (or similar item). For example, under conventional systems, when the mold cavity size is increased (e.g., to include the thickness of a midsole) the SPS may experience undesirable or unwanted changes when deposited into the larger mold cavity, and these changes may affect foaming (e.g., nucleation and bubble formation) and properties of the foamed product (e.g., strength, surface quality, density, elasticity, skin thickness, bubble-size consistency, weak front interfaces, etc.). Part size and thickness is an example of one property that is different between shoe components and parts typically molded using conventional microcellular injection molding processes. However, there may be other properties (e.g., molded-product density, amount of SCF, amount of desired foaming, molded-product strength, molded-product compressibility, etc.) that are also different and that may contribute to conventional systems experiencing disadvantages when used to manufacture shoe parts.

In contrast, the present disclosure controls parameters within the mold cavity to achieve foaming in a desired manner. For example, the temperature of the tooling (e.g., mold cavity walls) of the present disclosure may be controlled (e.g., temperature conditioned) to affect the temperature of the SPS (and the viscosity as a result) upon deposit into the mold cavity and during the foaming process. In one aspect, the mold temperature may be conditioned by positioning the mold on a temperature-conditioning rack (e.g., shelf) prior to the mold receiving the SPS, and the rack may include a cooling system or a heating system that conductively or actively moderates the temperature of the mold when the mold is placed on the rack. As such, when the conditioned mold is then engaged with the injector, the temperature of the mold cavity may be in a range that reduces the likelihood that the SPS will experience undesirable or unwanted changes. Furthermore, when the system is configured such that the temperature-conditioning rack conductively moderates the mold temperature, the mold may be constructed of materials (e.g., aluminum) that more efficiently transfer heat.

The present disclosure may include other aspects that reduce a likelihood that the SPS may experience undesirable or unwanted changes in the mold cavity. For example, a gas counter pressure (GCP) system may affect a pressure within the mold cavity during the molding process (e.g., prior to distribution of the SPS into the cavity; dwell of SPS in the mold cavity; foaming of SPS in the mold cavity; etc.). Among other things, the GCP system may include one or more vents in the mold cavity that allow pressurized gas to pass into or from the mold cavity, and in one aspect, a property of the one or more vents (e.g., size, location, etc.) may relate to a viscosity of the SPS. For example, with a lower viscosity SPS, a size of the one or more vents may be increased (relative to systems molding higher viscosity SPS), which may increase the efficiency of the GCP system.

In other aspects, the present disclosure describes a system of molds that may be used to manufacture a range of sizes of footwear articles. For example, the system of molds might include a first mold for a first sole size and a second mold for a second sole size (different from the first sole size), which each include a respective interface for fluidly communicating with a universal (shared) runner plate (e.g., a universal hot-runner plate or universal cold-runner plate affixed to injection nozzles). The interface of each of the first mold and the second mold may be constructed similarly (e.g., similar port size, shape, position, and number). However, the first mold may include a first set of runners and gates that communicate with the universal runner plate, and the second mold may include a second set of runners and gates that communicate with the universal runner plate. The first and second sets of runners and gates may be configured differently from one another (e.g., different runner paths/numbers and gate positions/numbers) in order to effectively distribute the SPS to a respective mold cavity having a respective size. Using a universal plate affixed to the injection nozzles, instead of a separate plate for each mold may, among other things, reduce costs associated with constructing and maintaining the tooling.

Aspects of the present disclosure may include other features as well. For example, the mold plates may include a series of pins and stops that permit the plates to be moved and spaced with respect to one another at different stages of the molding process, such as at the unloading station. In addition, the tooling may include carrier plates that permit the mold plates to be manipulated, transported, and properly aligned at different stages of the molding process. Furthermore, the tooling may include a latch assembly that releasably connects portions of the tooling together.

Also presented herein are manufacturing systems, processes and control logic for forming foamed thermoplastic polymer articles incorporating recycled thermoplastic materials, methods for operating such systems, shoe structure segments fabricated from such articles, and footwear assembled with such segments. In a general sense, the present technology enables the waste from an injection molding operation (e.g., runner waste, flashing, reused foam, etc.) to be reincorporated/integrated into a subsequently formed midsole such that the net waste from the molding operation is greatly reduced and/or eliminated. By way of example, there is presented a manufacturing process for fabricating a single-piece foamed midsole of an athletic shoe using scrap and/or waste (collectively "recycled") thermoplastic, such as a regrind thermoplastic polyester elastomer (TPE-E) composition. The midsole is a foam component with a foam volume, which includes a foam core and an integrally formed skin that encases the foam core.

In an injection molding application, spent scrap and waste thermoplastic material, such as foamed and/or unfoamed TPE-E composition, is ground into granular form and mixed into a composition containing virgin polymer. The mixture of ground/pelletized recycled material and virgin material is heated into a polymer melt composition, which is then passed, under pressure, through an injection barrel. While in the injection barrel, a supercritical fluid (SCF), such as supercritical nitrogen or supercritical carbon dioxide, may be injected into the polymer melt composition contained in the barrel, where the SCF dissolves in the melt to form a molten single-phase solution (SPS). The injection molding system foams and molds the ground virgin and recycled polymer using a microcellular molding process in which the SCF is employed as a physical blowing agent. The SPS may then be flowed into the mold cavity, at which point system conditions are modulated to activate transition of the SCF to a gas (e.g., nucleation to a gas) and the polymer to solidify. This transition of the polymer composition in the mold cavity may cause the polymer composition to expand (e.g., by foaming) to fill the mold cavity and, once solidified, retain the shape of the foam polymer product. The tooling and components of the injection molding system, as well as the calibrated parameters for operating the molding system, may be specifically tailored to mold foamed polymer articles using recycled TPE-E composition. Recombination of regrind and virgin polymer material may occur, as mentioned above, inside an injection barrel via a dry blend process; alternatively, regrind and virgin material recombination may occur on a separate extrusion line and, once combined, the pre-blended pellets may then be fed into the injection molder.

Aspects of this disclosure are also directed to manufacturing systems and processes for fabricating footwear, apparel, and sporting goods from scrap and waste plastic. In an example, a method is presented for manufacturing foamed polymer articles from recycled TPE-E or TPE-E composition. This representative method includes, in any order and in any combination with any of the above or below disclosed features and options: inputting a batch of recycled thermoplastic polyester elastomer composition; grinding the recyclate batch into a ground recyclate material; combining a metered amount of the ground recyclate material with ground or pelletized virgin thermoplastic polyester elastomer composition into a mixed batch, the metered amount being about 20% by mass or less of a total mass of the mixed batch; melting the mixed batch into a polymer melt composition; adding a physical foaming agent to the polymer melt composition; injecting the polymer melt composition with the physical foaming agent into an internal cavity of a mold tool; forming the foamed polymer article by activating the physical foaming agent such that the physical foaming agent causes the polymer melt composition to expand and fill the mold tool's internal cavity; and extracting the foamed polymer article from the mold tool.

In another example, a method of manufacturing a foamed polymer article includes, in any order and in any combination with the above and/or below concepts: grinding a recyclate batch of recycled thermoplastic polyester elastomer composition into a ground recyclate material; combining a metered amount of the ground recyclate material and a virgin polymer material of virgin thermoplastic polyester elastomer composition into a mixed batch; melting the ground recyclate material and the virgin polymer material into a polymer melt composition; adding a physical foaming agent to the polymer melt composition; injecting the polymer melt composition with the physical foaming agent into an internal cavity of a mold tool; activating the physical foaming agent such that the physical foaming agent causes the polymer melt composition to expand and fill the internal cavity of the mold tool to form the foamed polymer article; and removing the formed foamed polymer article from the mold tool.

In yet another example, a method of manufacturing a foamed polymer article includes, in any order and in any combination with the above and/or below concepts: adding a physical foaming agent to a polymer melt composition, the polymer melt composition including a blend of a recyclate polymer material and a virgin polymer material, both of virgin thermoplastic polyester elastomer compositions, the recyclate polymer material being about 20% by mass or less of a total mass of the polymer melt composition; injecting the polymer melt composition with the physical foaming agent into an internal cavity of a mold tool; activating the physical foaming agent such that the physical foaming agent causes the polymer melt composition to expand and fill the internal cavity of the mold tool to form the foamed polymer article; and removing the formed foamed polymer article from the mold tool.

Further aspects of this disclosure are directed to control logic and algorithms for operating manufacturing systems that fabricate footwear, apparel, and sporting goods from scrap and waste plastic. In an example, a method is presented for operating a manufacturing system to reduce waste during production of a foamed polymer article, such as a sole component of a shoe. This representative method includes, in any order and in any combination with any of the above or below disclosed features and options: injecting a mixed thermoplastic composition resin into a mold, the mixed thermoplastic composition resin including a mixture of virgin thermoplastic composition resin and recycled thermoplastic composition resin, and the mold comprising an internal mold cavity that is fluidly connected to one or more filling portions, such as a sprue, runner, and/or gate; and foaming the mixed thermoplastic composition resin within the internal mold cavity to form the foamed polymer article. In this method, the mass of the recycled thermoplastic composition resin within the internal mold cavity is greater than or equal to a mass of the mixed thermoplastic composition resin within the filling portion of the mold. As such, it may be possible for the entirety of thermoplastic composition within the filling portion of the mold to be fully incorporated into subsequently formed soles.

In another example, a method of reducing waste during production of a foamed sole component of a shoe includes, in any order and in any combination with any of the above or below disclosed features and options: injecting a mixed thermoplastic composition resin into a mold, the mixed thermoplastic composition resin comprising a mixture of a virgin thermoplastic composition resin and a recycled thermoplastic composition resin, and the mold comprising a sole cavity portion fluidly coupled to a filling portion; and foaming the mixed thermoplastic composition resin within the sole cavity portion to form the foamed sole component of the shoe, wherein a mass of the recycled thermoplastic composition resin within the sole cavity portion is greater than or equal to a mass of the mixed thermoplastic composition resin within the filling portion.

Further aspects of the present disclosure are directed to sporting goods, apparel, footwear, and segments of footwear fabricated from any of the disclosed processes and materials. For instance, an article of footwear, such as an athletic shoe, includes an upper that receives and attaches to the user's foot. A single-piece or multilayered sole structure, which is attached to a lower portion of the upper, supports thereon the user's foot. This sole structure includes an outsole that defines the ground-engaging portion of the footwear. The sole structure is fabricated with one or more foamed sole components, each of which includes a metered amount of a (ground or pelletized) recycled thermoplastic polyester elastomer composition and a (ground or pelletized) virgin thermoplastic polyester elastomer composition. The metered amount of recyclate TPE-E composition is about 20% by mass or less of a total mass of the mixed batch.

Further aspects of this disclosure are directed to a method of manufacturing a foamed polymer article. In this instance, the method includes: grinding a recyclate batch of recycled thermoplastic polyester elastomer composition into a ground recyclate material; combining a metered amount of the ground recyclate material and a virgin polymer material of virgin thermoplastic polyester elastomer composition into a mixed batch; prior to or after combining, melting the ground recyclate material and the virgin polymer material into a polymer melt composition; adding a physical foaming agent to the polymer melt composition; injecting the polymer melt composition with the physical foaming agent into an internal cavity of a mold tool; activating the physical foaming agent such that the physical foaming agent causes the polymer melt composition to expand and fill the internal cavity of the mold tool to form the foamed polymer article; and removing the formed foamed polymer article from the mold tool. The formed foamed polymer article has: a ratio of energy efficiency to energy intensity that is greater than about 1.3; a ratio of energy efficiency to the product of energy intensity and density that is greater than about 5.9; a ratio of energy return to energy intensity that is greater than about 7,225; and/or a ratio of energy return to the product of energy intensity and density that is greater than about 38,250.

Additional aspects of this disclosure are directed to method of reducing waste during production of a foamed polymer article. In this instance, the method includes: injecting a mixed thermoplastic composition resin into a mold, the mixed thermoplastic composition resin comprising a mixture of a virgin thermoplastic composition resin and a recycled thermoplastic composition resin; and foaming the mixed thermoplastic composition resin within an internal mold cavity of a molding system to form the foamed polymer article, wherein a mass of the recycled thermoplastic composition resin within the mixed thermoplastic composition resin is at least about 20% by mass of a total mass of the mixed thermoplastic composition resin.

For any of the disclosed systems, methods, articles, and footwear, the recycled TPE-E composition in the recyclate batch includes scrap material or waste material, or both, that was recovered from an un-foamed batch of extruded TPE-E composition and/or a foamed batch of injection molded TPE-E composition. As yet a further option, the recycled and virgin TPE-E compositions may be derived from a dihydroxy-terminated polydiol material, such as a poly(alkylene oxide)diol, or a C2-C8 diol material, such as an ethanediol, propanediol, butanediol, pentanediol, or an aromatic dicarboxylic acid material, such as a C5-C16 dicarboxylic acid, or any combination thereof. In addition, the physical foaming agent may be added by injecting the physical foaming agent into the polymer melt composition while the polymer melt composition is contained in an injection barrel of an injection molding system. The physical foaming agent may be an SCF, such as supercritical nitrogen and/or supercritical carbon dioxide.

For any of the disclosed systems, methods, articles, and footwear, the mixed batch of ground recyclate material and virgin polymer material may have a set point temperature of at least about 150° C. or, in some embodiments, ranging from about 190° C. to about 265° C. In this regard, the mixed batch of recyclate and virgin materials may have an average peak crystallization temperature of at least about 90° C. or, in some embodiments, ranging from about 135° C. to about 165° C. A resultant foamed polymer article may have a cell size average, e.g., by volume of a longest cell dimension, of less than about 0.68 mm or, in some embodiments, about 0.18 mm to about 0.58 mm. Creating the polymer melt composition may comprise melting then mixing the recyclate and virgin materials or melting a mixed batch already containing the recyclate and virgin materials.

For any of the disclosed systems, methods, articles, and footwear, the resultant foamed polymer article exhibits: a ratio of energy efficiency to energy intensity that is between about 1.1 and about 1.9; a ratio of energy efficiency to the product of energy intensity and density that is between about 4.8 and about 9.1; a ratio of energy return to energy intensity that is between about 6,000 and about 11,000; and/or a ratio of energy return to the product of energy intensity and density that is greater than about 45,000. The recycled and virgin thermoplastic polyester elastomer compositions may be derived from a block copolymer, a segmented copolymer, a random copolymer, and/or condensation copolymer, and may have a weight average molecular weight (Mw) of at least about 30,000 Daltons or, in some embodiments, about 50,000 Daltons to about 200,000 Daltons.

For any of the disclosed systems, methods, articles, and footwear, the ground recyclate material may be processed prior to melting the mixed batch. This processing may include adding a filler, pigment, and/or processing aid to the ground recyclate material (before or after incorporation into the mixed batch). As yet a further option, adding the physical foaming agent to the polymer melt composition may include dissolving a supercritical inert fluid into the polymer melt composition under pressure to form a single-phase solution. Moreover, activating the physical foaming agent may include releasing the pressure to expand the supercritical inert fluid. Receiving the recyclate batch of recycled TPE-E composition may include obtaining, from a sprue, a runner, and/or a gate of an injection molding system, scrap segments of a prior-foamed polymer article formed from a prior mixed batch of ground recyclate material and virgin polymer material.

For any of the disclosed systems, methods, articles, and footwear, a resultant foamed article formed with recycled polymer material may have an energy return measurement that is within a predefined tolerance of an energy return measurement of a comparable foamed article formed entirely or almost entirely from virgin polymer material. For example, the predefined tolerance of a foamed sole component formed with recyclate is about 75% to about 99% of the energy return measurement of a comparable shoe sole component formed from virgin material. A shoe sole component may be considered "comparable" to another sole component if the two articles share an equivalent or nearly equivalent common shape, size, and/or method of molding. A percent by mass of the recycled thermoplastic resin within the mixed thermoplastic resin may be less than about 30% or, in some embodiments, between about 1% and about 20%.

For any of the disclosed systems, methods, articles, and footwear, the filling portion of the mold comprises one or more cold runners. In this instance, the filling portion may include one or more hot runners disposed within one or more runner plates, which may be stacked on and fluidly coupled to one or more mold plates that define therein the internal mold cavity. Moreover, the filling portion may consist of one or more channels that direct a flow of mixed thermoplastic resin from a nozzle or hot runner of an injection molding apparatus to the internal mold cavity portion of the mold. As yet a further option, the ground recyclate material may have an irregular shape with a largest measurement of about 1-10 mm, and the virgin polymer material has a pellet size of about 1-10 mm. A foamed sole component may have a melting temperature of at least about 190° C. and an average peak crystallization temperature of at least about 135° C.

These and other aspects are described in more detail in the below parts of this Detailed Description.

Foamed Thermoplastic Elastomer Composition

A disclosed thermoplastic elastomer foam (i.e., a foam formed by expanding a thermoplastic elastomer composition as disclosed herein), including thermoplastic polyester foams, can exhibit various beneficial properties. For example, the thermoplastic elastomer foam can exhibit a beneficial split tear, for example a high split tear value for a sole component in an article of footwear. In some aspects, the thermoplastic elastomer foam can have a split tear value of greater than about 1.5 kilogram/centimeter (kg/cm), or greater than about 2.0 kg/cm, or greater than about 2.5 kg/cm, when determined using the Split Tear Test Method described herein. In some aspects, the thermoplastic elastomer foam can have a split tear value of 1.0 kg/cm to 4.5 kg/cm, or 1.0 kg/cm to 4.0 kg/cm, or 1.5 kg/cm to 4.0 kg/cm, or 2.0 kg/cm to 3.5 kg/cm, or 2.5 kg/cm to 3.5 kg/cm, when determined using the Split Tear Test method described herein. The thermoplastic elastomer foam can have a split tear value of 0.8 kg/cm to 4.0 kg/cm, or 0.9 kg/cm to 3.0 kg/cm, or 1.0 to 3.0 kg/cm, or of 1.0 kg/cm to 2.5 kg/cm, or 1 kg/cm to 2 kg/cm. In some aspects, the thermoplastic elastomer foam is injection molded, and has a split tear value of 0.7 kg/cm to 2.5 kg/cm, or 0.8 kg/cm to 2.0 kg/cm, or 0.9 to 1.5 kg/cm, or 1.0 kg/cm to 2.5 kg/cm, or of 1.0 kg/cm to 2.2 kg/cm. The thermoplastic elastomer foam can have an open-cell foam structure. The thermoplastic elastomer foam can be the product of physically foaming a thermoplastic elastomer composition as disclosed herein, i.e., a foam formed using a physical foaming agent (i.e., a physical blowing agent). As used herein, a thermoplastic elastomer foam is understood to refer to a foamed material which has thermoplastic and elastomeric properties. The thermoplastic elastomer foam can be the foamed product of foaming a thermoplastic elastomer composition comprising less than 10 weight percent, or less than 5 weight percent, or less than 1 weight percent of non-polymeric ingredients based on a total weight of the thermoplastic elastomer composition. In some aspects, the thermoplastic elastomer foam is injection molded (i.e., is not exposed to a separate compression molding step after being formed by injection molding and removed from the injection mold). In other aspects, the thermoplastic elastomer foam is injection molded and subsequently compression molded in a separate compression mold having different dimensions than the mold used in the injection molding step.

The density or specific gravity of a disclosed thermoplastic elastomer foam, including a thermoplastic polyester foam, is also an important physical property to consider when using a foam for an article of apparel, footwear or athletic equipment. As discussed above, the thermoplastic elastomer foam of the present disclosure exhibits a low density or specific gravity, which beneficially reduces the weight of midsoles or other components containing the thermoplastic elastomer foam.

The thermoplastic elastomer foams of the present disclosure, including thermoplastic polyester foams, can have a specific gravity of from 0.02 to 0.22, or 0.03 to 0.12, or 0.04 to 0.10, or 0.11 to 0.12, or 0.10 to 0.12, or 0.15 to 0.20, or 0.15 to 0.30, when determined using the Specific Gravity Test Method described herein. In some aspects, the thermoplastic elastomer foams can have a specific gravity of from 0.15 to 0.22, such as from 0.17 to 0.22 or from 0.18 to 0.21, when determined using the Specific Gravity Test Method described herein. Alternatively or in addition, the thermoplastic elastomer foam can have a specific gravity of from 0.01 to 0.10, or 0.02 to 0.08, or 0.03 to 0.06, or 0.08 to 0.15, or 0.10 to 0.12, when determined using the Specific Gravity Test Method described herein. For example, the specific gravity of the thermoplastic elastomer foam can be from 0.15 to 0.2, or 0.10 to 0.12. The thermoplastic elastomer foam can be injection molded, or can be injection molded and subsequently compression molded. In some aspects, the thermoplastic elastomer foam has a specific gravity of about 0.7 or less, or 0.5 or less, or 0.4 or less, or 0.3 or less, when determined using the Specific Gravity Test Method described herein. In some aspects, the thermoplastic elastomer foam, including the thermoplastic elastomer foam present in midsoles and midsole components, can have a specific gravity of 0.05 to 0.25, or 0.05 to 0.2, or 0.05 to 0.15, or 0.08 to 0.15, or 0.08 to 0.20, or 0.08 to 0.25, or 0.1 to 0.15, when determined using the Specific Gravity Test Method described herein. In some aspects the thermoplastic elastomer foam has a specific gravity of about 0.15 to about 0.3, or about 0.2 to about 0.35, or about 0.15 to about 0.25, when determined using the Specific Gravity Test Method described herein. The thermoplastic elastomer foam article or article component can be formed by injection molding without a subsequent compression molding step. The thermoplastic elastomer foam can have an open-cell foam structure. The thermoplastic elastomer foam can be the foamed product of foaming a thermoplastic elastomer composition comprising less than 10 weight percent, or less than 5 weight percent, or less than 1 weight percent of non-polymeric ingredients based on a total weight of the thermoplastic elastomer composition.

The thermoplastic elastomer foams of the present disclosure, including thermoplastic polyester foams, can have a density of from 0.02 grams per cubic centimeter (g/cc) to 0.22 g/cc, or 0.03 g/cc to 0.12 g/cc, or 0.04 g/cc to 0.10 g/cc, or 0.11 g/cc to 0.12 g/cc, or 0.10 g/cc to 0.12 g/cc, or 0.15 g/cc to 0.2 g/cc, or 0.15 g/cc to 0.30 g/cc, when determined using the Density Test Method described herein. In some aspects, the thermoplastic elastomer foams can have a density of from 0.15 g/cc to 0.22 g/cc, such as from 0.17 g/cc to 0.22 g/cc, or from 0.18 g/cc to 0.21 g/cc, when determined using the Density Test Method described herein. Alternatively or in addition, the thermoplastic elastomer foam can have a density of from 0.01 g/cc to 0.10 g/cc, or 0.02 g/cc to 0.08 g/cc, or 0.03 g/cc to 0.06 g/cc, or 0.08 g/cc to 0.15 g/cc, or 0.10 g/cc to 0.12 g/cc, when determined using the Density Test Method described herein. For example, the density of the thermoplastic elastomer foam can be from 0.15 g/cc to 0.2 g/cc, or 0.10 g/cc to 0.12 g/cc. The thermoplastic elastomer foam can be injection molded, or can be injection molded and subsequently compression molded. In some aspects, the thermoplastic elastomer foam has a density of about 0.7 g/cc or less, or 0.5 g/cc or less, or 0.4 g/cc or less, or 0.3 g/cc or less, or 0.2 g/cc or less, when determined using the Density Test Method described herein. In some aspects, the thermoplastic elastomer foam, including the thermoplastic elastomer foam present in midsoles and midsole components, can have a density of 0.05 g/cc to 0.25 g/cc, or 0.05 g/cc to 0.2 g/cc, or 0.05 g/cc to 0.15 g/cc, or 0.08 g/cc to 0.15 g/cc, or 0.08 g/cc to 0.20 g/cc, or 0.08 g/cc to 0.25 g/cc, or 0.10 g/cc to 0.15 g/cc, when determined using the Density Test Method described herein. In some aspects the thermoplastic elastomer foam has a density of about 0.15 g/cc to about 0.30 g/cc, or about 0.20 g/cc to about 0.35 g/cc, or about 0.15 g/cc to about 0.25 g/cc, when determined using the Density Test Method described herein. The thermoplastic elastomer foam article or article component can be formed by injection molding without a subsequent compression molding step. The thermoplastic elastomer foam can have an open-cell foam structure. The thermoplastic elastomer foam can be the foamed product of foaming a thermoplastic elastomer composition comprising less than 10 weight percent, or less than 5 weight percent, or less than 1 weight percent of non-polymeric ingredients based on a total weight of the thermoplastic elastomer composition.

The thermoplastic elastomer foam portion of the article or component of an article, including thermoplastic polyester foam portion, can have a stiffness of about 200 kPa to about 1000 kPa, or about 300 to about 900 kPa, or about 400 to about 800 kPa, or about 500 to about 700 kPa, when determined using the Cyclic Compression Test for a Sample with a 45 millimeter diameter cylindrical sample. The thermoplastic elastomer foam portion of the article or component of an article can have a stiffness of about 100 N/mm to about 400 N/mm, or about 150 N/mm to about 350 N/mm, or about 200 N/mm to about 300 N/mm, or about 225 N/mm to about 275 N/mm, when determined using the Cyclic Compression Test for a Foot Form with the foot form sample. The thermoplastic elastomer foam article or article component can be formed by injection molding without a subsequent compression molding step. The thermoplastic elastomer foam can have an open-cell foam structure. The thermoplastic elastomer foam can be the foamed product of foaming a thermoplastic elastomer composition comprising less than 10 weight percent, or less than 5 weight percent, or less than 1 weight percent of non-polymeric ingredients based on a total weight of the thermoplastic elastomer composition.

The thermoplastic elastomer foam portion of the article or component of an article, including a thermoplastic polyester portion, can have an Asker C durometer hardness of from about 30 to about 50, or from about 35 to about 45, or from about 30 to about 45, or from about 30 to about 40, when determined using the Durometer Hardness Test described herein. The thermoplastic elastomer foam article or article component can be formed by injection molding without a subsequent compression molding step. The thermoplastic elastomer foam can have an open-cell foam structure. The thermoplastic elastomer foam can be the foamed product of foaming a thermoplastic elastomer composition comprising less than 10 weight percent, or less than 5 weight percent, or less than 1 weight percent of non-polymeric ingredients based on a total weight of the thermoplastic elastomer composition.

The energy input of a foam is the integral of the force displacement curve during loading of the foam during the Cyclic Compression test. The energy return of a foam is the integral of the force displacement curve during unloading of the foam during the Cyclic Compression test. The thermoplastic elastomer foam portion of the article or component of an article, including a thermoplastic polyester foam portion, can have an energy return of about 200 millijoules (mJ) to about 1200 mJ, or from about 400 mJ to about 1000 mJ, or from about 600 mJ to about 800 mJ, when determined using the Cyclic Compression Test for a Sample with a 45 millimeter diameter cylindrical sample. The thermoplastic elastomer foam portion of the article or component of an article (e.g., footwear sole for a Men's US Size 10) can have an energy input of about 2000 millijoules (mJ) to about 9000 mJ, or from about 3000 mJ to about 8000 mJ, or from about 4500 mJ to about 6500 mJ, when determined using the Cyclic Compression Test for a Foot Form with the foot form sample. The thermoplastic elastomer foam article or article component can be formed by injection molding without a subsequent compression molding step. The thermoplastic elastomer foam can have an open-cell foam structure. The thermoplastic elastomer foam can be the foamed product of foaming a thermoplastic elastomer composition comprising less than 10 weight percent, or less than 5 weight percent, or less than 1 weight percent of non-polymeric ingredients based on a total weight of the thermoplastic elastomer composition.

The energy efficiency (EE), a measure of the percentage of energy of the thermoplastic elastomer foam portion of the article or component, including a thermoplastic polyester foam portion, returns when it is released after being compressed under load, which can provide improved performance for athletic footwear, e.g., for reducing energy loss or dissipation when running. This is especially true for running and other athletic footwear. In some aspects, the thermoplastic elastomer foam portion of the articles and components provided herein have an energy efficiency of at least 50 percent, or at least 60 percent, or at least 70 percent, or at least about 75 percent, or at least about 80 percent, or at least about 85 percent, when determined using the Cyclic Compression Test for a Sample with a 45 millimeter diameter cylindrical sample. The thermoplastic elastomer foam portion of the articles and components provided herein can have an energy efficiency of at about 50 percent to about 97 percent, or about 60 percent to about 95 percent, or about 60 percent to about 90 percent, or about 60 percent to about 85 percent, or about 65 percent to about 85 percent, or about 70 percent to about 85 percent, or about 70 percent to about 90 percent, or about 70 percent to about 95 percent, when determined using the Cyclic Compression Test for a Sample with a 45 millimeter diameter cylindrical sample. The thermoplastic elastomer foam article or article component can be formed by injection molding without a subsequent compression molding step. The thermoplastic elastomer foam can have an open-cell foam structure. The thermoplastic elastomer foam can be the foamed product of foaming a thermoplastic elastomer composition comprising less than 10 weight percent, or less than 5 weight percent, or less than 1 weight percent of non-polymeric ingredients based on a total weight of the thermoplastic elastomer composition.

The resulting foams can have a multicellular closed-cell or open-cell foam structure. Cells are the hollow structures formed during the foaming process, in which bubbles are formed in the thermoplastic elastomeric composition by the foaming agents. The cell walls are generally defined by the thermoplastic elastomeric composition. "Closed cells" form an individual volume that is fully enclosed and that is not in fluid communication with an adjoining individual volume. "Closed-cell structures" refer to foam structures in which at least 50 percent or more of the cells are closed cells, or at least 60 percent or more of the cells are closed cells, or at least 80 percent of the cells are closed cells, or at least 90 percent of the cells are closed cells, or at least 95 percent of the cells are closed cells. "Open-cell structures" refer to foam structures in which less than 50 percent, or less than 40 percent, or less than 20 percent, or less than 10 percent, or less than 5 percent or less than 4 percent, or less than 3 percent or less than 1 percent of the cells are closed cells.

The disclosed open-cell and closed-cell thermoplastic elastomer foams may have an average cell size (e.g., maximum width or length) linearly measured from one side of the cell to an opposing side of the cell. For example, in some aspects of this disclosure, open-cell and closed-cell thermoplastic elastomer foams may have an average cell size of from about 50 micrometers to about 1000 micrometers, or from about 80 micrometers to about 800 micrometers, or from about 100 micrometers to about 500 micrometers. These are example cell sizes of one aspect of this disclosure in which foams form portions of a footwear article, and in other aspects the cell sizes may be larger or smaller when foams form other footwear articles. In addition, open-cell and closed-cell thermoplastic elastomer foams may form all or a portion of a non-footwear article, and in those instances, the foams may have a cell diameter including these example cell sizes, smaller than these example cell sizes, larger than these example cell sizes, or any combination thereof.

For both open-cell and closed-cell structures, the proportion of cells in the thermoplastic elastomer foam having a cell diameter of about 50 micrometers to about 1000 micrometers is preferably not less than 40 percent relative to all the cells, or not less than 50 percent or not less than 60 percent relative to all the cells. If the proportion of cells is less than 40 percent, the cell structure will tend to be nonuniform and/or have a coarse cell structure. As used herein, a "coarse cell structure" refers to a foam structure in which the average cell diameter is greater than 1 millimeter, and/or for greater than 20 percent of the cells, a 1 millimeter line drawn across the largest dimension of the cell, will not cross a cell wall or a strut (i.e., an open cell wall or portion thereof).

The number of open cells and/or closed cells and cell diameter of the cells of the foam can be determined visually, for example by capturing an image of a cut surface with a camera or digital microscope, determining the number of cells, number of open cells and/or number of closed cells, and determining an area of a cell, and converting it to the equivalent circle diameter.

Methods of Manufacturing Disclosed Foams

In some examples, the disclosed foamed thermoplastic elastomer compositions can be prepared by various methods as disclosed herein and as known in the art. That is, disclosed articles or components of articles such as midsoles, midsole components, inserts and insert components can be prepared by injection molding a melt composition comprising a thermoplastic elastomer composition as described herein using a physical foaming agent, using a combination of a physical foaming agent and a chemical foaming agent, or using only a chemical foaming agent. A disclosed foam component, e.g., a disclosed foam article or component, can be prepared by the methods disclosed herein below.

Disclosed herein are methods for making a foam article or component, the method comprising: forming a mixture of a molten thermoplastic elastomer composition and a foaming agent; injecting the mixture into a mold cavity; foaming the thermoplastic elastomer composition, thereby forming a foamed thermoplastic elastomer composition; solidifying the foamed thermoplastic elastomer composition, thereby forming a foam article having a multicellular foam structure; and removing the foam article from the mold cavity. In some aspects, forming the mixture of the thermoplastic elastomer composition and the foaming agent comprises forming a single-phase solution of a liquid, gas or supercritical fluid foaming agent and the molten thermoplastic elastomer composition. In some aspects, the mixture is a single-phase solution of supercritical nitrogen or supercritical carbon dioxide and the thermoplastic elastomer composition. In a particular example, the mixture is a single-phase solution of supercritical nitrogen in a thermoplastic polyester composition. In some aspects, the thermoplastic elastomer composition comprises less than 10 weight percent, or less than 5 weight percent, or less than 1 weight percent of non-polymeric ingredients based on a total weight of the thermoplastic elastomer composition. In such aspects, injecting the mixture into a mold cavity can comprise injecting the single-phase solution into a mold cavity, then cooling the single-phase solution in the mold cavity prior to decreasing pressure in the mold cavity to a level at which the supercritical fluid phase transitions to a gas, and the gas drops out of solution in the molten polymer, forming gas bubbles in the molten polymer and foaming the molten polymer. In some aspects, the foaming forms a foam having an open-cell foam structure.

Also disclosed are methods for making a foam article or component, the method comprising: forming a mixture of a molten thermoplastic elastomer composition and a foaming agent; injecting the mixture into a mold cavity; foaming the molten thermoplastic elastomer composition in the mold cavity, thereby forming a thermoplastic elastomer foam; solidifying the thermoplastic elastomer foam in the mold cavity, thereby forming a molded foam article comprising a thermoplastic elastomer composition having a multicellular foam structure; and removing the molded foam article from the mold cavity. In some aspects, the temperature of the mixture at the point that it is foamed in the mold cavity is from about the melting temperature of the thermoplastic elastomer composition to about 50 degrees C. above the tail temperature of the thermoplastic elastomer composition. In some aspects, the melting temperature of the thermoplastic elastomer composition is the melting temperature of a polymeric component of the thermoplastic elastomer composition. In other aspects, the melting temperature of the thermoplastic elastomer composition is the melting temperature of a thermoplastic elastomer present in the thermoplastic elastomer composition. In yet other aspects, the melting temperature of the thermoplastic elastomer present in the thermoplastic elastomer composition is the melting temperature of the thermoplastic elastomer having the highest melting temperature of all polymers present in the polymeric component of the thermoplastic elastomer composition. In yet other aspects, the melting temperature is the melting temperature of a thermoplastic polyester, such as a polyester elastomer, present in the thermoplastic elastomer composition. The foaming can occur when the mixture is at a foaming temperature, wherein the foaming temperature is a temperature from about the melting temperature of the thermoplastic elastomer to about 50 degrees C. above the tail temperature of the thermoplastic elastomer. In some aspects, forming the mixture of the thermoplastic elastomer composition and a foaming agent comprises forming a single-phase solution of a supercritical fluid and the molten thermoplastic elastomer composition. The thermoplastic elastomer composition can comprise less than 10 weight percent, or less than 5 weight percent, or less than 1 weight percent of non-polymeric ingredients based on a total weight of the thermoplastic elastomer composition. If more than one thermoplastic elastomer is present in the thermoplastic elastomer composition, the melting temperature can be the highest melting temperature of the thermoplastic elastomers present in the composition. In such aspects, injecting the mixture into a mold cavity can comprise injecting the single-phase solution into a mold cavity, then cooling the single-phase solution in the mold cavity prior to decreasing pressure in the mold cavity to a level at which the supercritical fluid phase transitions to a gas, and the gas drops out of solution in the thermoplastic elastomer composition, forming gas bubbles in the thermoplastic elastomer composition and foaming the thermoplastic elastomer. The foaming can form a foam having an open-cell foam structure.

Dynamic scanning calorimetry (DSC) is used to determine the melting temperature and the tail temperature of the thermoplastic elastomer composition, or of the polymeric component of the thermoplastic elastomer composition, or of an individual thermoplastic elastomer present in the thermoplastic elastomer composition, and an exemplary method is described herein below. Briefly, 10-30 mg pieces of undried resin pellets are cycled from −90 degrees C. to 225 degrees C. at 20 degrees C./min and cooled to −90 degrees C. at 10 degrees C./min. In some instances, experiments are run using a heat-cool-heat profile with a ramp rate of 10 degrees C. per min, minimum temperature of 0 degrees C. and maximum temperature of 250 degrees C. Analyses should be determined in duplicate. The melting temperature and glass transition temperature values are recorded from the second cycle. The melt "peak" is identified as the local maximum of the second heating cycle. If there is more than one peak in the DSC curve, the peak occurring at hotter temperatures is chosen as the temperature reference. The tail is identified as the intersection of the tangent of the line of the higher temperature side of the melt peak with the extrapolated baseline.

The disclosed foamed thermoplastic elastomer compositions can be prepared using a suitable injector. The injector can have a motor to turn a screw inside the injector. The injector may include a single screw or twin screws, and may include individual elements of various sizes and pitches appropriate for mixing or kneading the specific materials used.

The various components included in the foamed thermoplastic elastomer compositions described herein can be added into the injector through one or more ports. The various components can be added as a melt or as appropriately-sized solid particles, for example chips or pellets, which may be melted as they are mixed in the barrel of the injector. The contents of the injector can be heated to melt the composition. A physical foaming agent such as, for example, a supercritical fluid can be added into the melt while it is present in the barrel of the injector. In one example, thermoplastic polyester foam is prepared by using a physical foaming agent which foams the composition in the mold cavity, and the resulting thermoplastic elastomer foam is thus substantially free of unreacted chemical blowing agents or a decomposition or degradation product of a chemical blowing agent. The thermoplastic elastomer composition can be added to the injector as a melt at a temperature close to the melting temperature of the polymeric component of the composition.

If a chemical foaming agent is used, the processing (melting) temperature used can be sufficiently below the temperature that would trigger the chemical foaming agent. In order to foam the composition, the temperature near the exit of the injector or within the mold cavity can be increased to a temperature close to or at the triggering temperature of the chemical foaming agent, thereby producing a chemically foamed thermoplastic polyester foam as the composition exits the injector (e.g., as the composition is injected into a mold cavity), or within the mold cavity. Additionally or alternatively, the temperature of the runners leading to the mold cavity or the mold cavity or both can be a temperature at or above the triggering temperature of the chemical foaming agent, thereby producing a chemically foamed thermoplastic elastomer foam within the runners and/or the mold cavity.

Alternatively or in addition, a physical foaming agent can be used to foam the thermoplastic elastomer composition to form a physically foamed thermoplastic elastomer foam, or a physically and chemically foamed thermoplastic elastomer foam. For example, a supercritical fluid such as supercritical carbon dioxide or supercritical nitrogen can be mixed with the molten thermoplastic elastomer composition in the barrel of the injector to form a single-phase solution. A pressure drop can be used to cause the supercritical fluid to transition to the gas phase and foam the thermoplastic elastomer composition. In one aspect, a gas counter-pressure can be applied to the mold cavity and to the runners leading to the mold cavity. The counter pressure can be a pressure sufficiently high to keep the supercritical fluid in solution within the runners and the mold cavity. Once a dose of the single-phase solution is in the mold cavity, the counter-pressure within the mold cavity can be decreased to a level at which the supercritical fluid phase transitions to a gas and drops out of solution in the molten thermoplastic elastomer composition, forming gas bubbles in the thermoplastic elastomer composition and foaming the thermoplastic elastomer composition in the mold cavity. In one aspect the thermoplastic elastomer composition comprises less than 10 weight percent, or less than 5 weight percent, or less than 1 weight percent of non-polymeric ingredients based on a total weight of the thermoplastic elastomer composition, and the multi-cellular foam has an open-cell structure.

The articles, cushioning elements, or components of articles such as midsoles, midsole components, inserts and insert components can be prepared by injection molding a thermoplastic elastomer composition described herein using a physical foaming agent. The injection molding process can use a screw-type injector that allows for maintaining and controlling the pressure in the injector barrel. The injection molding machine can allow metering and delivering a supercritical fluid such as carbon dioxide or nitrogen into the thermoplastic elastomer composition prior to injection. The supercritical fluid can be mixed into the thermoplastic elastomer composition within the injection barrel and then injected into the mold cavity. When the temperature and/or pressure is altered to the point that the solubility of the supercritical fluid in the molten thermoplastic elastomer composition is altered and the supercritical fluid transitions to the gas phase, these physical processes will cause expansion (foaming) of the molten thermoplastic elastomer composition. The injection molding process can include physical foaming of the compositions described herein using an injection molding process which forms a multicellular foam structure, such as, for example the "MUCELL" process (Trexel Inc., Wilmington, Mass., USA).

The thermoplastic elastomer foams described herein can be made using a process that involves impregnating a thermoplastic elastomer composition (e.g., at or above a softening temperature of the composition) with a physical foaming agent at a first concentration or first pressure. As used herein, the term "impregnating" generally means dissolving or suspending a physical foaming agent in a composition. The impregnated composition can then be foamed, or can be cooled (when applicable) and re-softened (when applicable) for foaming at a later time. In some aspects, the impregnated molten thermoplastic elastomer composition forms a single-phase solution comprising a supercritical fluid (e.g., carbon dioxide or nitrogen) dissolved in the molten thermoplastic elastomer composition. In one aspect, the thermoplastic elastomer composition comprises less than 10 weight percent, or less than 5 weight percent, or less than 1 weight percent of non-polymeric ingredients based on a total weight of the thermoplastic elastomer composition.

The impregnated thermoplastic elastomer composition (e.g., the single-phase solution) is foamed by reducing the solubility of the physical foaming agent in the thermoplastic elastomer composition through pressure and/or temperature changes. The pressure and/or temperature change can occur immediately after the impregnated composition exits the injector or the injection barrel, or can occur in the runners leading to the mold cavity, or can occur in the mold cavity. For example, the system can include hot runners or gas counter-pressure or both, which control the temperature and pressure under which the impregnated composition is held, up to and including the point at which the composition enters the mold cavity. In some aspects, the temperature and pressure under which the impregnated composition is held are controlled such that the impregnated composition remains a single-phase solution up to and including the point it enters the mold cavity. Once the single-phase solution has flowed into the mold cavity, the temperature or the pressure or both can be altered to reduce the solubility of the supercritical fluid in the molten thermoplastic elastomer composition, causing the molten thermoplastic elastomer composition to expand into a foam, including a foam having an open-cell foam structure. The reduction in solubility of the physical foaming agent can release additional amounts of gas (e.g., to create a secondary expansion of a partially-foamed thermoplastic elastomer composition), to further expand the composition, forming a foam structure (e.g., a foam having a multicellular structure). Alternatively or additionally, a chemical blowing agent can be activated in the thermoplastic elastomer composition in the mold cavity to create a secondary expansion of a partially-foamed thermoplastic elastomer composition.

Chemical foaming agents may be endothermic or exothermic, which refers to a type of decomposition or degradation they undergo to produce the gas used to produce the foam. The decomposition or degradation may be triggered by thermal energy present in the molding system. Endothermic foaming agents absorb energy and typically release a gas, such as carbon dioxide, upon decomposition. Exothermic foaming agents release energy and generate a gas, such as nitrogen, when decomposed. Regardless of the chemical foaming agent used, thermal variables of the thermoplastic elastomer composition being foamed and thermal variables of the foaming agent to be decomposed or degraded are coupled together such that process parameters are selected so that the thermoplastic elastomer composition can be foamed and molded and the foaming agent can decompose or degrade at an appropriate phase of the foaming and molding process.

Thermoplastic Elastomer Composition

Thermoplastic elastomer compositions disclosed herein include one or more thermoplastic elastomers. The one or more thermoplastic elastomers can be one or more thermoplastic polyester elastomers. In some aspects, the thermoplastic elastomer composition includes at least 90 percent, or at least 95 weight percent, or at least 99 weight percent of a thermoplastic resin component, based on the total weight of the thermoplastic elastomer composition, where thermoplastic resin component includes all the polymers present in the composition. Thermoplastic resin component comprises one or more thermoplastic elastomers. Thermoplastic resin component can comprise at least one thermoplastic polyester elastomer. Thermoplastic resin component can comprise more than one thermoplastic polyester elastomer. Thermoplastic resin component can comprise one or more thermoplastic polyester elastomer, and one or more thermoplastic polyester which is not an elastomer. In some aspects, thermoplastic resin component comprises the one or more thermoplastic polyester, and further comprises one or more thermoplastic polymers each of which is not a polyester. The one or more thermoplastic polymers each of which is not a polyester can each be a thermoplastic elastomer. Alternatively, in other aspects, thermoplastic resin component consists essentially of the one or more thermoplastic elastomer. Optionally, thermoplastic resin component can consist essentially of one or more thermoplastic polyester elastomer. In some aspects, the thermoplastic elastomer composition comprises less than 10 weight percent, or less than 5 weight percent, or less than 1 weight percent of non-polymeric ingredients based on the total weight of the thermoplastic elastomer composition. In some aspects, the thermoplastic elastomer composition is substantially free of non-polymeric nucleating agents, or is substantially free of non-polymeric fillers, or is substantially free of coloring agents, or is substantially free of non-polymeric processing aids, or is substantially free of both non-polymeric nucleating agents and non-polymeric fillers, or is substantially free of non-polymeric nucleating agents, non-polymeric fillers, coloring agents, and non-polymeric processing aids. In some such aspects, the thermoplastic elastomer composition comprises less than 10 weight percent, or less than 5 weight percent, or less than 1 weight percent of solid coloring agents, based on the total weight of the thermoplastic elastomer composition. In one aspect, the thermoplastic elastomer composition consists essentially of one or more thermoplastic elastomers. In another aspect, the thermoplastic elastomer composition consists essentially of one or more thermoplastic polyester elastomers. It should be understood that a thermoplastic polyester elastomer can refer to a thermoplastic polyester homopolymer elastomer, a thermoplastic copolyester elastomer, or both. In aspects, the thermoplastic copolyester elastomer can include copolyesters having two or more types of polyester monomeric segments, or copolyesters comprising polyester monomeric segments and one or more non-polyester monomeric segments.

In some aspects, the resin component of the thermoplastic elastomer composition, which is comprised of all the polymeric materials present in thermoplastic polyester composition, consists essentially of the one or more thermoplastic elastomers, or consists essentially of the one or more thermoplastic polyesters. Thermoplastic polyesters can include chain units derived from one or more olefins and chain units derived from one or more ethylenically-unsaturated acid groups, in aspects.

The thermoplastic elastomer compositions can have a melt flow index of from about 5 to about 40, or about 10 to about 20, or about 20 to about 30 as determined at 210 degrees C. using a 2.16 kilogram weight. Alternatively or additionally, the thermoplastic elastomer compositions can have a melt flow index of from about 5 to about 40, or about 10 about 20, or about 20 to about 30 as determined at 220 degrees C. using a 2.16 kilogram weight. Alternatively or additionally, the thermoplastic elastomer compositions can have a melt flow index of from about 5 to about 40, or about 10 to about 20, or about 20 to about 30 as determined at 230 degrees C. using a 2.16 kilogram weight.

The thermoplastic elastomer, including thermoplastic polyester, can have a weight average molecular weight of about 50,000 Daltons to about 1,000,000 Daltons; or about 50,000 Daltons to about 500,000 Daltons; or about 75,000 Daltons to about 300,000 Daltons; or about 100,000 Daltons to about 250,000 Daltons; or about 100,000 Daltons to about 500,000 Daltons.

The thermoplastic elastomers, including thermoplastic copolyesters, can be terpolymers. In some aspects, thermoplastic copolyesters can be terpolymers of moieties derived from ethylene, acrylic acid, and methyl acrylate or butyl acrylate. In some aspects, a ratio of a total parts by weight of the acrylic acid in thermoplastic copolyesters to a total weight of thermoplastic copolyesters is about 0.05 to about 0.6, or about 0.1 to about 0.6, or about 0.1 to about 0.5, or about 0.15 to about 0.5, or about 0.2 to about 0.5.

The thermoplastic elastomers can be terpolymers comprising a plurality of first segments, a plurality of second segments, and a plurality of third segments. In some aspects, the thermoplastic elastomer is a thermoplastic copolyester comprising: (a) a plurality of first segments, each first segment derived from a dihydroxy-terminated polydiol; (b) a plurality of second segments, each second segment derived from a diol; and (c) a plurality of third segments, each third segment derived from an aromatic dicarboxylic acid. In various aspects, thermoplastic copolyester is a block copolymer. In some aspects, thermoplastic copolyester is a segmented copolymer. In further aspects, thermoplastic copolyester is a random copolymer. In still further aspects, thermoplastic copolyester is a condensation copolymer.

The thermoplastic elastomer, including thermoplastic copolyester, can have a ratio of first segments to third segments from about 1:1 to about 1:5 based on the weight of each of the first segments and the third segments; or about 1:1 to about 1:4 based on the weight of each of the first segments and the third segments; or about 1:1 to about 1:2 based on the weight of each of the first segments and the third segments; or about 1:1 to about 1:3 based on the weight of each of the first segments and the third segments.

The thermoplastic elastomer, including thermoplastic copolyester, can have a ratio of second segments to third segments from about 1:1 to about 1:2 based on the weight of each of the first segments and the third segments; or about 1:1 to about 1:1.52 based on the weight of each of the first segments and the third segment.

The thermoplastic elastomer, including thermoplastic copolyester, can have first segments derived from a poly (alkylene oxide)diol having a number-average molecular weight of about 250 Daltons to about 6000 Daltons; or about 400 Daltons to about 6,000 Daltons; or about 350 Daltons to about 5,000 Daltons; or about 500 Daltons to about 3,000 Daltons; or about 2,000 Daltons to about 3,000 Daltons.

The thermoplastic elastomer, including thermoplastic copolyester, can have first segments derived from a poly(alkylene oxide)diol such as poly(ethylene ether)diol; poly(propylene ether)diol; poly(tetramethylene ether)diol; poly(pentamethylene ether)diol; poly(hexamethylene ether)diol; poly(heptamethylene ether)diol; poly(octamethylene ether)diol; poly(nonamethylene ether)diol; poly(decamethylene ether)diol; or mixtures thereof. In a still further aspect, thermoplastic copolyester can have first segments derived from a poly(alkylene oxide)diol such as poly(ethylene ether)diol; poly(propylene ether)diol; poly(tetramethylene ether)diol; poly(pentamethylene ether)diol; poly(hexamethylene ether)diol. In a yet further aspect, thermoplastic copolyester can have first segments derived from a poly(tetramethylene ether)diol.

The thermoplastic elastomer, including thermoplastic copolyester, can have second segments derived from a diol having a molecular weight of less than about 250. The diol from which the second segments are derived can be a C2-C8 diol. In a still further aspect, the second segments can be derived from ethanediol; propanediol; butanediol; pentanediol; 2-methyl propanediol; 2,2-dimethyl propanediol; hexanediol; 1,2-dihydroxy cyclohexane; 1,3-dihydroxy cyclohexane; 1,4-dihydroxy cyclohexane; and mixtures thereof. In a yet further aspect, the second segments can be derived from 1,2-ethanediol, 1,3-propanediol, 1,4-butanediol, 1,6-hexanediol, and mixtures thereof. In an even further aspect, the second segments can be derived from 1,2-ethanediol. In a still further aspect, the second segments can be derived from 1,4-butanediol.

The thermoplastic elastomer, including the copolyester, can have third segments derived from an aromatic C5-C16 dicarboxylic acid. The aromatic C5-C16 dicarboxylic acid can have a molecular weight less than about 300 Daltons; about 120 Daltons to about 200 Daltons; or a value or values of molecular weight within any of the foregoing ranges or a molecular weight range encompassing any sub-range of the foregoing ranges. In some instances, the aromatic C5-C16 dicarboxylic acid is terephthalic acid, phthalic acid, isophthalic acid, or a derivative thereof. In a still further aspect, the aromatic C5-C16 dicarboxylic acid is a diester derivative of the terephthalic acid, phthalic acid, or isophthalic acid. In a yet further aspect, the aromatic C5-C16 dicarboxylic acid is terephthalic acid or the dimethyl ester derivative thereof.

Thermoplastic copolyester can comprise: (a) a plurality of first copolyester units, each first copolyester unit of the plurality comprising the first segment derived from a dihydroxy-terminated polydiol and the third segment derived from an aromatic dicarboxylic acid, wherein the first copolyester unit has a structure represented by a Formula 1:

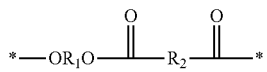

(Formula 1)

wherein $R_1$ is a group remaining after removal of terminal hydroxyl groups from the poly(alkylene oxide) diol of the first segment, wherein the poly(alkylene oxide) diol of the first segment is a poly(alkylene oxide) diol having a number-average molecular weight of about 400 to about 6000; and wherein $R_2$ is a group remaining after removal of carboxyl groups from the aromatic dicarboxylic acid of the third segment; and (b) a plurality of second copolyester units, each second copolyester unit of the plurality comprising the second segment derived from a diol and the third segment derived from an aromatic dicarboxylic acid, wherein the second copolyester unit has a structure represented by a Formula 2:

(Formula 2)

wherein $R_3$ is a group remaining after removal of hydroxyl groups from the diol of the second segment derived from a diol, wherein the diol is a diol having a molecular weight of less than about 250; and wherein $R_2$ is the group remaining after removal of carboxyl groups from the aromatic dicarboxylic acid of the third segment.

Thermoplastic copolyester can comprise a plurality of first copolyester units having a structure represented by a Formula 3:

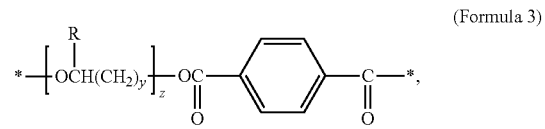

(Formula 3)

wherein R is H or methyl; wherein y is an integer having a value from 1 to 10; wherein z is an integer having a value from 2 to 60; and wherein a weight average molecular weight of each of the plurality of first copolyester units is from about 300 Daltons to about 7,000 Daltons. In some aspects, in the foregoing formula, y can be an integer having a value of 1, 2, 3, 4, 5, 6, 7, 8, 9, 10; or y can be any set or range of the foregoing integer values. In some aspects, in the foregoing formula, z is an integer having a value from 5 to 60; an integer having a value from 5 to 50; an integer having a value from 5 to 40; an integer having a value from 4 to 30; an integer having a value from 4 to 20; an integer having a value from 2 to 10; or z can be any set or range of the foregoing integer values. In some aspects, R is hydrogen. In a still further aspect, R is methyl. In some instances, R is hydrogen and y is an integer having a value of 1, 2, or 3. Alternatively, in other instances, R is methyl and y is an integer having a value of 1.

Thermoplastic copolyester can comprise a plurality of first copolyester units having a structure represented by a Formula 4:

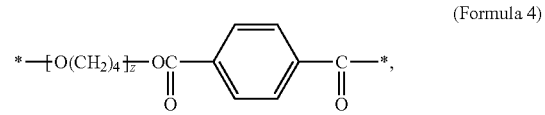

(Formula 4)

wherein z is an integer having a value from 2 to 60; and wherein a weight average molecular weight of each of the plurality of first copolyester units is from about 300 Daltons to about 7,000 Daltons. In some aspects, in the foregoing formula, y can be an integer having a value of 1, 2, 3, 4, 5, 6, 7, 8, 9, 10; or y can be any set or range of the foregoing integer values. In some aspects, in the foregoing formula, z is an integer having a value from 5 to 60; or an integer having a value from 5 to 50; or an integer having a value from 5 to 40; or an integer having a value from 4 to 30; or an integer having a value from 4 to 20; or an integer having a value from 2 to 10.

Thermoplastic copolyester can comprise a plurality of first copolyester units having a weight average molecular weight from about 400 Daltons to about 6,000 Daltons; or about 400 Daltons to about 5,000 Daltons; or about 400 Daltons to about 4,000 Daltons; or about 400 Daltons to about 3,000 Daltons; or about 500 Daltons to about 6,000 Daltons; or about 500 Daltons to about 5,000 Daltons; or about 500 Daltons to about 4,000 Daltons; or about 500 Daltons to about 3,000 Daltons; or about 600 Daltons to about 6,000 Daltons; or about 600 Daltons to about 5,000 Daltons; or about 600 Daltons to about 4,000 Daltons; or about 600 Daltons to about 3,000 Daltons; or about 2,000 Daltons to about 3,000 Daltons.

Thermoplastic copolyester can comprise a plurality of second copolyester units, each second copolyester unit of the plurality having a structure represented by a Formula 5:

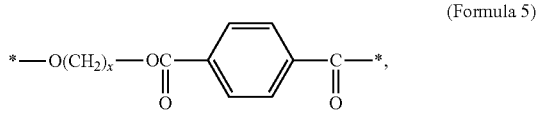

(Formula 5)

wherein x is an integer having a value from 1 to 20; wherein the foam article has a multicellular closed-cell or open-cell foam structure. In some aspects, in the foregoing formula, x is an integer having a value from 2 to 18; 2 to 17; 2 to 16; 2 to 15; 2 to 14; 2 to 13; 2 to 12; 2 to 11; 2 to 10; 2 to 9; 2 to 8; 2 to 7; 2 to 6; 2 to 5; 2 to 4; or x can be any integer value or set of integer values within the foregoing ranges or values, or any range of integer values encompassing a sub-range of the foregoing integer value ranges. In a further aspect, x is an integer having a value of 2, 3, or 4.

Thermoplastic copolyester can comprise a plurality of second copolyester units, each second copolyester unit of the plurality having a structure represented by a Formula 6:

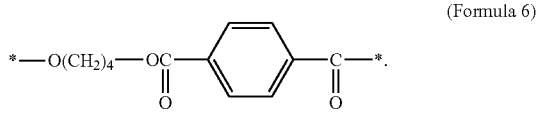

(Formula 6)

Thermoplastic copolyester can comprise a weight percent range of the plurality of first copolyester units based on total weight of thermoplastic copolyester such that the weight percent range is about 30 weight percent to about 80 weight percent; or about 40 weight percent to about 80 weight percent; or about 50 weight percent to about 80 weight percent; or about 30 weight percent to about 70 weight percent; or about 40 weight percent to about 70 weight percent; or about 50 weight percent to about 70 weight percent; or about 40 weight percent to about 65 weight percent; or about 45 weight percent to about 65 weight percent; or about 50 weight percent to about 65 weight; or about 55 weight percent to about 65 weight percent; or about 40 weight percent to about 60 weight percent; or about 45 weight percent to about 60 weight percent; or about 50 weight percent to about 60 weight percent; or about 55 weight percent to about 60 weight percent.

In some aspects, the thermoplastic elastomer, including thermoplastic copolyester, can comprise phase separated domains. For example, a plurality of first segments derived from a dihydroxy-terminated polydiol can phase-separate into domains comprising primarily the first segments. Moreover, a plurality of second segments derived from a diol can phase-separate into domains comprising primarily the second segments. In other aspects, thermoplastic copolyester can comprise phase-separated domains comprising primarily of a plurality of first copolyester units, each first copolyester unit of the plurality comprising the first segment derived from a dihydroxy-terminated polydiol and the third segment derived from an aromatic dicarboxylic acid, wherein the first copolyester unit has a structure represented by a Formula 1:

(Formula 1)

wherein $R_1$ is a group remaining after removal of terminal hydroxyl groups from the poly(alkylene oxide) diol of the first segment, wherein the poly(alkylene oxide) diol of the first segment is a poly(alkylene oxide) diol having a number-average molecular weight of about 400 to about 6000; and wherein $R_2$ is a group remaining after removal of carboxyl groups from the aromatic dicarboxylic acid of the third segment; and other phase-separated domains comprising primarily of a plurality of second copolyester units, each second copolyester unit of the plurality comprising the second segment derived from a diol and the third segment derived from an aromatic dicarboxylic acid, wherein the second copolyester unit has a structure represented by a Formula 2:

(Formula 2)

wherein $R_3$ is a group remaining after removal of hydroxyl groups from the diol of the second segment derived from a diol, wherein the diol is a diol having a molecular weight of less than about 250; and wherein $R_2$ is the group remaining after removal of carboxyl groups from the aromatic dicarboxylic acid of the third segment.

In other aspects, thermoplastic copolyester can comprise phase-separated domains comprising primarily of a plurality of first copolyester units, each first copolyester unit of the plurality having a structure represented by a Formula 3:

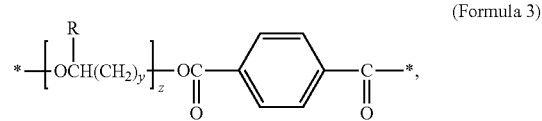

(Formula 3)

wherein R is H or methyl; wherein y is an integer having a value from 1 to 10; wherein z is an integer having a value from 2 to 60; and wherein a weight average molecular weight of each of the plurality of first copolyester units is from about 300 Daltons to about 7,000 Daltons. In some aspects, in the foregoing formula, y can be an integer having a value of 1, 2, 3, 4, 5, 6, 7, 8, 9, 10; or y can be any set or range of the foregoing integer values. In some aspects, in the foregoing formula, z is an integer having a value from 5 to 60; an integer having a value from 5 to 50; an integer having a value from 5 to 40; an integer having a value from 4 to 30; an integer having a value from 4 to 20; an integer having a value from 2 to 10; or z can be any set or range of the foregoing integer values. In some aspects, R is hydrogen. In a still further aspect, R is methyl. In some instances, R is hydrogen and y is an integer having a value of 1, 2, or 3. Alternatively, in other instances, R is methyl and y is an integer having a value of 1.

In other aspects, thermoplastic copolyester can comprise phase-separated domains comprising primarily of a plurality of first copolyester units, each first copolyester unit of the plurality having a structure represented by a Formula 4:

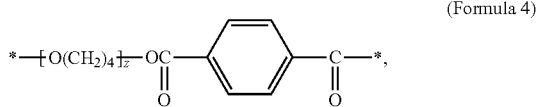

(Formula 4)

wherein z is an integer having a value from 2 to 60; and wherein a weight average molecular weight of each of the plurality of first copolyester units is from about 300 Daltons to about 7,000 Daltons. In some aspects, in the foregoing formula, y can be an integer having a value of 1, 2, 3, 4, 5, 6, 7, 8, 9, 10; or y can be any set or range of the foregoing integer values. In some aspects, in the foregoing formula, z is an integer having a value from 5 to 60; or an integer having a value from 5 to 50; or an integer having a value from 5 to 40; or an integer having a value from 4 to 30; or an integer having a value from 4 to 20; or an integer having a value from 2 to 10.

Thermoplastic copolyester can comprise phase-separated domains comprising primarily of a plurality of first copolyester units having a weight average molecular weight from about 400 Daltons to about 6,000 Daltons; or about 400 Daltons to about 5,000 Daltons; or about 400 Daltons to about 4,000 Daltons; or about 400 Daltons to about 3,000 Daltons; or about 500 Daltons to about 6,000 Daltons; or about 500 Daltons to about 5,000 Daltons; or about 500 Daltons to about 4,000 Daltons; or about 500 Daltons to about 3,000 Daltons; or about 600 Daltons to about 6,000 Daltons; or about 600 Daltons to about 5,000 Daltons; or about 600 Daltons to about 4,000 Daltons; or about 600 Daltons to about 3,000 Daltons; or about 2,000 Daltons to about 3,000 Daltons In other aspects, thermoplastic copolyester can comprise phase-separated domains comprising a plurality of second copolyester units, each second copolyester unit of the plurality having a structure represented by a Formula 5:

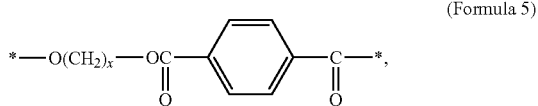

(Formula 5)

wherein x is an integer having a value from 1 to 20; wherein the foam article has a multicellular closed-cell or open-cell foam structure. In some aspects, in the foregoing formula, x is an integer having a value from 2 to 18; or 2 to 17; or 2 to 16; or 2 to 15; or 2 to 14; or 2 to 13; or 2 to 12; or 2 to 11; or 2 to 10; or 2 to 9; or 2 to 8; or 2 to 7; or 2 to 6; or 2 to 5; or 2 to 4.

In other aspects, thermoplastic copolyester can comprise phase-separated domains comprising a plurality of second copolyester units, each second copolyester unit of the plurality having a structure represented by a Formula 6:

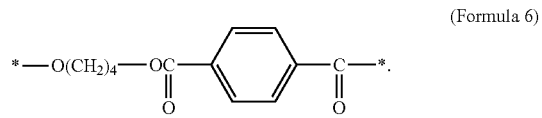

(Formula 6)

Thermoplastic copolyester can comprise phase-separated domains comprising a weight percent range of the plurality of first copolyester units based on total weight of thermoplastic copolyester such that the weight percent range is about 30 weight percent to about 80 weight percent; or about 40 weight percent to about 80 weight percent; or about 50 weight percent to about 80 weight percent; or about 30 weight percent to about 70 weight percent; or about 40 weight percent to about 70 weight percent; or about 50 weight percent to about 70 weight percent; or about 40 weight percent to about 65 weight percent; or about 45 weight percent to about 65 weight percent; or about 50 weight percent to about 65 weight percent; or about 55 weight percent to about 65 weight percent; or about 40 weight percent to about 60 weight percent; or about 45 weight percent to about 60 weight percent; or about 50 weight percent to about 60 weight percent; or about 55 weight percent to about 60 weight percent.

In various aspects, the thermoplastic elastomer composition can include one or more thermoplastic polyester homopolymer, where the thermoplastic polyester homopolymer comprises any of the polyester monomeric segments or units disclosed herein or modifications thereof. In the same or alternative aspects, the thermoplastic elastomer composition can include one or more thermoplastic polyester homopolymer, where the thermoplastic polyester homopolymer comprises any polyester homopolymer exhibiting any or all of the properties and parameters discussed herein with respect to thermoplastic elastomers and/or the thermoplastic elastomer composition.

The disclosed thermoplastic elastomer composition, the polymeric component of the composition or an individual thermoplastic elastomer in neat form can be characterized by one or more properties. In some aspects, the thermoplastic elastomer composition or the polymeric component, or the polymer has a maximum load of about 10 newtons to about 100 newtons, or from about 15 newtons to about 50 newtons, or from about 20 newtons to about 40 newtons, when determined using the Cyclic Tensile Test method described herein.

The tensile strength of the thermoplastic elastomer composition or of the polymeric component of the thermoplastic elastomer composition or of a thermoplastic elastomer in neat form is another important physical characteristic. The thermoplastic elastomer composition or polymeric component or elastomer can have a tensile strength of from 5 kilograms per square centimeter to 25 kilograms per square centimeter, or of from 10 kilograms per square centimeter to 23 kilograms per square centimeter, or of from 15 kilograms per square centimeter to 22 kilograms per square centimeter, when determined using the Cyclic Tensile Test method described herein.

The thermoplastic elastomer composition or polymeric component of the thermoplastic elastomer composition or a thermoplastic elastomer in neat form can have a tensile modulus of about 2 megapascals to about 20 megapascals or from about 5 megapascals to about 15 megapascals when determined using the Cyclic Tensile Test method described herein.

Exemplary, but non-limiting, thermoplastic elastomers, including thermoplastic polyesters, that can be used in the disclosed methods, foams, and articles include "HYTREL" 3078, "HYTREL" 4068, and "HYTREL" 4556 (DuPont, Wilmington, Del., USA); "PELPRENE" P30B, P40B, and P40H (Toyobo U.S.A. Inc., New York, N.Y., USA); "TRIEL" 5300, "TRIEL" 5400, and blends thereof (Samyang Corporation, Korea); "KEYFLEX" BT1028D, BT1033D, BT1035D, BT1040D, BT1045D, and BT1047D (LG Chem, Korea); and "KOPEL" KP3340, KP3346, KP3347 (Kolon Plastics, Inc., Korea).

The disclosed thermoplastic elastomer compositions can further include one or more ionomers, such as any of the "SURLYN" polymers (DuPont, Wilmington, Del., USA). Foams as described herein can be made by a process/method including receiving a composition described herein, and physically foaming the composition to form a thermoplastic elastomer foam having a density of about 0.7 gram per cubic centimeter or less, or 0.5 gram per cubic centimeter or less, or 0.4 gram per cubic centimeter or less, or 0.3 gram per cubic centimeter or less.

The disclosed thermoplastic elastomer compositions can further include one or more thermoplastic polyurethanes, such as "FORTIMO" (Mitsui Chemicals, Inc., Tokyo, Japan); "TEXIN" (Covestro LLC, Pittsburgh, Pa., USA); and "BOUNCELL-X" (Lubrizol Advanced Materials, Inc., Brecksville, Ohio, USA).

The disclosed thermoplastic elastomer compositions can further include one or more olefinic polymers. Olefinic polymers can include ethylene-based copolymers, propylene-based copolymers, and butene-based copolymers. In some aspects, the olefinic polymer is an ethylene-based copolymer such as a styrene-ethylene/butylene-styrene (SEBS) copolymer; an ethylene-propylene diene monomer (EPDM) copolymer; an ethylene-vinyl acetate (EVA) copolymer; an ethylene alkyl acrylate (EAA) copolymer; an ethylene alkyl methacrylate (EAMA) copolymer; any copolymer thereof, and any blend thereof. In some aspects, a ratio V of a total parts by weight of the olefinic polymers present in the composition to a total parts by weight of thermoplastic polyesters in the composition is about 0.0 to about 0.6, or about 0.0 to about 0.4, or about 0.01 to about 0.4, or about 0.01 to about 0.6, or about 0.1 to about 0.4.

The disclosed thermoplastic elastomer compositions can further include an ethylene-vinyl acetate (EVA) copolymer. The ethylene-vinyl acetate (EVA) copolymer can have a range of vinyl acetate contents, for example about 50 percent to about 90 percent, or about 50 percent to about 80 percent, or about 5 percent to about 50 percent, or about 10 percent to about 45 percent, or about 10 percent to about 30 percent, or about 30 percent to about 45 percent, or about 20 percent to about 35 percent, based on the weight of the copolymer.

Thermoplastic Elastomer Composition Characterization

Component Sampling Procedure

This procedure can be used to obtain a sample of a foam composition or material when the composition or material is incorporated into a component such as a sole structure or midsole or outsole of an article of footwear. A sample of the component which includes the composition or material is obtained as formed into the component, or cut from the article of footwear using a blade. This process is performed by separating the component from an associated footwear upper, if present, and removing any materials from the article's top surface (e.g., corresponding to the top surface). For example, the article's top surface can be skinned, abraded, scraped, or otherwise cleaned to remove any upper adhesives, yarns, fibers, foams, and the like that could potentially interfere with the test results.

The resulting component sample includes the composition or material. As such, any test using a Component Sampling Procedure can simulate how the composition or material will perform as part of an article of footwear. As specified by the test method, the component may be tested as a full component (e.g., full midsole component), or it can be extracted as a sample having a certain geometry. A sample of a component is taken at a location along the component that provides a substantially constant thickness for the component (within plus or minus 10 percent of the average thickness), such as in a forefoot region, mid-foot region, or a heel region of the article. Unless otherwise specified, the desired harvested geometry is a cylindrical puck with a 45-millimeter diameter and a cylinder height of at least about 10 millimeters, preferably from about 20 to 25 millimeters.

Density Test

The density is measured for samples taken using the Component Sampling Procedure, using a digital balance or a Densicom Tester (Qualitest, Plantation, Fla., USA). For each sample a sample volume is determined in cubic centimeters, and then each sample is weighed (g). The density of the sample is the mass divided by the sample volume, given in grams/cubic centimeters.

Specific Gravity Test

This test is appropriate for testing closed-cell foams, and samples of open-cell foams having a substantially uniform closed skin. The specific gravity (SG) is measured for samples taken using the Component Sampling Procedure, using a digital balance or a Densicom Tester (Qualitest, Plantation, Fla., USA). Each sample is weighed (g) and then is submerged in a distilled water bath (at 22 degrees C. plus or minus 2 degrees C.). To avoid errors, air bubbles on the surface of the samples are removed, e.g., by wiping isopropyl alcohol on the sample before immersing the sample in water, or using a brush after the sample is immersed. The weight of the sample in the distilled water is recorded. The specific gravity is calculated with the following formula:

$$S.G. = \frac{\text{Weight of the sample in air(g)}}{\text{Weight of sample in air(g)} - \text{Weight of sample in water(g)}}$$

Force/Displacement Test (Cyclic Compression Test for a Foot Form)

Force/displacement behavior for the foams and the foamed articles may be measured using a full midsole sample, a full outsole sample, a split midsole and/or a split midsole, tested using a foot form for impact to accurately simulate full gate loading. For these tests, a US men's size 10 midsole is tested, and a men's size 9 foot form used for impact, with a load of 2000N being applied to the midsole with the foot form at a loading rate of 5 Hz with a cyclic compression testing device such an Instron Electropuls E10000 (Instron, Norwood, Mass., USA). Each sample is compressed to the peak load at 5 Hz for 100 cycles. Energy input (J), energy return (J), energy efficiency (energy return/energy input), energy efficiency percentage (100*(energy return/energy input)) and maximum displacement (mm) are measured from the force vs. displacement curves generated. Stiffness of a particular foam sample is the maximum load divided by the displacement at the maximum load, giving a value in N/mm. The reported value for each metric is the average of the metrics from the $60^{th}$, $70^{th}$, $80^{th}$, and $90^{th}$ cycles.

Cyclic Compression Test for a Sample

Force/displacement behavior for the foams and the foamed articles may also, or alternatively, be measured using samples harvested from a larger component (e.g., cylindrical pucks harvested from a footwear midsole), and a method for obtaining a sample is described in the "Component Sampling Procedure" portion of this disclosure. In one testing methodology, when testing a sample (e.g., a cylindrical puck harvested from a larger component), the sample is tested along the length axis of the part using compression platens that are at least 2× the diameter (e.g., of the cylindrical puck). Furthermore, the sample is compressed to the peak load (e.g., 50% strain) at 5 Hz for 500 cycles. Stiffness, efficiency, and energy return are measured from the force vs. displacement curves for cycles 200, 300, 400, and 500, and the reported value for each metric is the average of each metric between cycles 200, 300, 400, and 500. Stiffness, efficiency, and energy return are defined in the following ways, with example property ranges (possibly dependent on sample geometries) provided in parentheses. Stiffness is the stress at the maximum strain divided by the maximum strain (e.g., 200-1000 kPa). Efficiency is the integral of the unloading force-displacement curve divided by the integral of the loading force-displacement curve (e.g., 0.50-0.97). Energy return is the integral of the unloading curve (e.g., 200-1200 mJ).

Cyclic Tensile Test

The cyclic tensile testing is carried out on solid samples prepared using the Component Sampling Procedure, having a dog-bone shape as described in ASTM D638 with a 2 mm thickness. In the test, the specimen is placed under a pre-load of 5 N. Strain is controlled to extend the sample to an extension 6 percent at a strain rate of 5 Hz. The stiffness is the load at 6 percent strain divided by the extension at 6 percent strain, giving a value in N/mm. The maximum load (N) observed over the test cycle of 500 cycles is also recorded.

Durometer Hardness Test—Shore A

The test used to obtain the hardness values for the foam articles is as follows. A flat foam sample is prepared using the Component Sampling Procedure, where the sample has a minimum of 6 mm thick for Shore A durometer testing. If necessary, samples are stacked to make up the minimum thickness. Samples are large enough to allow all measurements to be performed at a minimum of 12 mm from the edge of the sample and at least 12 mm from any other measurement. Regions tested are flat and parallel with an area at least 6 mm in diameter. A minimum of five hardness measurements are taken and tested using a 1 kilogram head weight.

Split Tear Test

The split tear test can determine the internal tear strength for a foam material. A sample may be provided using the Component Sampling Procedure. The sample is die cut into a rectangular shape having a width of 1.54 centimeters and a length of 15.24 centimeters (1 inch by 6 inches), and having a thickness of 10 millimeters, plus or minus 1 millimeter. On one end, a cut is made into the sample that bisects the thickness, the cut extending the full width of the sample, and 3 centimeters from the end of the sample. Starting from the end of the cut, 5 marks are placed along the length of the sample spaced 2 centimeters apart. The cut ends of the sample are placed in the clamps of a tensile tester. Each section of the sample is held in a clamp in such a manner that the original adjacent cut edges form a straight line joining the centers of the clamps. The crosshead speed is set to 50 millimeters per minute. The tear strength is measured throughout the separation of the crossheads. If necessary, a sharp knife may be used to keep separating the foam in the center of the sample, discarding the readings caused by cutting of the knife. The lowest split tear strength values are recorded for each of the five marked segments of the sample (between each of the 2-centimeter markings). An average split tear strength value is recorded for each sample. If a segment of a sample has an air bubble measuring more than 2 millimeters, the tear strength for the segment is discarded, and the air bubble recorded as a test defect. If more than one segment of a sample has an air bubble measuring more than 2 millimeters, the entire sample is discarded.

Energy Intensity

Energy intensity is a measure of the energy used in forming a particular foam article in kilowatt hours (kW-h). To obtain the energy intensity, the energy required (in kW-H) to produce a run, or batch, of articles, such as cushioning elements (such as pairs of the midsole 122) is first calculated, determined or measured (from pellet to finished component). For example, for a physical foaming process the measured energy may include the energy required for all energy consuming steps, such as: preheating the molds and hot runners (if utilized), melting the pellets, generating gas counter-pressure, injecting the molten plastic, introducing the supercritical fluid, cooling the molds and/or work-pieces and ejecting the work-pieces from the mold. The overall energy required to produce the run of cushioning element pairs is then divided by the number of cushioning element pairs produced in the run.

Zero Shear Viscosity

The zero shear viscosity is determined using a flow curve obtained on a rotational rheometer. Zero shear viscosity is determined as the apparent viscosity of the polymer melt measured at a shear rate of $1\times10^{-2}$ 1/s when the polymer is heated to 10° C. above its melting temperature. Apparent viscosity is measured under continuous flow using a cone and plate rotational fixture. The temperature of the rotational fixture is maintained at the polymer melt temperature. The gap and geometry of the cone are selected such that the measured torque is well within the measuring limits of a rheometer.

Melt Flow Index Test

The melt flow index is determined using a sample prepared using Component Sampling Procedure, according to the test method detailed in ASTM D1238-13 Standard Test Method for Melt Flow Rates of Thermoplastics by Extrusion Plastometer, using Procedure A described therein. Briefly, the melt flow index measures the rate of extrusion of thermoplastics through an orifice at a prescribed temperature and load. In the test method, approximately 7 grams of the sample is loaded into the barrel of the melt flow apparatus, which has been heated to a specified temperature of 210 degrees C., 220 degrees C., or 230 degrees C. A weight of 2.16 kilograms is applied to a plunger and the molten sample is forced through the die. A timed extrudate is collected and weighed. Melt flow rate values are calculated in g/10 min, and are reported with the specified temperature (i.e., 210, 220 or 230 degrees C.) and the weight applied to the plunger (i.e., 2.15 kilograms).

Injection Molding System for Forming a Foam Article

As indicated above, some aspects of the present disclosure include an injection-molding system and components for forming an article comprising a foamed thermoplastic elastomer composition. For example, referring to FIG. 1A, a tooling assembly 110 is illustrated in combination with a first hot-runner plate 112 and a second hot-runner plate 114. The tooling assembly 110 includes one or more injection molds coupled to a first carrier plate 116 and a second carrier plate 118, which may support the one or more molds during one or more stages of an injection-molding process (e.g., when the molds are being transported from one station to another station, when the part(s) are being unloaded, etc.). For instance, referring to FIG. 2, the hot-runner plates 112 and 114 and the carrier plates 116 and 118 have been omitted to unobstructedly illustrate a first mold 120 and a second mold 122. The first hot-runner plate 112 interfaces with the first mold 120, and the second hot-runner plate 114 interfaces with the second mold 122 to distribute one or more deposits or shots of thermoplastic elastomer composition (e.g., single-phase solution or other composition having a foaming agent) into mold cavities.

Figure 3:
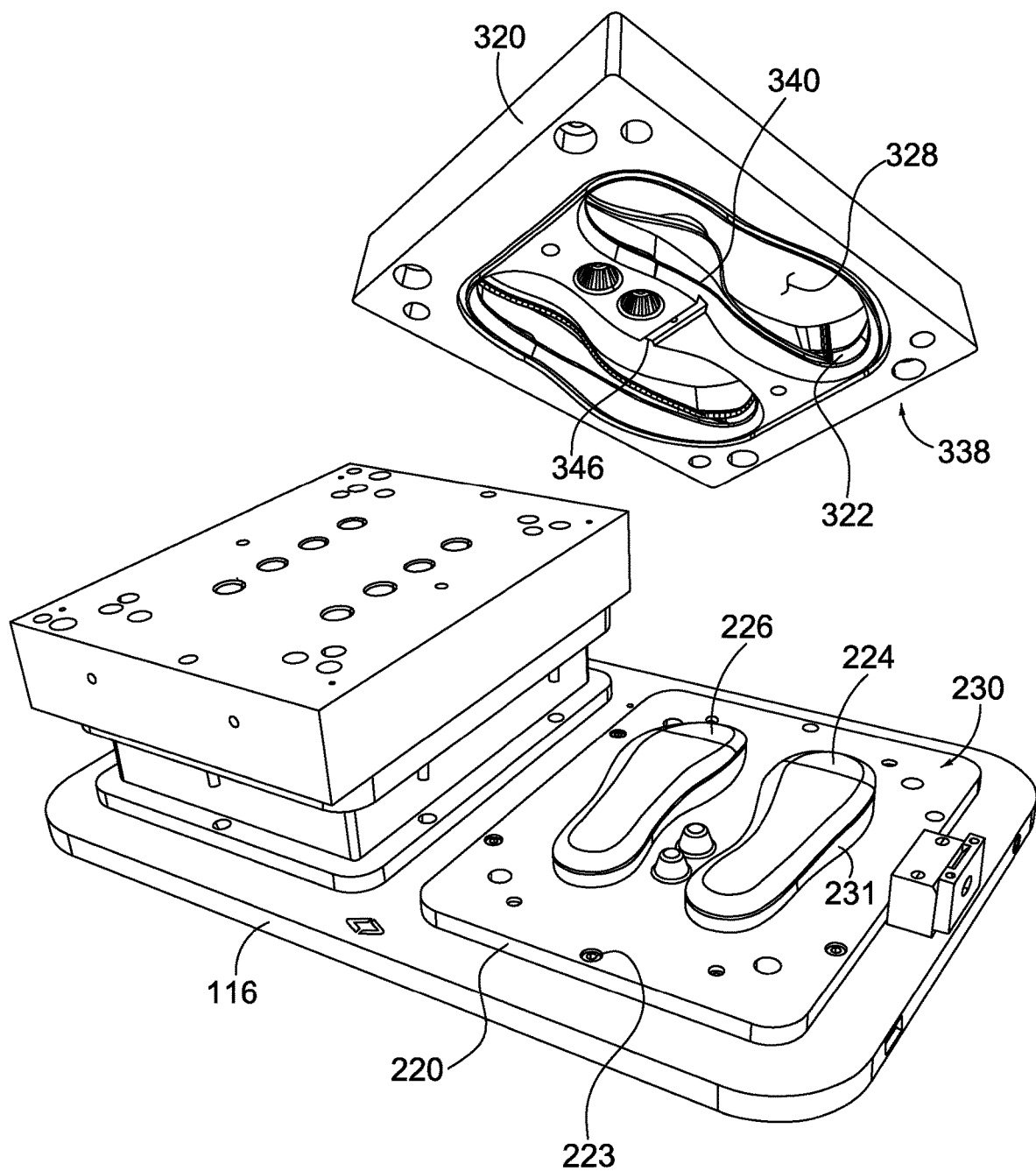
FIG. 3 depicts a partially exploded view of the tooling assembly of FIGS. 1A-1E, showing a mold ring plate separated from a first mold plate, in accordance with an aspect of the present disclosure.

For purposes of this disclosure, various elements of the first mold 120 are described, and it is understood that the second mold 122 may have similar elements, although not explicitly described. For example, the first mold includes a first mold plate 220, a mold ring plate 320, and a second mold plate 420, and the second mold 122 might also include a respective first mold plate 221, a respective mold ring plate 321, and a respective second mold plate 421 having similar elements. The first mold plate 220, the mold ring plate 320, and the second mold plate 420 are layerable (e.g., stackable) to form one or more cavities for receiving a deposit of a thermoplastic elastomer composition. For example, FIG. 3 depicts a partially exploded view including the first mold plate 220 and the mold ring plate 320 separated from one another. In this partially exploded view of FIG. 3, a portion of a first mold cavity and a portion of a second mold cavity can be seen, each of which is shaped to form at least a portion of a footwear sole. Although the first mold 120 includes two mold cavities, in other aspects, a mold may include fewer or more mold cavities.

In this disclosure, various elements of the first mold cavity are described, and it is understood that the second mold cavity may have similar elements, although not explicitly described. For example, the first mold cavity may be at least partially enclosed by a mold core 224, and the second mold cavity may include a similar mold core 226 (although a mirror image). In one aspect of this disclosure, the mold core 224 is nestable in a mold-ring cavity 328 when the mold ring plate 320 is layered against or abutting the first mold plate 220.

Figure 2:
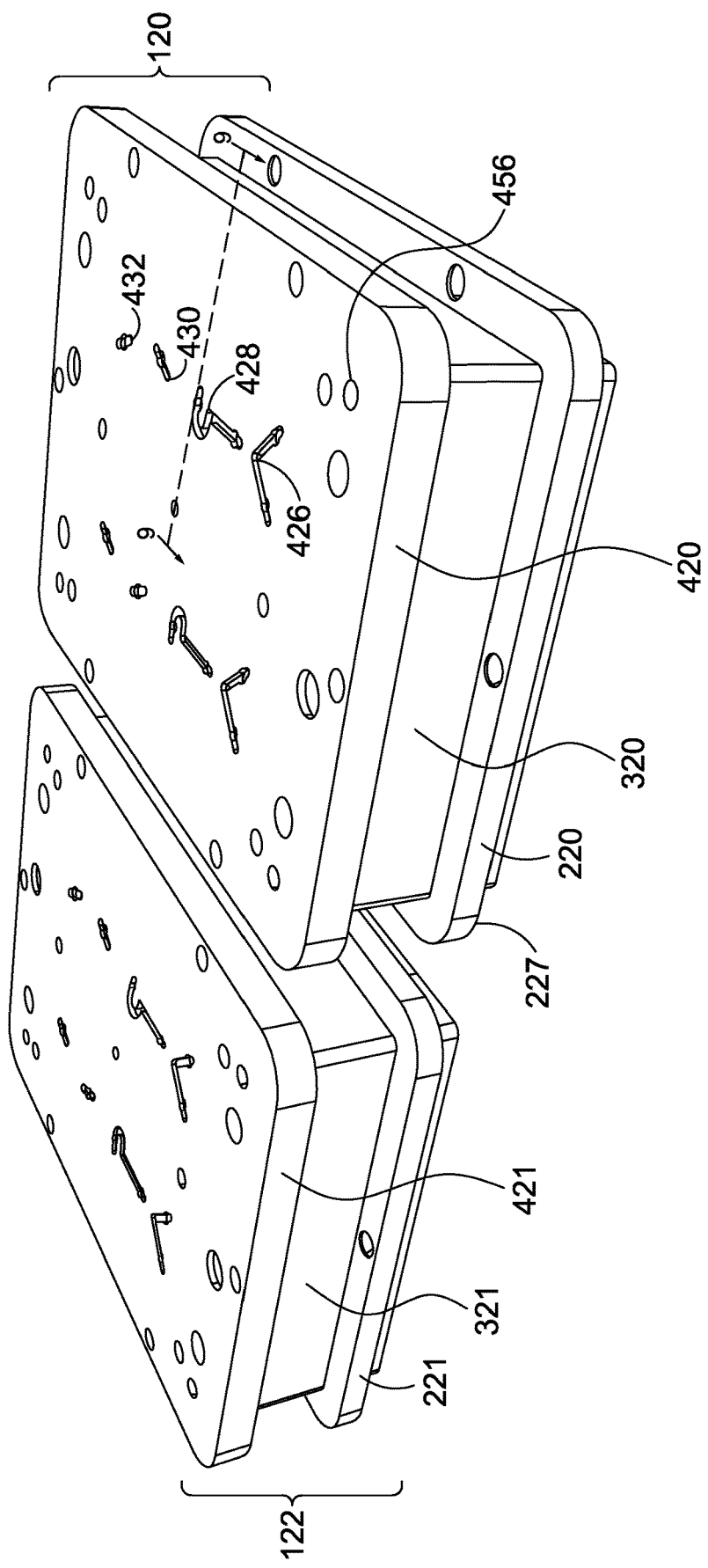
FIG. 2 depicts a pair of molds, in accordance with an aspect of the present disclosure.
Figure 4:
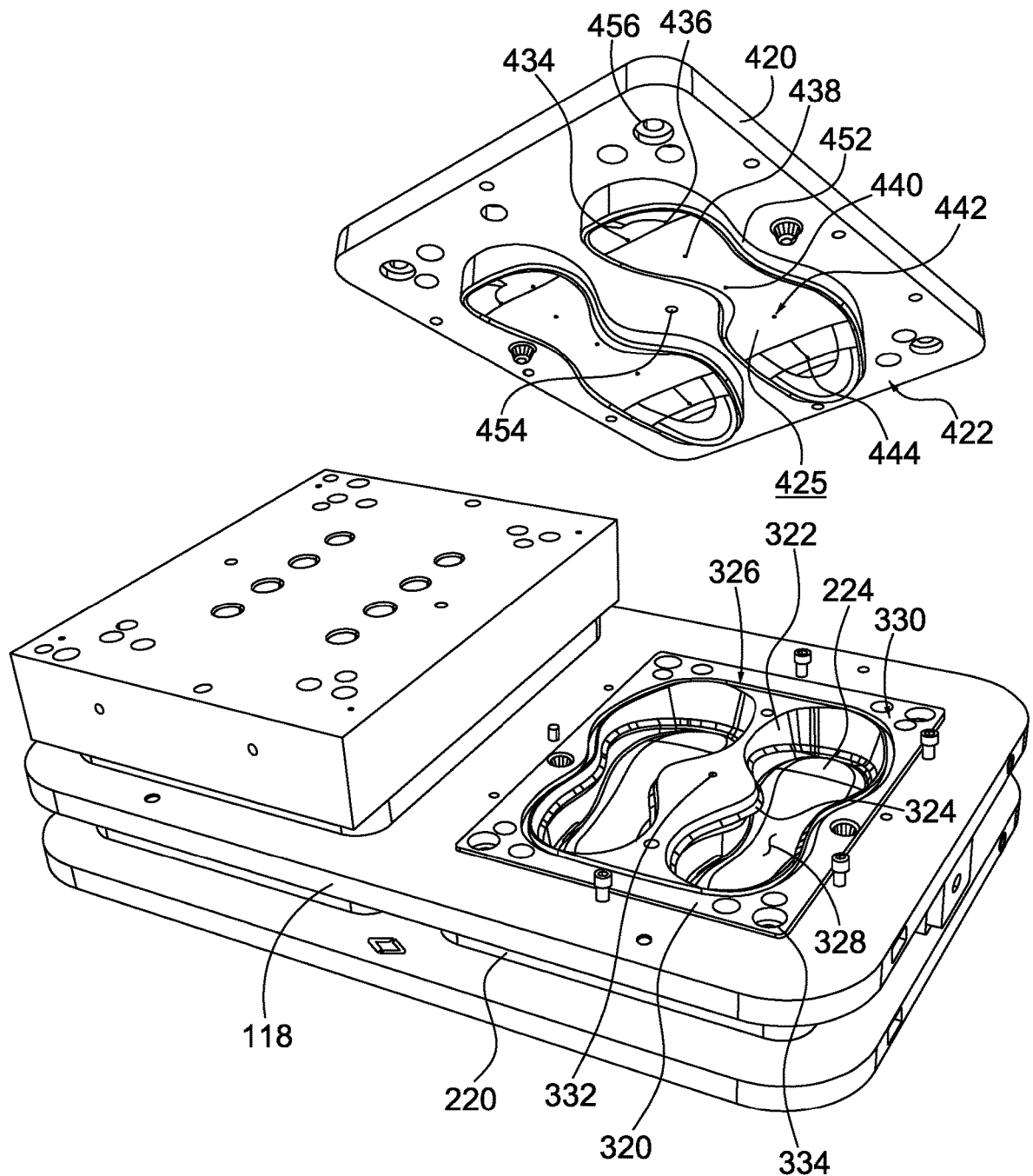
FIG. 4 depicts another partially exploded view of the tooling assembly of FIGS. 1A-1E, showing a second mold plate separated from the mold ring plate, in accordance with an aspect of the present disclosure.

Referring to FIG. 4, the mold ring plate 320 is illustrated as layered directly against and abutting the first mold plate 220, and the mold core 224 is depicted nested in the mold-ring cavity 328, such that the mold core 224 forms a first mold cavity wall. In addition, FIG. 4 depicts a partially exploded view with the second mold plate 420 being separated from the mold ring plate 320. The second mold plate 420 may be positioned directly against (e.g., abutting) the mold ring plate 320 to more fully enclose the mold-ring cavity 328. The second mold plate 420 may also include one or more runners and gates through which the thermoplastic elastomer composition may flow when being deposited into the cavities. For example, FIG. 4 depicts a plurality of gate outlets 434, 436, 438, 440, 442 and 444, and FIG. 2 depicts a plurality of runner inlets 426, 428, 430, and 432 and runners that are fluidly coupled to the plurality of gate outlets 434, 436, 438, 440, 442 and 444. Some details of the first mold 120 have been described above, and these details provide context for other components of the system (e.g., the hot-runner plate 112). Additional details of the first mold 120 will be described in other parts of this disclosure below.

Figure 5:
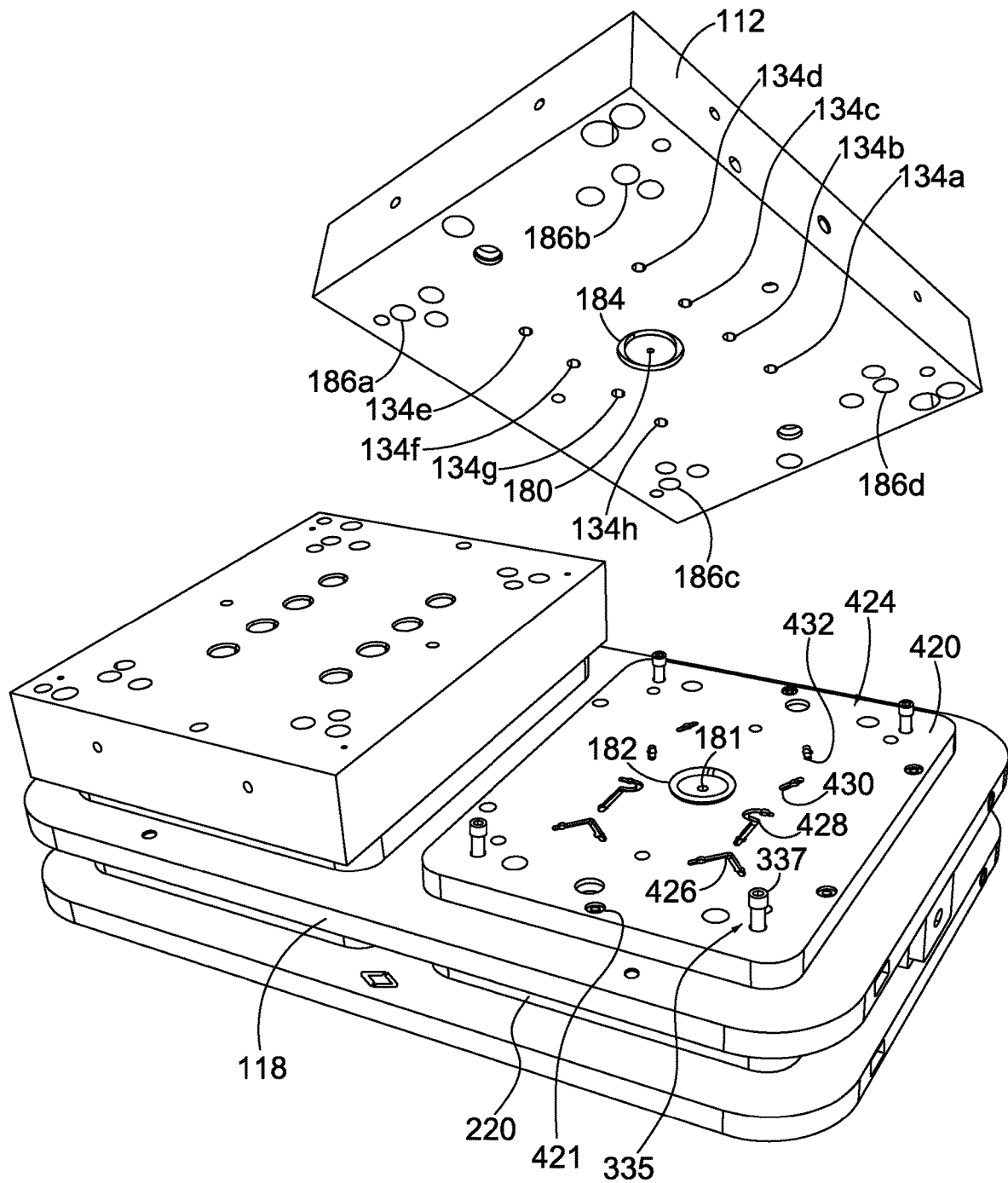
FIG. 5 depicts another partially exploded view of the tooling assembly of FIGS. 1A-1E, showing a hot-runner plate separated from the second mold plate, in accordance with an aspect of the present disclosure.

Referring to FIG. 5, a partially exploded view depicts the hot-runner plate 112 that interfaces with the second mold plate 420, and the hot-runner plate 112 may include one or more hot-runner outlets 134a-134h that align with, and fluidly connect to, the plurality of runner inlets 426, 428, 430, and 432 of the second mold plate 420. For example, FIG. 1A depicts the hot-runner plate 112 interfacing with the second mold plate 420 and also depicts a plurality of nozzle-receiving openings 136a-136h into which injection nozzles may be inserted for distributing material through the hot-runner plate 112 and the second mold plate 420 and into the mold cavity or cavities.

Figure 6:
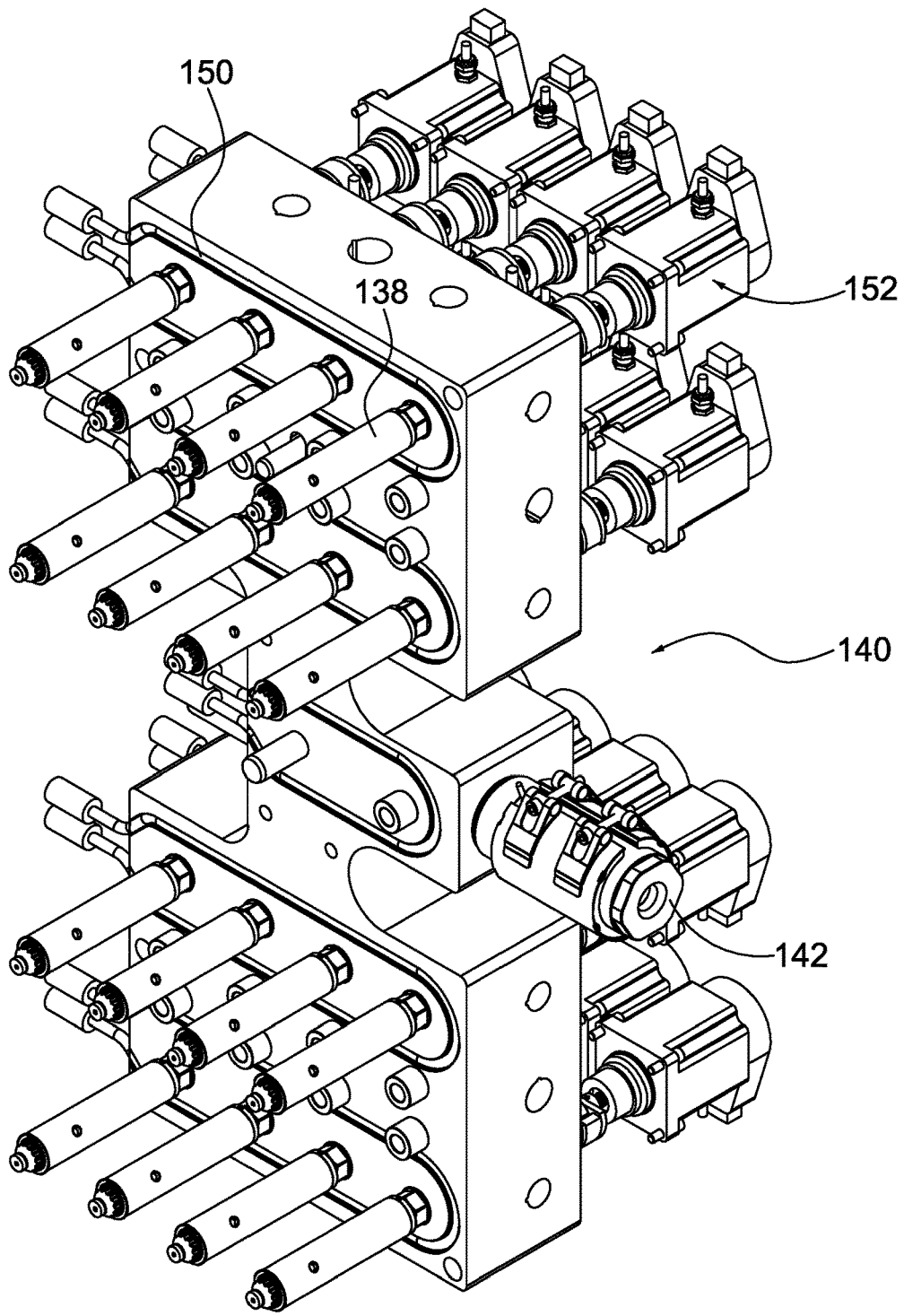
FIG. 6 depicts a manifold, in accordance with an aspect of the present disclosure.

Referring to FIG. 6, an example of a set of injection nozzles (e.g., 138) is shown as part of an injection manifold 140. That is, the injection manifold 140 includes an injection port 142 that connects to an injector of an injection molding system. The injection manifold 140 also includes a series of internal components (not shown) that receive a deposit/shot of thermoplastic elastomer composition from the injector and divide the shot into a number of deposits for separately distributing through the nozzles. The injection manifold 140 may also include one or more sensors (e.g., thermocouples) for monitoring conditions of the manifold (e.g., temperature, pressure, etc.) that may affect the thermoplastic elastomer composition, as well as a manifold temperature conditioning unit for maintaining, increasing, or decreasing a temperature of the manifold. For example, the manifold temperature conditioning unit may include conditioned-fluid lines 150 for holding and transporting coolant or heated conditioning fluid. As such, a state of the thermoplastic elastomer composition (e.g., single-phase solution) may be maintained while a deposit is distributed from each nozzle into the hot-runner plates 112 and 114. For example, the manifold 140 may maintain the thermoplastic elastomer composition at conditions conducive to maintaining the foaming agent in a supercritical-fluid phase and to reducing the likelihood of transition to a gas. In a further aspect, the manifold includes an injector-pin assembly (e.g., 152) for each nozzle, which may selectively insert a pin (or other obstruction) into a tip of each nozzle to impede a flow of material.

Figure 7A:
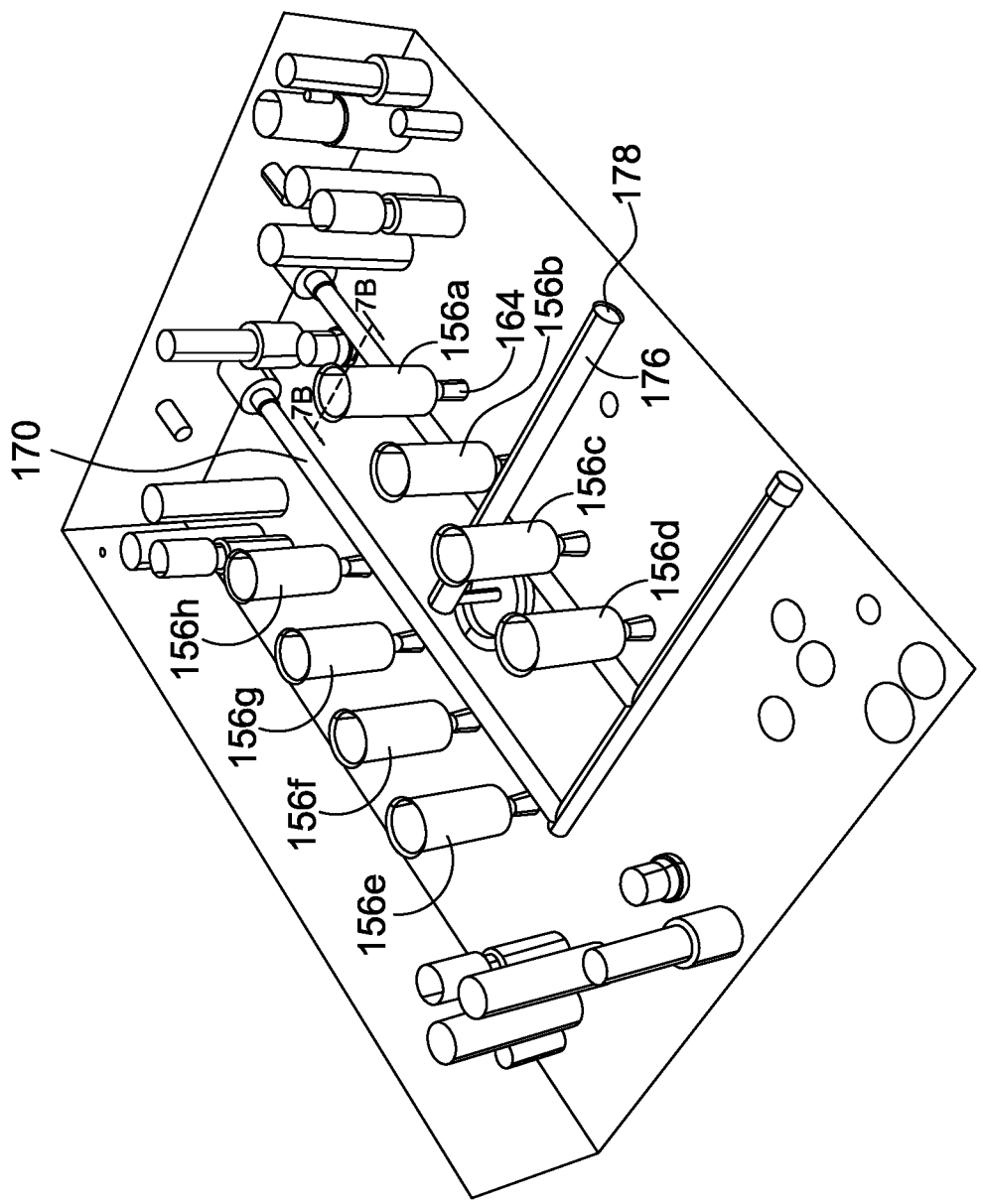
FIG. 7A depicts internal components of a hot-runner plate, in accordance with an aspect of the present disclosure.

In a further aspect of the present disclosure, the nozzles are arranged in groups of nozzles, including between two and six nozzles. For example, in FIG. 6, the nozzles are arranged in four groups of four linearly aligned nozzles, and in other aspects the groups may include two, three, five, or six linearly aligned nozzles. Each group of nozzles is positioned to collectively inject material into a single mold cavity. For example, in one aspect of the present disclosure, each group of four nozzles is configured to inject material into a single mold cavity having a three-dimensional shape of a footwear component (e.g., footwear sole). In one aspect, four nozzles optimizes the available footprint and injection-system real estate operable to distribute material in to the mold cavity having the 3D shape of a footwear sole. That is, the 3D shape of an average size footwear sole includes a length and four nozzles may optimally use that length to evenly distribution shots of material into the mold cavity in a way that each shot foams and solidifies in a desired manner In FIG. 6, the manifold 140 includes sixteen nozzles, each of which is insertable into a respective nozzle-receiving opening (e.g., 136a-136h) of the hot-runner plates 112 and 114 depicted in FIG. 1A. Referring to FIGS. 7A and 7B, some of the walls of the hot-runner plate 112 are omitted to illustrate some interior components of the hot-runner plate 112 in more detail. For example, the hot-runner plate 112 includes eight nozzle-receiving sleeves 156a-156h, each of which receives a respective nozzle of the injection manifold 140. Each nozzle-receiving sleeve includes a nozzle-receiving opening 136a-136h (see FIG. 1A and 136a in FIG. 7B) and a sleeve outlet (e.g., 158 in the cross-sectional view of FIG. 7B). The sleeve outlet 158 includes a perimeter rim 160 that forms a nozzle seat 162 against which a tip of the nozzle biases when then nozzle is fully inserted into the nozzle-receiving sleeve.

The hot-runner plate 112 also includes hot runners (e.g., 164) that transport material from each nozzle after being dispensed. For example, each hot runner (e.g., 164) includes a hot-runner inlet (e.g., 166 in FIG. 7B) that fluidly connects with the sleeve outlet (e.g., 158 in the cross-sectional view of FIG. 7B) and includes a hot-runner outlet 134a-134h (see also FIG. 5 showing the hot-runner outlets). In an aspect of the present disclosure, the hot-runner inlet is spaced apart from the hot-runner outlet by a distance in a range of about 1 cm to about 3 cm. As such, when material is dispersed from the nozzle, a sprue is formed in the hot runner, the sprue having a length in a range of about 1 cm to about 3 cm. In an aspect of the present disclosure, this sprue length provides a grasping region at which a tool can grip the sprue for removing solidified material from the runners in the second mold plate 420.

The hot-runner plate 112 includes various components to help control conditions related to the injection-molding system. For example, the hot-runner plate 112 includes conditioned-fluid lines 170 for transporting conditioned fluid throughout the hot-runner plate 112. The conditioned fluid may be conditioned to include a temperature for maintaining, increasing, or decreasing a temperature of components of the hot-runner plate, including the hot runners (e.g., 164), the nozzle-receiving sleeves 156a-156h, and the nozzles when inserted in the sleeves (see also FIG. 1E depicting a conditioned-fluid inlet 172 and a conditioned fluid outlet 174 positioned on an exterior wall of the hot-runner plate 112). As such, when the thermoplastic elastomer composition (e.g., single-phase solution with supercritical fluid as physical foaming agent) is dispensed from a nozzle, the temperature in the hot runner may be maintained high enough to delay transition of the supercritical fluid to a gas.

In a further aspect, the hot-runner plate 112 includes a gas conduit 176 having a first gas port 178 (see e.g., FIGS. 1A and 7A) for fluidly communicating with a gas counter pressure (GCP) system and a second gas port 180 or "gas-conduit port" (see e.g., FIG. 5) for fluidly communicating with a gas port 181 (also referred to as "fluid-channel port") of the second mold plate 420. In addition, the side of the hot-runner plate 112 facing towards the mold includes a seal assembly for sealingly mating with the second mold plate 420. For example, FIG. 5 depicts a seal groove 184 that receives a resilient seal 182. The second mold plate 420 may additionally, or alternatively, include a seal groove. In some aspects of the present disclosure, the GCP system is fluidly connected from the gas port 178 on the hot-runner plate 112 to the sleeve outlet (e.g., 158 in FIG. 7B). As such, when the thermoplastic elastomer composition (e.g., single-phase solution with supercritical fluid as physical foaming agent) is dispensed from a nozzle, the pressure in the mold cavity and runners may be maintained high enough to delay transition of the supercritical fluid to a gas.

In one aspect of the present disclosure, the hot-runner plate 112 is a universal hot-runner plate that is coupled directly to the manifold. For example, one or more fasteners may couple the hot-runner plate 112 to the manifold 140. Some conventional injection molding systems may, in contrast to the present disclosure, have separate hot-runner plates that each interfaces with a different cold-runner plate (or other plate that is not temperature conditioned) and that are connected and disconnected to the manifold or nozzles in each injection cycle. This aspect of the present disclosure includes a universal hot-runner plate that is mountable to the nozzles and that can interface with an array of different molds, each of which includes a different mold cavity, a different gate scheme, or any combination thereof. For example, the mold cavities may differ in volume and or shape as being used to mold parts of different sized shoes, and the gate scheme may differ by including different gate positions and/or quantities of gates. In addition, the hot-runner plate 112 is plumbed with all of the components used to control various aspects of the molding process, including the conditioned-fluid lines 170 and the gas conduit 176. Hot-runner plates are often associated with higher costs (e.g., added plumbing for temperature conditioning elements). Among other things, a universal hot-runner plate may reduce costs across multiple sets of molds, since only a single, common hot-runner plate may be used across the multiple sets, as opposed to having to make a hot-runner plate for each mold. In addition, it can reduce costs over time since there are fewer parts to store, maintain, repair, move, handle, etc. Although the figures of this present disclosure illustrate the hot-runner plates 112 and 114, which provide an interface between the injector nozzles and the first and second molds 120 and 122, in other aspects of this disclosure, universal cold-runner plates or other types of universal runner plates may provide the interface between the injector nozzles and the first and second molds 120 and 122.

Mold for Forming a Foam Article

Figure 8A:
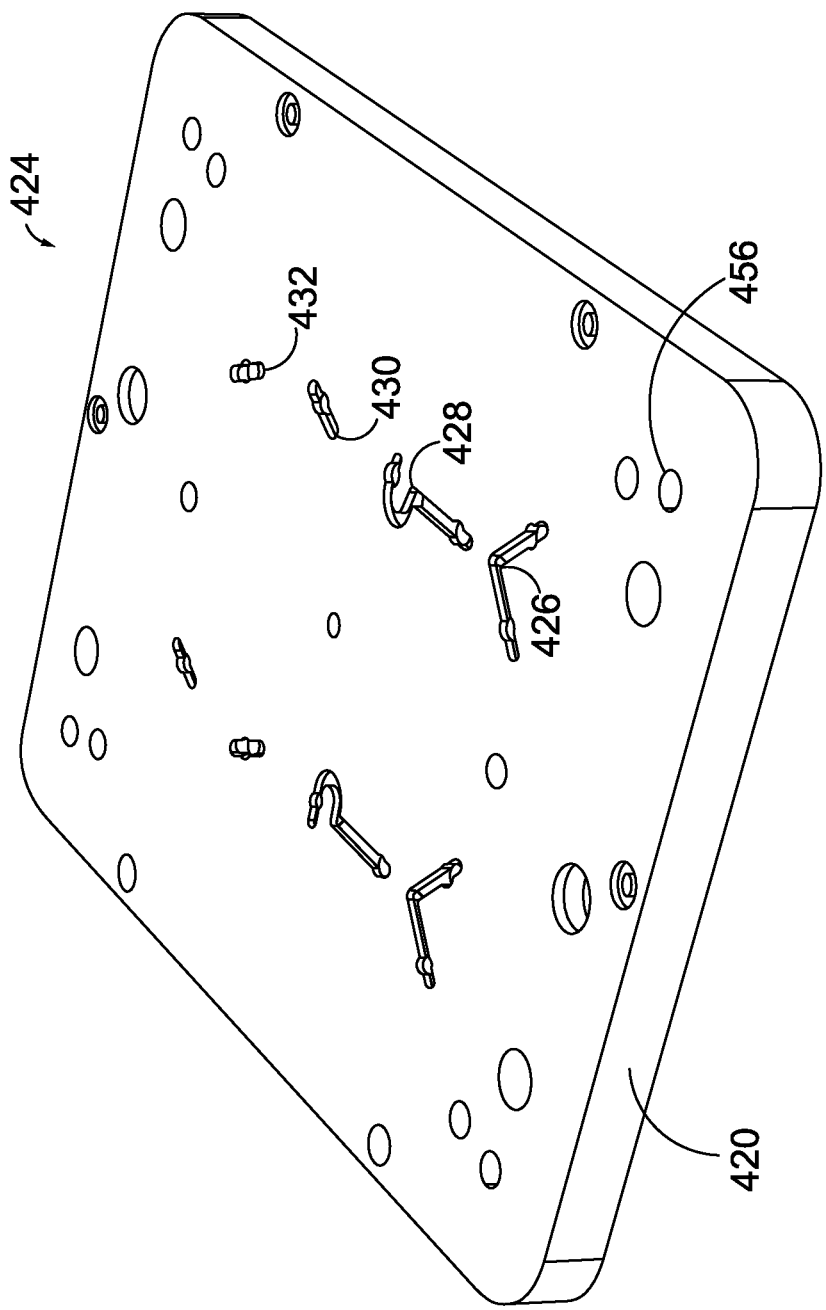
FIG. 8A depicts a second side of the second mold plate, in accordance with an aspect of the present disclosure.
Figure 8B:
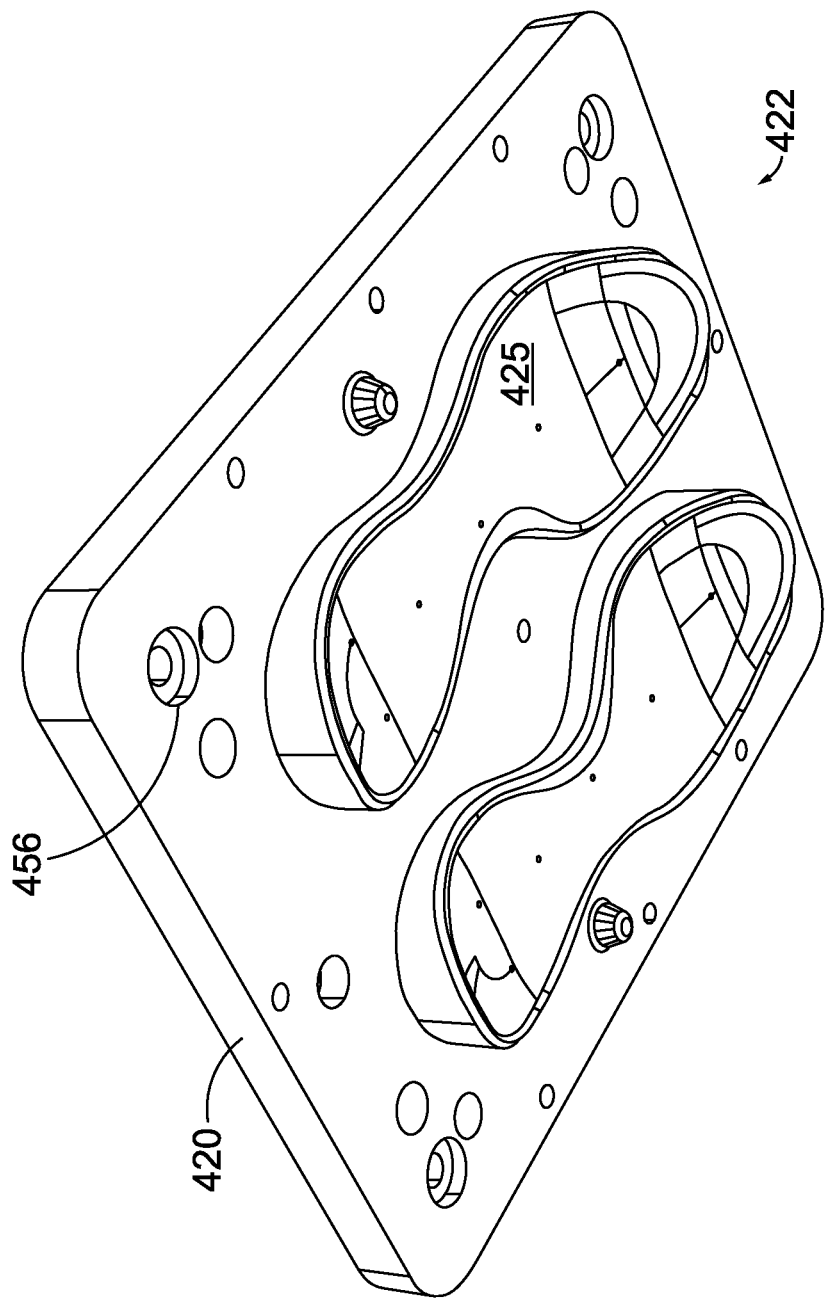
FIG. 8B depicts a first side of the second mold plate, in accordance with an aspect of the present disclosure.
Figure 8C:
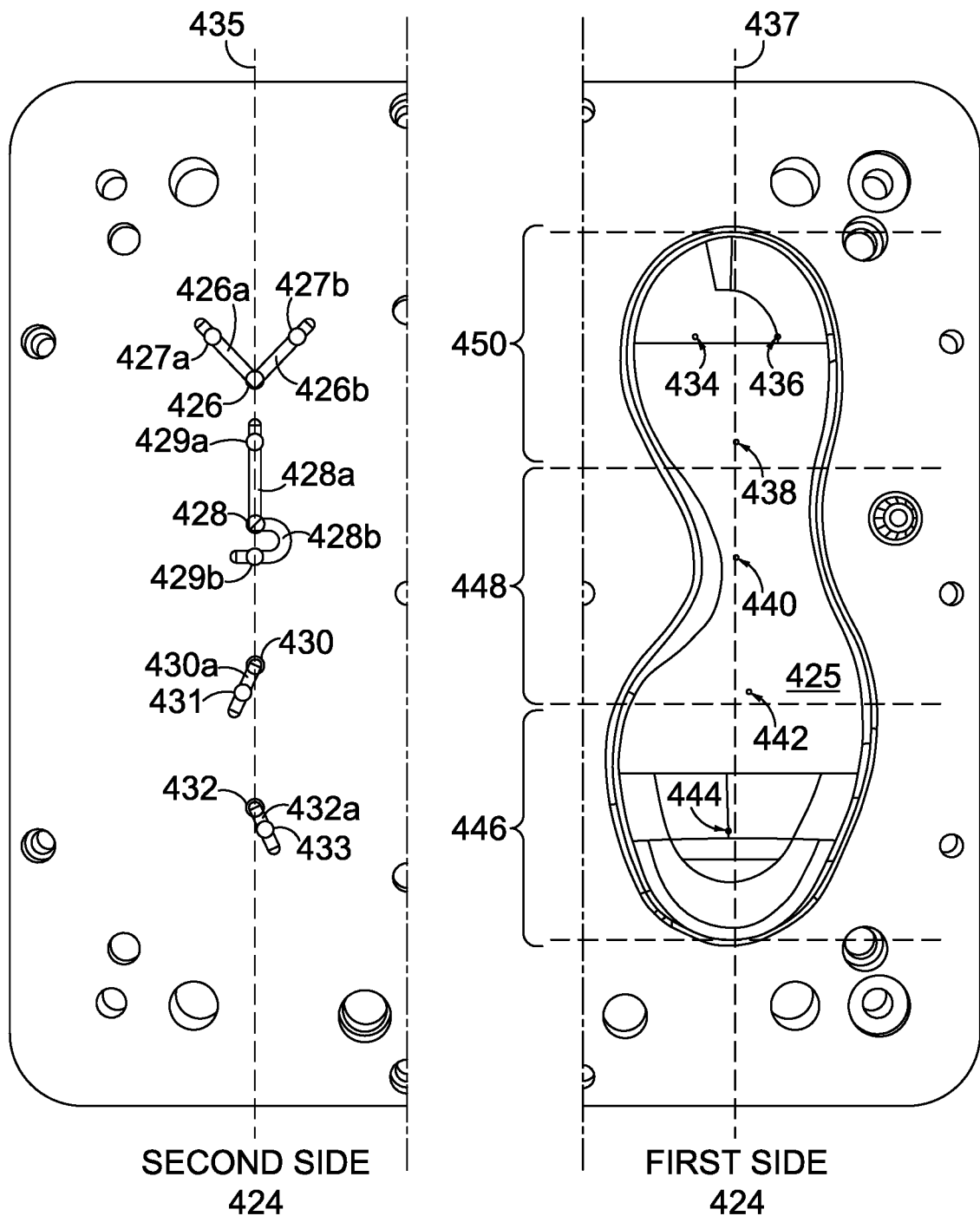
FIG. 8C depicts partial views of the first side and the second side of the second mold plate, in accordance with an aspect of the present disclosure.

Referring back to FIGS. 2-4, and also referring to FIGS. 8A-8C, some additional aspects of the first mold 120 are depicted, including the first mold plate 220, the mold ring plate 320, and the second mold plate 420. For example, the second mold plate 420 includes a first side 422 that faces towards the mold ring plate 320 and a second side 424 that faces away from the mold ring plate 320. When the first mold 120 interfaces with the hot-runner plate 112 (e.g., FIG. 1A), the second side 424 faces towards and abuts the hot-runner plate 112.

The second side 424 includes a plurality of runner inlets 426, 428, 430, and 432 that align with, and receive material from, the hot-runner outlets of the hot-runner plate 112. Furthermore, each runner inlet may fluidly connect to one or more runners. For example, referring to FIG. 8C the runner inlet 426 fluidly connects with a first runner 426a and a second runner 426b, and the runner inlet 428 fluidly connects with a first runner 428a and a second runner 428b. In addition, the runner inlet 430 connects to a single runner, including a runner 430a, and the runner inlet 432 also connects to a single runner, including a runner 432a. In addition, FIG. 8C depicts the inlets of a plurality of secondary runners 427a, 427b, 429a, 429b, 431, and 433 that fluidly connect each runner to a respective gate and gate outlet of the second mold plate 420. That is, only the inlet of each secondary runner is viewable in FIG. 8C because the secondary runner extends from the second side 424, through a mold body of the second mold plate, towards the second side 422, the gates, and the gate outlets.

The plurality of runner inlets 426, 428, 430, and 432 may include various features. For example, each runner inlet is positioned and arranged to align with a hot-runner outlet 134d, 134c, 134b, and 134a (respectively) of the hot-runner plate 112. As such, when nozzles inserted into the hot-runner plate 112 inject material through the hot-runner outlets 134d, 134c, 134b, and 134a, the material may flow into the runner inlets 426, 428, 430, and 432 to be directed to the mold cavity by way of the runners. In a further aspect, the relative positioning of the runner inlets 426, 428, 430, and 432 represents a universal positioning and arrangement configured to align with the hot-runner outlets of the hot-runner plate. That is, in aspects in which the hot-runner plate 112 is a universal hot-runner plate used to interface with an array of different molds, each of the molds in the array may include a mold plate having runner inlets positioned similarly to the runner inlets 426, 428, 430, and 432, regardless of the arrangement of the runners. In one aspect, this universal positioning and arrangement includes four runner inlets that may be linearly aligned and that may be evenly spaced apart from one another. For example, FIG. 8C depicts a longitudinal reference line 435 marking a position of a longitudinal reference plane that intersects each of the runner inlets (the longitudinal reference plane extends orthogonal to the view shown in FIG. 8C at longitudinal reference line 435).

In another aspect, the runners may also include various features. For example, the runners may extend in various directions from a respective runner inlet to a secondary runner. That is, in some instances, a runner (e.g., 428a) may extend from a runner inlet in a direction aligned with the longitudinal reference plane, such that the secondary runner (e.g., 429a) and terminal gate outlet (e.g., 438) is also aligned with the longitudinal reference plane. In other examples, a runner (e.g., 428b) may extend from a runner inlet in a direction away from the longitudinal reference plane, and in this sense, the runner 428b is incongruent from the runner 428a. In that case, the runner (e.g., 428b) may curve or bend back into the longitudinal reference plane, such that the secondary runner (e.g., 429b) and terminal gate outlet is still aligned with the longitudinal reference plane. Alternatively, the runner (e.g., 426a, 426b, 430a, and 432a) may extend away from the longitudinal reference plane and terminate at a secondary runner (e.g., 427a, 427b, 431, and 433) not aligned with the longitudinal reference plane.

In a further aspect of the disclosure, the second mold plate 420 includes a mold cavity wall 425 on the first side 422 that encloses at least a portion of the mold cavity of the first mold 120. The mold cavity wall 425 includes a plurality of gate outlets through which material flows when injected into the mold cavity. That is, each secondary runner is fluidly connected with a respective gate outlet on the first side 422 of the second mold plate. For example, FIG. 8C depicts a plurality of gate outlets 434, 436, 438, 440, 442, and 444 from which material may flow after being injected into the runners.

The plurality of gate outlets 434, 436, 438, 440, 442, and 444 include various features. For example, in one aspect of the present disclosure, each secondary runner tapers from a larger diameter near a respective runner to a smaller diameter near each gate. As such, in one aspect, each gate outlet is an aperture having a diameter in a range of about 1.00 millimeters to about 5.00 millimeters, or 2.00 millimeters to 3.50 millimeters. In at least some instances, a diameter in this range is operable to affect a flow, condition, and/or foaming activity of a material injected through the gate outlet, and is related to a viscosity of the thermoplastic elastomer composition (e.g., single-phase solution). In addition, each gate outlet includes a position that is relative to other gate outlets and that is relative to the three-dimensional shape of the mold cavity. For example, FIG. 8C depicts a longitudinal reference line 437 that is coplanar with the longitudinal reference line 435 (e.g., both being positioned in the same longitudinal reference plane) and that represents a position of the longitudinal reference plane. In one aspect of the present disclosure, one or more gate outlets (e.g., 438 and 440) may be aligned with the longitudinal reference plane. Further, one or more gate outlets (e.g., 434, 436, 442, and 444) may be offset from the long longitudinal reference plane.

In a further aspect, a length of the mold cavity wall 425 may be evenly divided into a forefoot third 446, a midfoot third 448, and a heel third 450, and the gate outlets may be apportioned in various manners among the thirds. For example, in the illustrated example, the heel third 450 includes three gate outlets 434, 436, and 438; the midfoot third 448 includes two gate outlets 440 and 442; and the forefoot third includes a single gate outlet 444. In some instances, this arrangement of gate outlets may contribute to dispersion and foaming of the thermoplastic elastomer composition in the mold cavity in a manner resulting in a foamed product having material properties conducive to a footwear sole. For example, it may be advantageous to position three gate outlets 434, 436, and 438 in the heel portion (with gate outlets 434 and 436 being laterally offset from the longitudinal reference plane), since the heel portion may be thicker, whereas it may be advantageous to position fewer gate outlets in the forefoot portion (which may be thinner than the heel portion) and closer to the longitudinal reference plane. However, in other aspects, the gate outlets may be positioned in different arrangements. In one aspect, the variability of the runner orientations may permit runners to both include the universal runner inlet configuration and be positioned in a customized manner to mold a particular shape and/or size of foamed article. For example, a mold configured to form a footwear sole for a first size (e.g., US men's size 10) footwear article may have a first set of runners, and a mold configured to form a footwear sole for a second size (e.g., US men's size 6) may have a second set of runners. Both the first set of runners and the second set of runners may each include a runner-inlet pattern matching the universal runner-inlet pattern depicted in FIG. 8C, and may also each include a different runner pattern configured to distribute material differently into a respective mold cavity based on the respective 3D mold-cavity shapes and sizes.

One aspect of the present disclosure includes a mold system having a universal runner plate (e.g., universal hot-runner plate or universal cold-runner plate) and an array of two or more molds, each of which is configured to interface with the universal runner plate and includes a 3D mold-cavity size. Furthermore, the 3D mold-cavity size of a first mold of the array is for a footwear component of a first shoe size, such that the first mold includes a first runner configuration. The 3D mold-cavity size of the second mold of the array is for a footwear component of a second shoe size, such that the second mold includes a second runner configuration that is different from the first runner configuration (e.g., different positions of gate outlets). In one aspect, the first shoe size and the second shoe size are each in a range of US Men's 3.5 to US Men's 15, or US Men's 5 to US Men's 12, or US Men's 6 to US Men's 11, or US Men's 7 to US Men's 10. For example, the first shoe size might be in a range of US Men's 3.5 to U.S. Men's 8, or US Men's 5 to US Men's 7.5, or US Men's 6 to US Men's 7; and the second shoe size might be in a range of US Men's 8.5 to US Men's 15, or US Men's 9 to US Men's 12, or US Men's 9 to US Men's 10.

Figure 9:
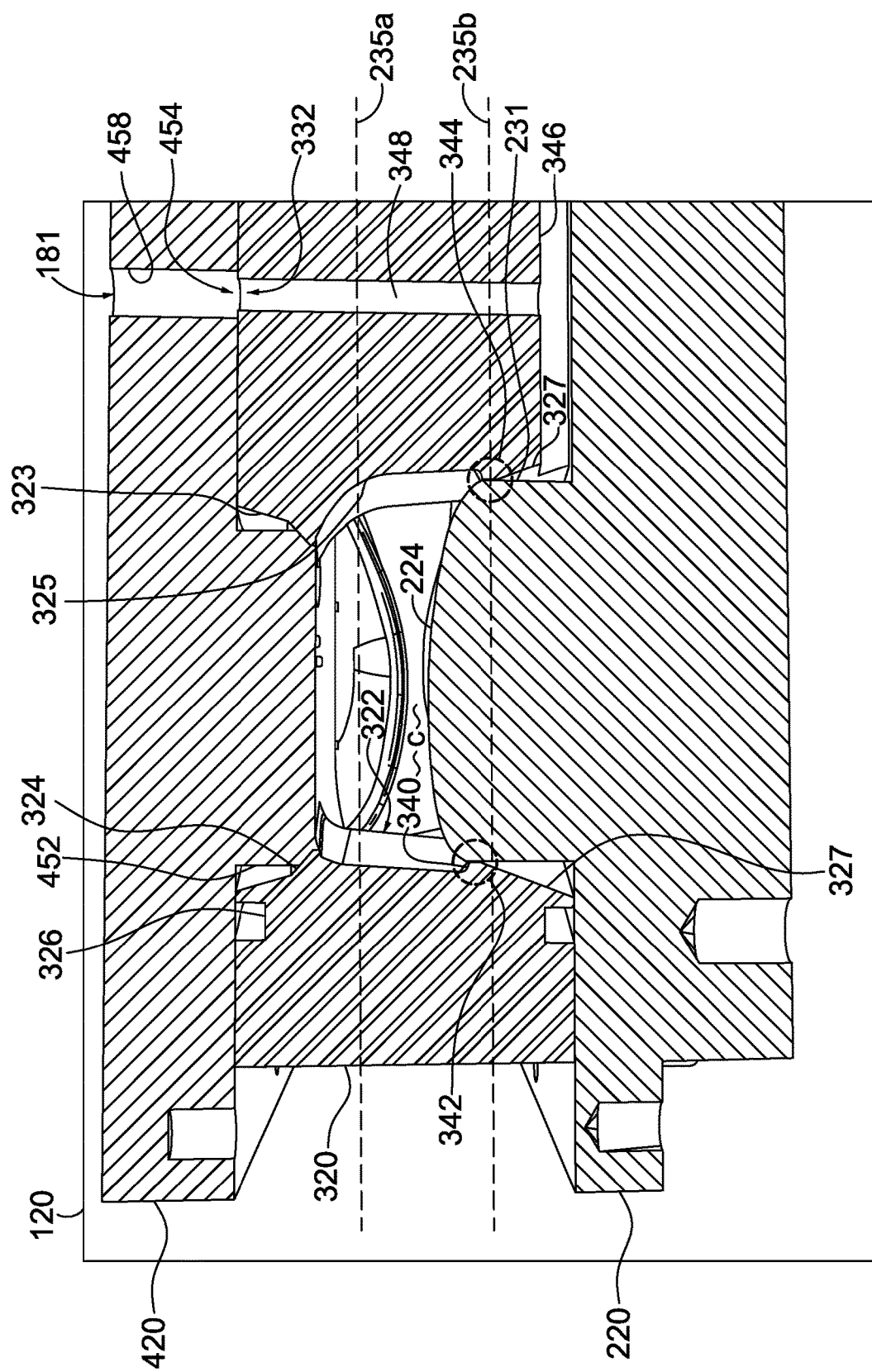
FIG. 9 depicts a cross-sectional view of the first mold taken along the 9-9 reference line in FIG. 2, in accordance with an aspect of the present disclosure.

Referring to FIG. 4, the second mold plate 420 includes a perimeter wall 452 forming a boundary along sides of the mold cavity wall 425. In addition, the mold ring plate 320 includes a mold cavity wall 322 at least partially enclosing the mold-ring cavity 328, and the mold cavity wall 322 includes a first perimeter ridge 324 traversing the perimeter of the mold-ring cavity 328. When the second mold plate 420 is layered next to or abuts the mold ring plate 320, such as when the first mold 120 is assembled, the perimeter wall 452 nests inside the mold cavity wall 322 to at least partially enclose a portion of the mold-ring cavity 328. In addition, the perimeter wall 452 abuts the first perimeter ridge 324 to at least partially seal the mold cavity. For example, referring to FIG. 9, a cross-sectional view taken along the reference line 9-9 in FIG. 2 is provided, showing the first mold plate 220, the mold ring plate 320, and the second mold plate 420, assembled into the first mold 120 and enclosing a mold cavity C. In addition, FIG. 9 depicts the perimeter wall 452 abutting the first perimeter ridge 324.

In a further aspect, a seal assembly is positioned between the mold ring plate 320 and the second mold plate 420. For example, a seal groove 326 may be positioned on a side 330 of the mold ring plate 320 facing towards the second mold plate 420 and a resilient seal may be positioned in the seal groove 326. A seal groove may also, or alternatively, be positioned on the first side 422 of the second mold plate 420. Moreover, in another aspect, the first side 422 of the second mold plate 420 may include a gas port 454 that aligns with, and fluidly connects with, a gas port 332 of the mold ring plate 320, and this alignment and fluid connection is also depicted in the cross-sectional view of FIG. 9. Furthermore, the second mold plate 420 may include a gas channel 458 fluidly connecting the gas port 181 on the second side 424 with the gas port 454 on the first side 422.

In another aspect of the disclosure, the mold ring plate 320 includes at least a first pin-receiving aperture 334 (see e.g., FIG. 4) and the second mold plate includes at least a second pin-receiving aperture 456, which aligns with the first pin-receiving aperture 334 when the first mold 120 is assembled. The second pin-receiving aperture 456 is also shown in FIGS. 8A and 8B, including an opening on the first side 422, and an opening on the second side 424—the opening on the second side including a width (e.g., diameter). Furthermore, the first pin-receiving aperture 334 may have a pin engager (e.g., threaded interior wall) to securely receive a pin (e.g., 335 depicted in FIG. 5) that is coupled in the first pin-receiving aperture 334 and that protrudes out of the first pin-receiving aperture 334 and into, or through, the second pin-receiving aperture 456. In one aspect, the pin 335 includes a head 337 or other stop on a portion of the pin 335 positioned on the second side 424 of the second mold plate 420. Furthermore, the hot-runner plate 112 may also have pin-receiving apertures 186a-186d into which a head of a pin (such as head 337 of pin 335) may be inserted when the mold interfaces with the hot-runner plate 112. When the mold is not coupled to the hot-runner plate 112, the second mold plate 420 may be moved on the pin(s) away from the mold ring plate 320 to a pre-determined distance, based on a position of the head or stop on the pin (e.g., the length of the pin between the portion affixed to the mold ring plate 320 and the head). For example, after material has been injected into the mold cavity and has set (e.g., foamed, solidified, etc.), the second mold plate 420 may be moved away from the mold ring plate 320 along the pins in order to separate the molded part from the material in the gates and runners.

Referring now to FIG. 3, the mold ring plate 320 includes a first side 338 that faces towards a second side 230 of the first mold plate 220, and the first side 338 is opposite a second side 330 (FIG. 4) of the mold ring plate 320 facing towards the second mold plate 420. The mold cavity wall 322 of the mold ring plate 320 is depicted in FIG. 3, together with a second perimeter ridge 340 traversing at least a portion of the perimeter of the mold cavity wall 322. As such, the mold cavity wall 322 of the mold ring plate 320 may include the first perimeter ridge 324 and the second perimeter ridge 340, which divide the mold cavity wall 322 of the mold ring plate 320 into a first wall segment 323, a second wall segment 325, and a third wall segment 327 (see e.g., FIG. 9). The second wall segment 325 is between the first wall segment 323 and the third wall segment 327, and when the first mold 120 is assembled (see e.g., FIG. 9), the first wall segment 323 interfaces with the perimeter wall 452 of the second mold plate 420; the second wall segment 325 faces the mold cavity C; and the third wall segment 327 interfaces with the mold core 224.

When the mold ring plate 320 is layered next to or abuts the first mold plate 220, such as when the first mold 120 is assembled (as shown in FIG. 2), the mold core 224 nests inside the mold cavity wall 322 to at least partially enclose a portion of the mold-ring cavity 328. In addition, the mold core 224 is positioned adjacent the second perimeter ridge 340 to at least partially enclose the mold cavity. For example, referring to FIG. 9, a cross-sectional view is provided, showing the first mold plate 220, the mold ring plate 320, and the second mold plate 420, assembled into the first mold and enclosing a mold cavity C. In addition, FIG. 9 depicts the mold core 224 adjacent the second perimeter ridge 340, and the third wall segment 327 is spaced apart from the mold core 224.

In one aspect of the disclosure, the mold core 224 is adjacent to, and spaced apart from, the second perimeter ridge 340 by a distance large enough to permit gas to flow through, and small enough to impede material flowing from the cavity. For example, in FIG. 9, dashed circles 342 and 344 depict a location at which a perimeter edge of the mold core 224 (e.g., an edge at which the mold cavity wall formed by the mold core transitions to a side wall 231) and the second perimeter ridge 340 are slightly spaced apart to form a vent. In one aspect of the present invention, the vent extends around at least a portion of the mold cavity C. For example, the vent may extend around 50%, 60%, 70%, 80%, 90%, or 100% of the perimeter of the mold cavity C. In a further aspect, the mold cavity C has a first cross-sectional profile as taken along a first plane that is perpendicular to an axis of the fluid channel 348, and the vent includes a second cross-sectional profile as taken along a second plane that is parallel to the first plane. For example, FIG. 9 depicts a longitudinal reference line 235a marking a position of a first plane that is perpendicular to an axis of the fluid channel 348, and a longitudinal reference line 235b marking a position of a second plane parallel to the first plane (the first plane and the second plane extend orthogonal to the view shown in FIG. 9 at longitudinal reference lines 235a and 235b respectively). The first cross-sectional profile and the second cross-sectional profile may be substantially congruent. In another aspect, the distance between the perimeter edge of the mold core 224 and the second perimeter ridge 340 (e.g., the vent width) is in a range of about 0.5 millimeters to about 2.5 millimeters, or about 1.0 to about 2.0 millimeters. The vent identified by the dashed circles 342 and 344 fluidly connects with the open space between the third wall segment 327 and the side wall 231 of the mold core. In this sense, the side wall 231 may form a first vent wall and the third wall segment 327 may form a second vent wall.

Furthermore, as depicted in FIGS. 3 and 9, the mold ring plate 320 includes a surface channel 346 in the first side 338 that extends from the third wall segment 327 (i.e., the second vent wall) to an internal gas channel 348, which extends entirely through a plate body of the mold ring plate and fluidly connects with the gas port 332. As such, in an aspect of the present disclosure, when the first mold 120 is assembled, pressurized gas may be supplied from a GCP system connected to gas port 178 of the hot-runner plate 112, through the fluidly connected channels 458, 348, and 346 and through the vents, to the mold cavity C. The pressure of the gas may vary, and in one aspect, the pressure is in a range of about 550 psi to about 1500 psi. As previously mentioned, the positive pressure may further extend from the mold cavity C, through the runners of the second mold plate 420 and the hot-runner plate 112, and up to a nozzle tip. Likewise, the pressurized gas may be actively pulled (e.g., via negative pressure or vacuum) from, or may passively flow from, the mold cavity C out of the gas port 178. Among other things, this pressurized gas may help maintain a state of material flowed into the mold cavity and control a foaming activity. For example, the runners and the mold cavity C may be pressurized prior to receiving shots of material, and the pressure may be maintained after the shots have been received in the cavity to effectuate a dwell time without the material foaming. After the dwell time, the pressure may be released to trigger a phase transition, including a transition of the supercritical fluid to a gas. In one aspect, the dwell time includes a duration operable to bring a temperature of the thermoplastic elastomer composition in a range conducive to foaming a foam article having properties for a footwear article (e.g., sole).

In a further aspect of the present disclosure, the first mold 120 may include features that contribute to controlling a temperature of the thermoplastic elastomer composition when dispersed into the mold cavity C. For example, the first mold plate 220 may include a first side 229 (see FIG. 1B) that is positionable on a cooling shelf or in a cooling rack to conductively lower a temperature of the first mold plate 220 (e.g., lower a temperature of the mold core 224 and resulting cavity wall that contact the thermoplastic elastomer composition when initially dispersed into the mold cavity). The first mold plate 220 may, in-turn, conductively lower a temperature of the mold ring plate 320, the second mold plate 420, the ambient or pressurized air in the mold cavity C, or any combination thereof. Furthermore, the first mold plate 220, the mold ring plate 320, and the second mold plate 420 may each have a respective plate body constructed of aluminum, which may include conduction properties conducive to lowering a temperature of the first mold 120. As such, the first mold plate 220, the mold ring plate 320, and the second mold plate 420 may be brought to a temperature in a range between 15 degrees Celsius and 90 degrees Celsius prior to receiving the thermoplastic elastomer composition (e.g., by placing the first mold 120 on the cooling rack), such that when the thermoplastic elastomer composition is dispersed into the mold cavity C, a temperature of the thermoplastic elastomer composition may be reduced during the dwell time.

In one aspect, the combination of pressure control and temperature control contributes to molding a foam article having properties desirable for a footwear article. For example, the foam article may have a thickness corresponding to a distance between the mold cavity wall 426 and the core 224 (which also provides a wall to enclose the mold cavity). In one aspect, this distance is in a range of about 10 millimeters to about 50 millimeters, or 12 millimeters to 40 millimeters, or 14 millimeters to 30 millimeters, or 16 millimeters to 22 millimeters, or 16 millimeters to 40 millimeters. As such, when a thermoplastic elastomer composition is disposed into the mold cavity from the gate outlets, the composition may initially be deposited on the core 224. As described above the mold may include a temperature and a pressure that are within a particular range, which may reduce the likelihood that the supercritical fluid will prematurely transition to a gas in a manner that generates undesired properties of the foam article. The pressure of the mold cavity may be held for a dwell time in a range of between about 0.5 sec. to about 20 sec. During this time, the single-phase solution may more fully disperse among the mold cavity, prior to foaming. In addition to the pressure control and temperature control, the location, number, and relative spacing of the gate outlets may also contribute to the foam article having desirable properties. For example, FIG. 8C depicts one aspect in which the six gate outlets are positioned to evenly distribute the single-phase solution in a manner conducive to relatively uniform foaming (e.g., bubble size).

Carrier Plates for Manipulating the Mold

Referring to FIGS. 1A-1E, an aspect of the present disclosure includes the first carrier plate 116 coupled to the first mold plate 220 and the second carrier plate 118 coupled to the second mold plate 420. The first carrier plate 116 and the second carrier plate 118 are operable to manipulate the first mold 120 and the second mold 122 throughout the injection molding process. For example, the first carrier plate 116 and/or the second carrier plate 118 may be used by a plate manipulator (e.g., manual or automated transport device, robot, robotic arm, etc.) to transport the first mold 120 and the second mold 122 from one station to another station during the injection molding process. In other aspects, the first carrier plate 116 and the second carrier plate 118 may be used by a plate manipulator to move mold plates towards one another when assembling the first mold 120 and the second mold 122 or to separate mold plates from one another when molded parts are being unloaded.

In a further aspect, the first carrier plate 116 includes one or more plate-manipulator interfaces configured to mate with or receive a protruding key of a plate manipulator. Furthermore, the one or more plate-manipulator keyways may be asymmetrical in some respect to increase the likelihood that the first carrier plate 116 is properly aligned with a plate manipulator. For example, FIG. 1A depicts a first plate-manipulator keyway 124 that is rectangular and a second plate-manipulator keyway 126 that is circular. As such, a plate manipulator (e.g., robotic arm or other lifting equipment used to grasp, clamp, engage, lift, etc. the first carrier plate 116) may include a rectangular protruding key to mate with the keyway 124 and a circular protruding key to mate with the keyway 126. The asymmetry may help reduce the likelihood that the first carrier plate 116 is engaged while positioned or aligned improperly (e.g., backwards), since the keys of the plate manipulator would not fit in the misaligned keyways. Although FIG. 1A depicts two plate-manipulator keyways, in other aspects the first carrier plate 116 may include a single keyway that is asymmetrical (e.g., irregular rectangle) or may include more than two keyways.

Figure 1B:
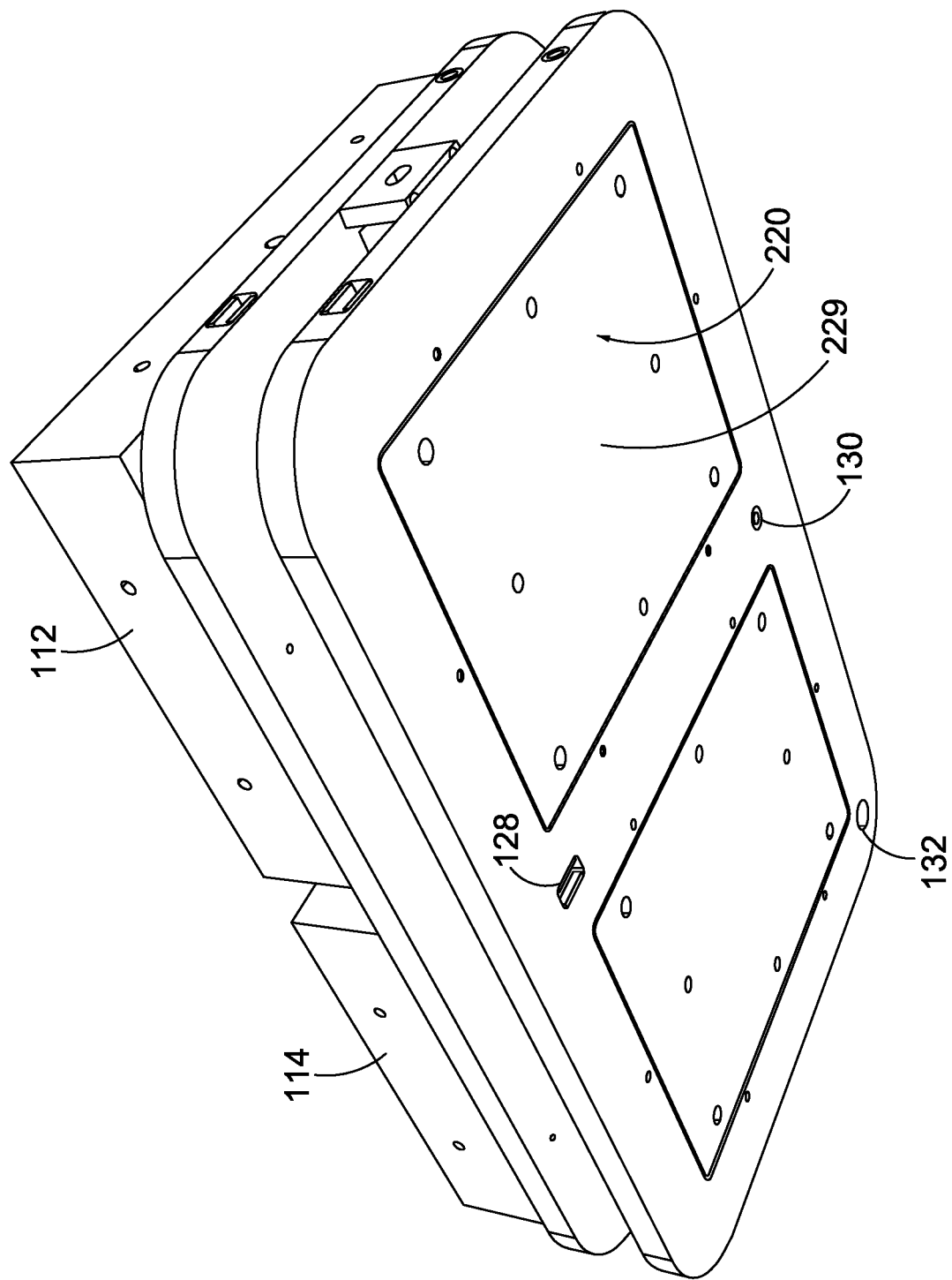
Figure 1C:
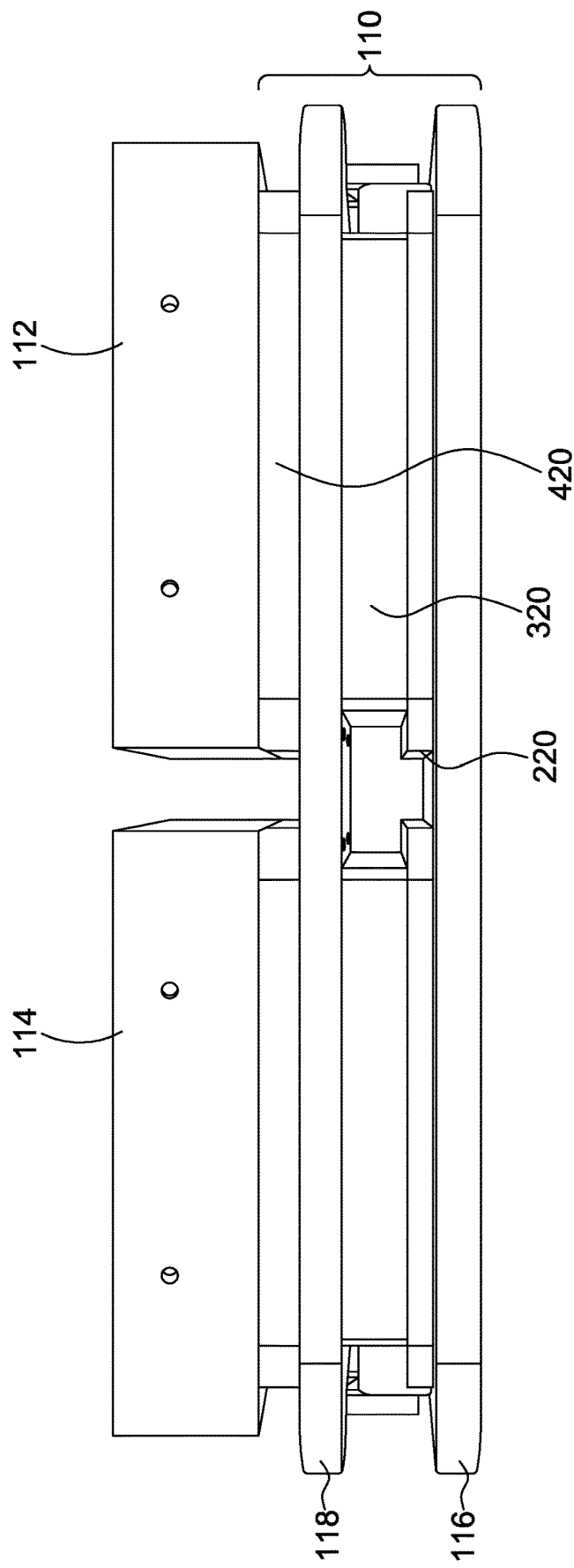
Figure 1D:
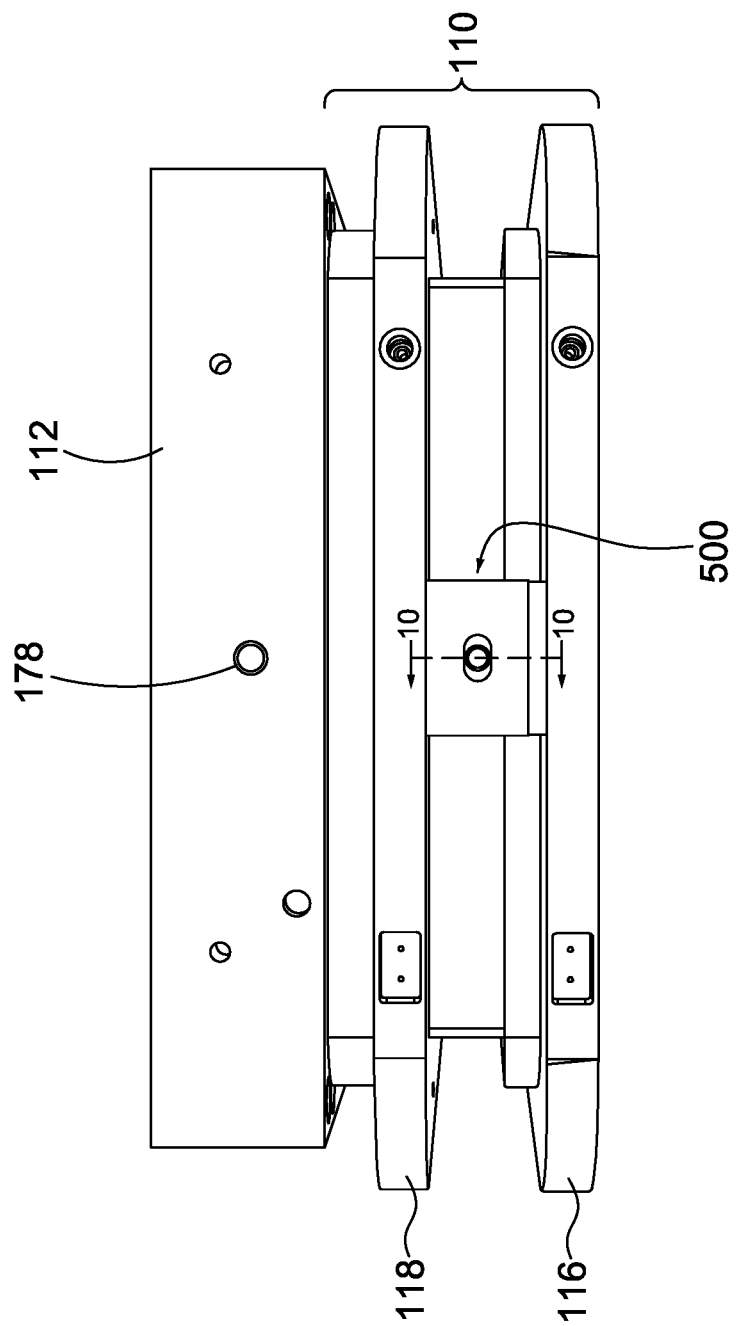
Figure 1E:
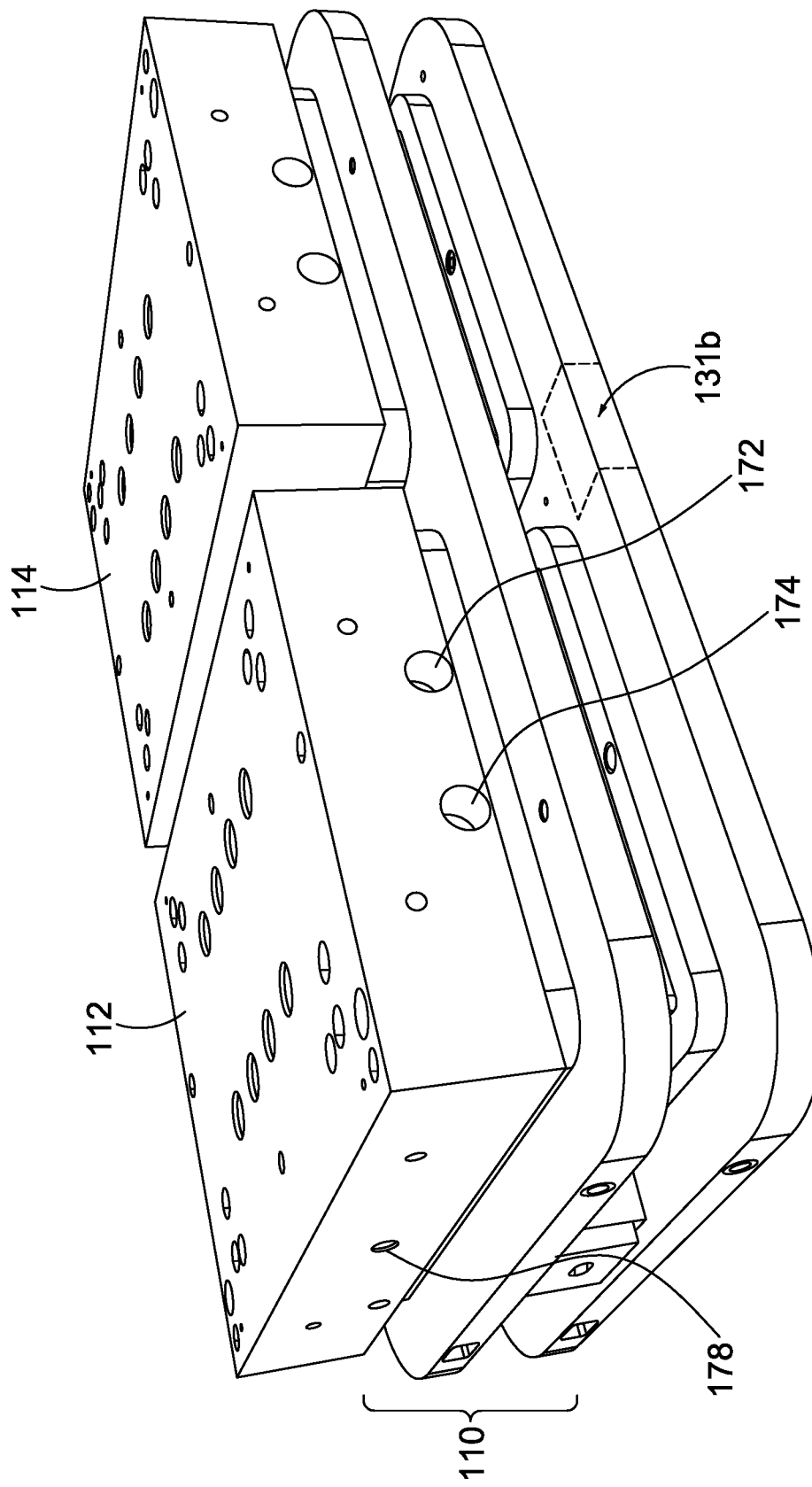

Referring to FIG. 1B, a bottom side of the first carrier plate 116 is depicted. In one aspect of the present disclosure, the first carrier plate 116 includes a cutout for receiving the first mold plate 220. For example, the first side 229 of the first mold plate 220 is exposed on the bottom side of the first carrier plate 116. In some instances, exposing the first side 229 of the first mold plate 220 may allow the first side 229 to directly contact a temperature conditioning system, such as a cooling shelf or cooling rack, to facilitate conductive cooling. In another aspect of the present disclosure, the bottom side of the first carrier plate 116 includes one or more plate-alignment interfaces (e.g., keyways) configured to mate with or receive a protruding key of a shelf or other support surface (e.g., cooling rack, injection-molding station, unloading station, etc.). Furthermore, the one or more plate-alignment keyways may be asymmetrical in some respect to increase the likelihood that the first carrier plate 116 is properly aligned on the shelf or support surface. For example, FIG. 1B depicts a first plate-alignment keyway 128 that is rectangular and a second plate-manipulator keyway 130 that is circular. As such, a shelf or other support surface may include a rectangular protruding key to mate with the keyway 128 and a circular protruding key to mate with the keyway 130. The asymmetry may help reduce the likelihood that the first carrier plate 116 is misaligned or backwards when placed on a shelf or support surface, since the keys of the shelf or support surface would not fit in the misaligned keyways. Although FIG. 1B depicts two keyways, in other aspects the first carrier plate 116 may include a single plate-alignment keyway that is asymmetrical (e.g., irregular rectangle) or may include more than two keyways.

With continued reference to FIG. 1B, the bottom side of the first carrier plate 116 may include an RFID port 132 for retaining an RFID device (not shown). The RFID device may be used to track the first mold 120 and the second mold 122 as the molds are moved through different stations of an injection molding system. In addition, in FIG. 1B a side of the first mold plate 220 facing away from the mold ring plate 320 can be seen seated in the first carrier plate 116. As such, a perimeter ledge 227 (see e.g., FIG. 2) of the first mold plate 220 may rest atop the first carrier plate 116, and as shown in FIG. 3, one or more mechanical fasteners (e.g., 223) may couple the perimeter ledge 227 to the first carrier plate 116.

Referring to FIGS. 1A and 1E, in a further aspect, the first carrier plate 116 includes one or more clamp zones 131a and 131b. For example, each clamp zone 131a and 131b is configured to mate with, and be engaged by, a respective clamp at one or more stations of the injection molding system. For example, when the tooling assembly 110 is located at a part-unloading station, one or more clamps may lock onto the first carrier plate at the clamp zones 131a and 131b. As such, when the second carrier plate 118 is lifted, the first carrier plate 116 remains stationary on a support surface, and one or more of the mold plates are permitted to separate.

In another aspect of the present disclosure, the second carrier plate 118 includes one or more plate-manipulator keyways configured to mate with or receive a protruding key of a plate manipulator. Furthermore, the one or more plate-manipulator keyways may be asymmetrical in some respect to increase the likelihood that the second carrier plate 118 is properly aligned with a plate manipulator. For example, FIG. 1A depicts a first plate-manipulator keyway 125 that is rectangular and a second plate-manipulator keyway 127 that is circular. As such, a plate manipulator (e.g., manual or automated lift device used to lift the second carrier plate 118) may include a rectangular protruding key to mate with the keyway 125 and a circular protruding key to mate with the keyway 127. The asymmetry may help reduce the likelihood that the second carrier plate 118 is engaged while positioned or aligned improperly (e.g., backwards), since the keys of the plate manipulator would not fit in the misaligned keyways. Although FIG. 1A depicts two plate-manipulator keyways, in other aspects the second carrier plate 118 may include a single keyway that is asymmetrical (e.g., irregular rectangle) or may include more than two keyways.

Referring to FIG. 4, the second carrier plate 118 includes a ring-plate cutout sized and shaped to receive the mold ring plate 320. As such, the second carrier plate 118 may extend around at least a portion of the mold ring plate 320. However, in one aspect of the disclosure, the second carrier plate 118 is not affixed directly to the mold ring plate 320, such as with a mechanical faster; rather, the second mold plate 420 may be positioned atop, and coupled directly to, the second carrier plate 118. For example, FIG. 5 depicts mechanical fasteners (e.g., 421) that may couple the second mold plate 420 to the second carrier plate 118.

Tooling Latch Assembly

Figure 10:
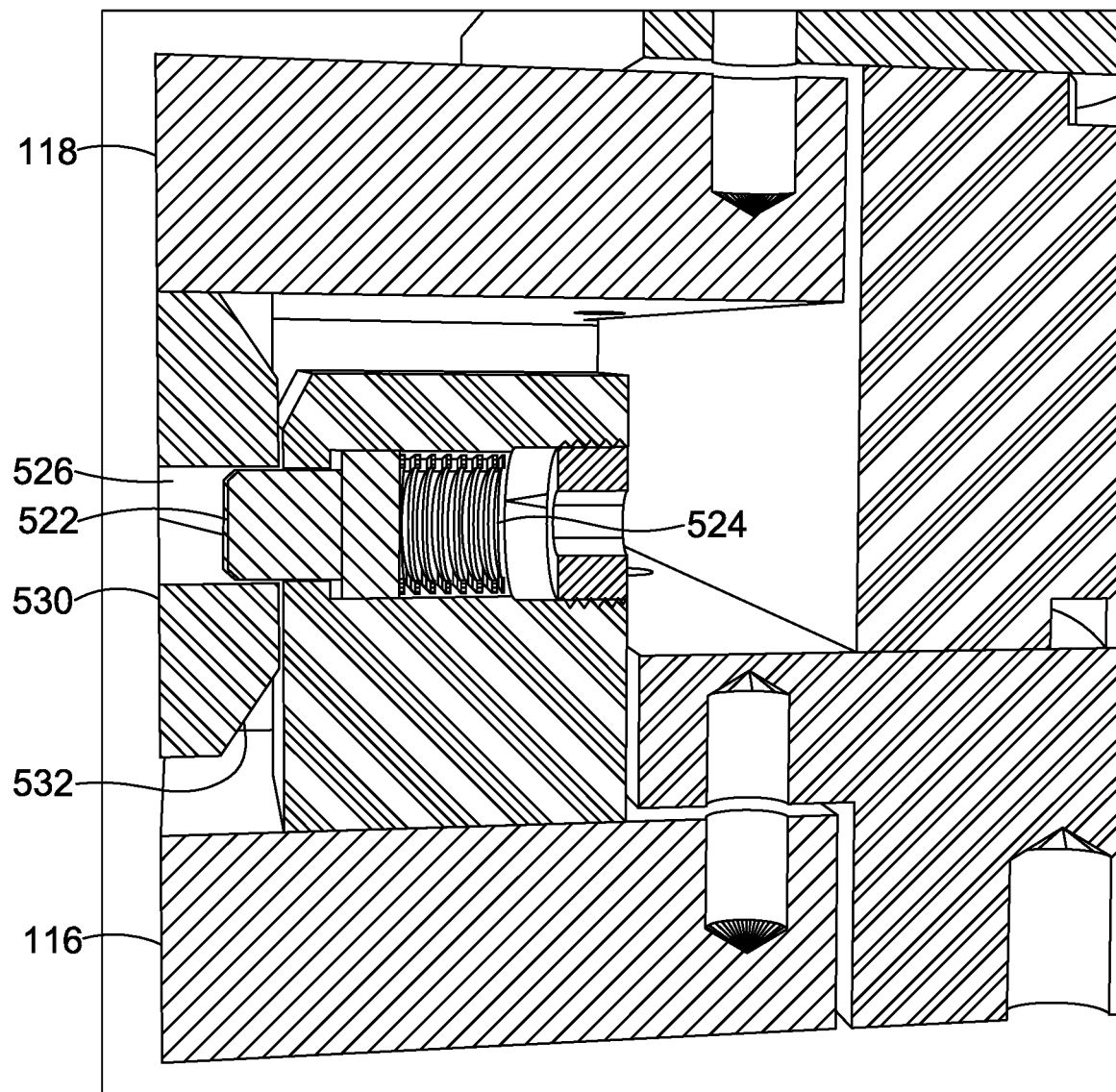
FIG. 10 depicts a cross-sectional view of the tooling latch assembly taken along the 10-10 reference line in FIG. 1D, in accordance with an aspect of the present disclosure.
Figure 11A:
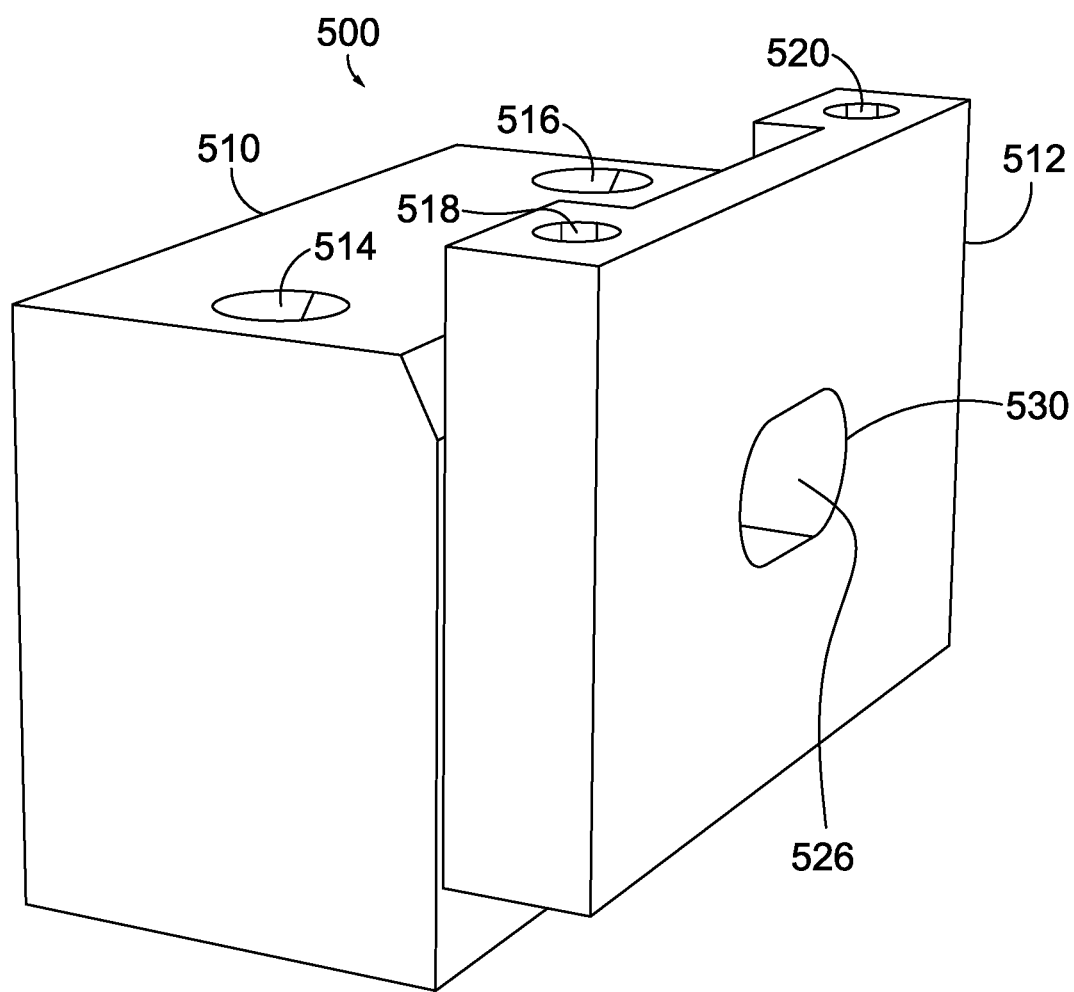
FIGS. 11A-11D depict different perspectives of the tooling latch assembly.
Figure 11B:
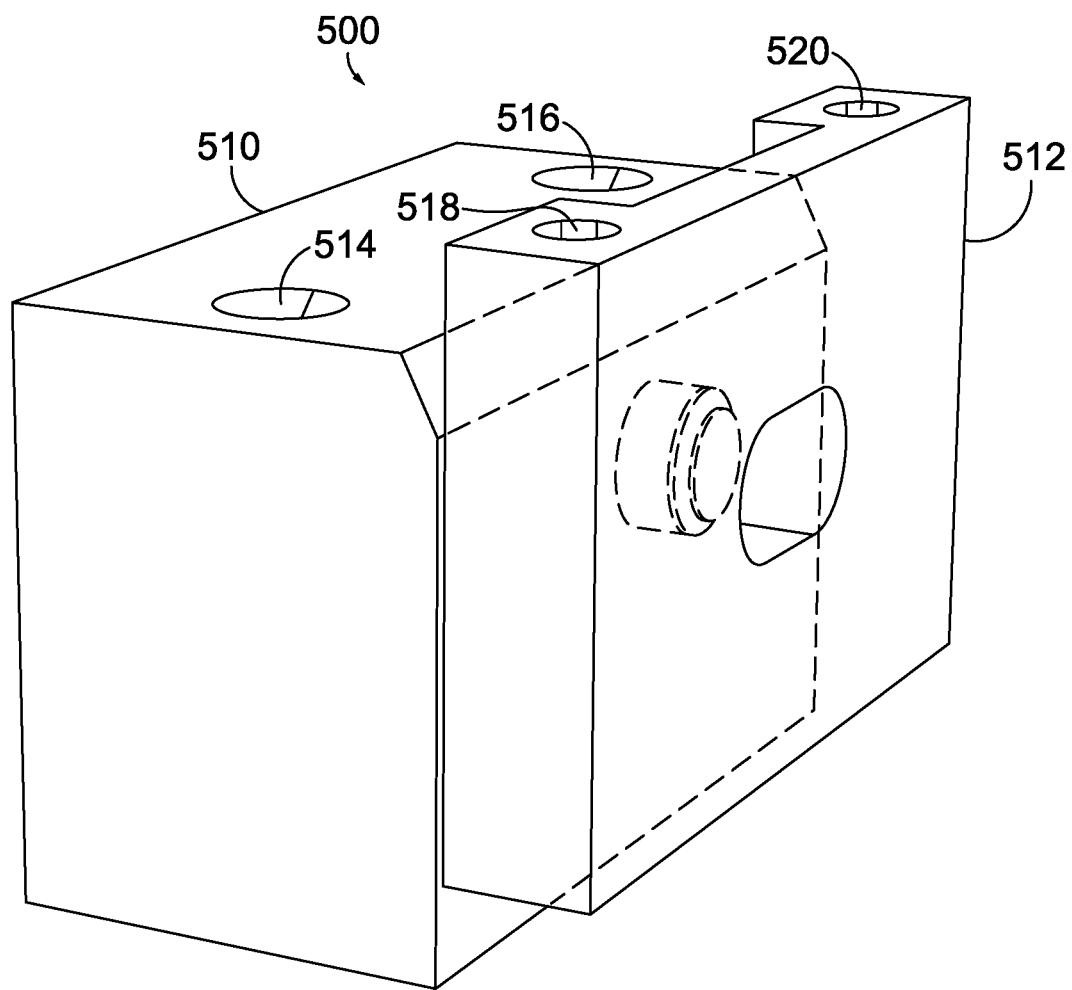
Figure 11C:
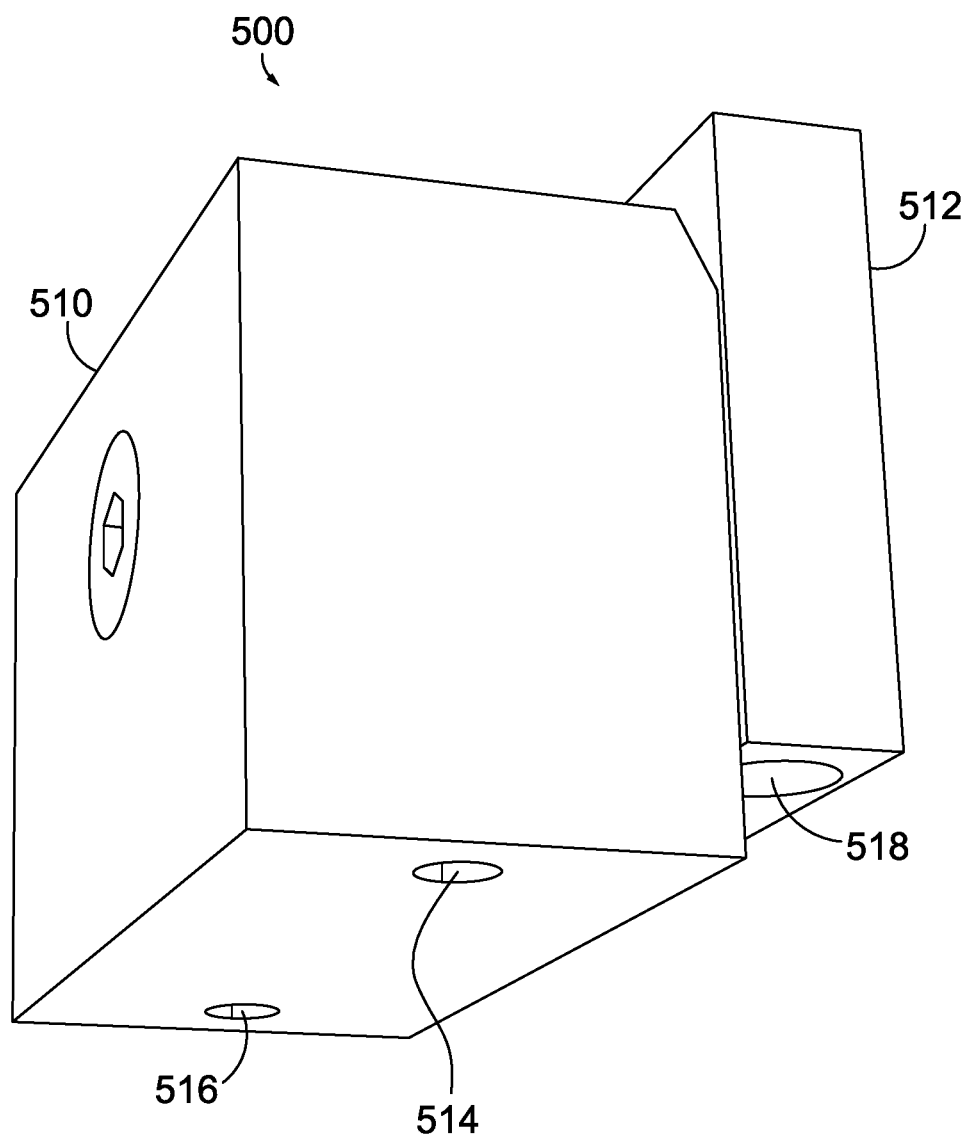
Figure 11D:
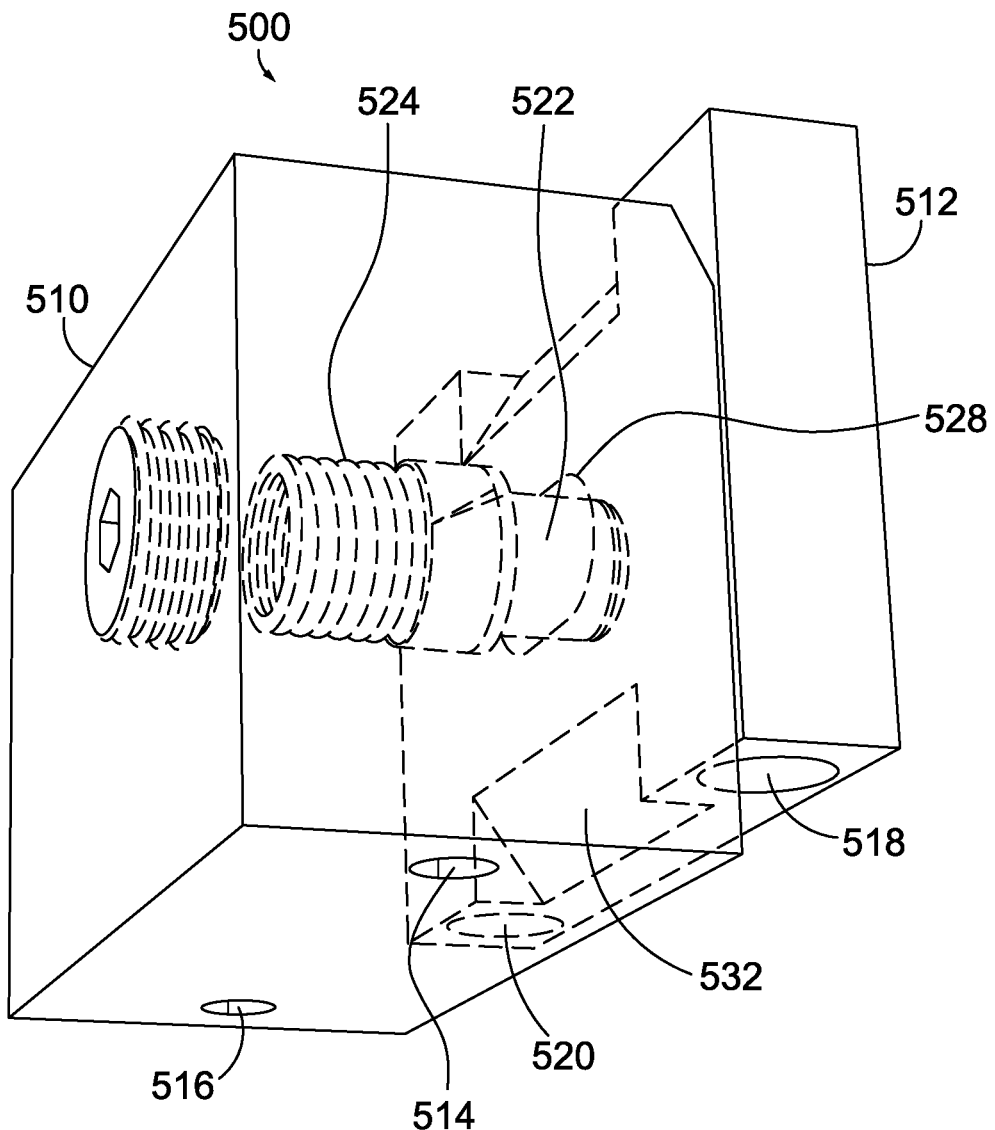

In another aspect of the present disclosure, referring to FIGS. 1D, 10, and 11A-11D, a tooling latch assembly 500 may releasably couple the first carrier plate 116 to the second carrier plate 118. The tooling latch assembly 500 may include a first latch base 510 coupled to the first carrier plate 116 (e.g., by one or more mechanical fasteners), and a second latch base 512 coupled to the second carrier plate 118 (e.g., by one or more mechanical fasteners). For example, FIGS. 11C and 11D depict a first fastener hole 514 and a second fastener hole 516 for receiving a first and second fastener (respectively) for attaching the first latch base 510 to the first carrier plate 116. In addition, FIGS. 11A and 11B depict a third fastener hole 518 and a fourth fastener hole 520 for receiving a third and fourth fastener (respectively) for attaching the second latch base 512 to the second carrier plate 118. In addition, the first latch base 510 includes a pin (see e.g., 522 in FIGS. 10, 11B, and 11D) that is biased toward the second latch base 512. For example, FIGS. 10 and 11B illustrate a spring or other resilient member 524 that applies a force on the pin 522 in a direction towards the second latch base 512. In addition, the second latch base 512 includes a pin-receiving through-hole 526 having a first end 528 towards the first latch base 510 and a second end 530 opposite the first end 528. In one aspect of the disclosure, when the through-hole 526 is axially aligned with the pin 522, the biasing force of the resilient member 524 thrusts the pin 522 into the first end 528 of the through-hole 526 to latch or couple the first carrier plate 116 to the second carrier plate 118.

The tooling latch assembly 500 may be coupled and decoupled in various manners. For example, when the tooling latch assembly 500 is in a coupled arrangement and the pin 522 is biased into the through-hole 526, then another pin (not shown) may be inserted into the second end 530 of the through-hole 526 to push the pin 522 against the biasing member 524, thereby causing the biasing member 524 to compress, at least until the pin 522 clears the first end 528. Once the pin 522 clears the first end 528, the second latch base 512 may be separated from the first latch base 510. For example, a robot arm configured to lift the second carrier plate 118 may include keys to engage the keyways 125 and 127 and a pin for insertion into the through-hole 526. As such, when the robot arm engages the second carrier plate 118, it may near simultaneously insert keys into the keyways and the pin into the through-hole, at which time, the robot arm may separate the second carrier plate 118 from the first carrier plate 116.

In a further aspect, the second latch base 512 includes an angled cam surface 532 that is alignable with an end of the pin 522. As such, to reconnect the tooling latch assembly 500 (e.g., when the second latch base 512 and the angled cam surface 532 are above the protruding pin), the second latch base 512 may be moved downward, thereby causing the angled cam surface 532 to contact the protruding end of the pin 522 and push the pin 522 into the first latch base 510 and compress the biasing member 524. Once the second latch base 512 is moved to a position aligning the pin 522 with the first end 528 of the through-hole 526, the force from the biasing member 524 pushes the pin into the through-hole 526.

The first carrier plate 116 and the second carrier plate 118 may be exposed to various operations, manipulation, and engagements with plate manipulators. As such, the first carrier plate 116 and the second carrier plate 118 may be constructed of steel to improve durability and reduce damage susceptibility when repeatedly engaged during various injection molding cycles.

Single Gate Aspects

In other aspects, rather than the use of multiple gate outlets 434, 436, 438, 440, 442 and 444 within each mold cavity wall 425 (see, e.g. FIG. 4) as described above with respect to FIGS. 1A-11D, it has been found that a single gate system, having only a single gate outlet within each mold cavity wall 425 may offer advantages in some aspects. Such a single gate system and components for forming an article comprising a foamed thermoplastic elastomer composition is depicted in FIGS. 12A-21E. Many of the features and components of the injection molding single gate system depicted in FIGS. 12A-21E are the same, or similar, to those depicted and described above with respect to FIGS. 1A-11D, and as such, they are not further described below. Those features and components of the injection molding single gate system depicted in FIGS. 12A-21E that are the same as, or similar to, the description above with respect to FIGS. 1A-11D are depicted with the same reference numerals, and share the same above-described features.

Figure 12A:
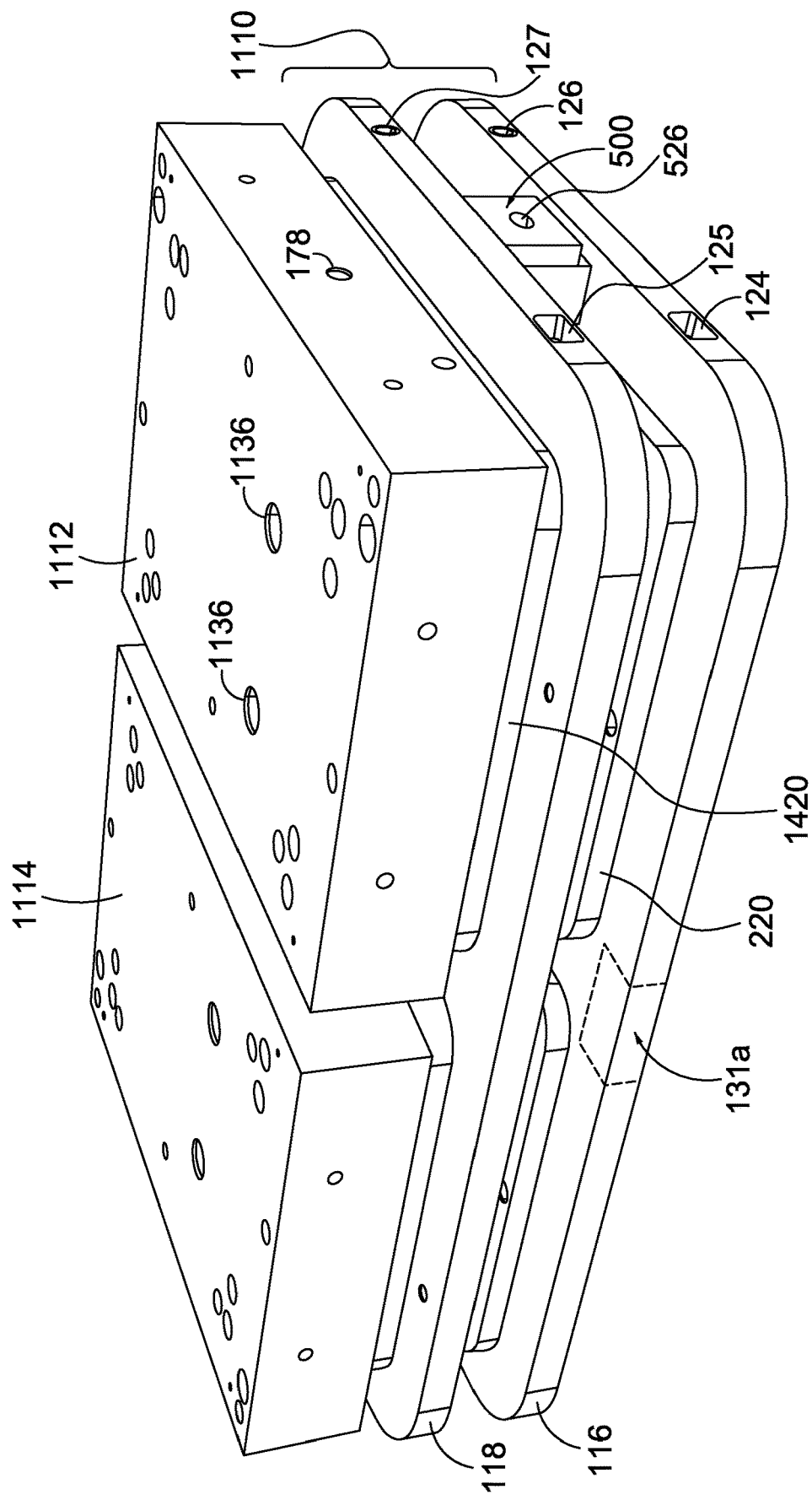
FIGS. 12A-12E depict various perspectives of a pair of hot-runner plates combined with a tooling assembly, in accordance with another aspect of the present disclosure.
Figure 12B:
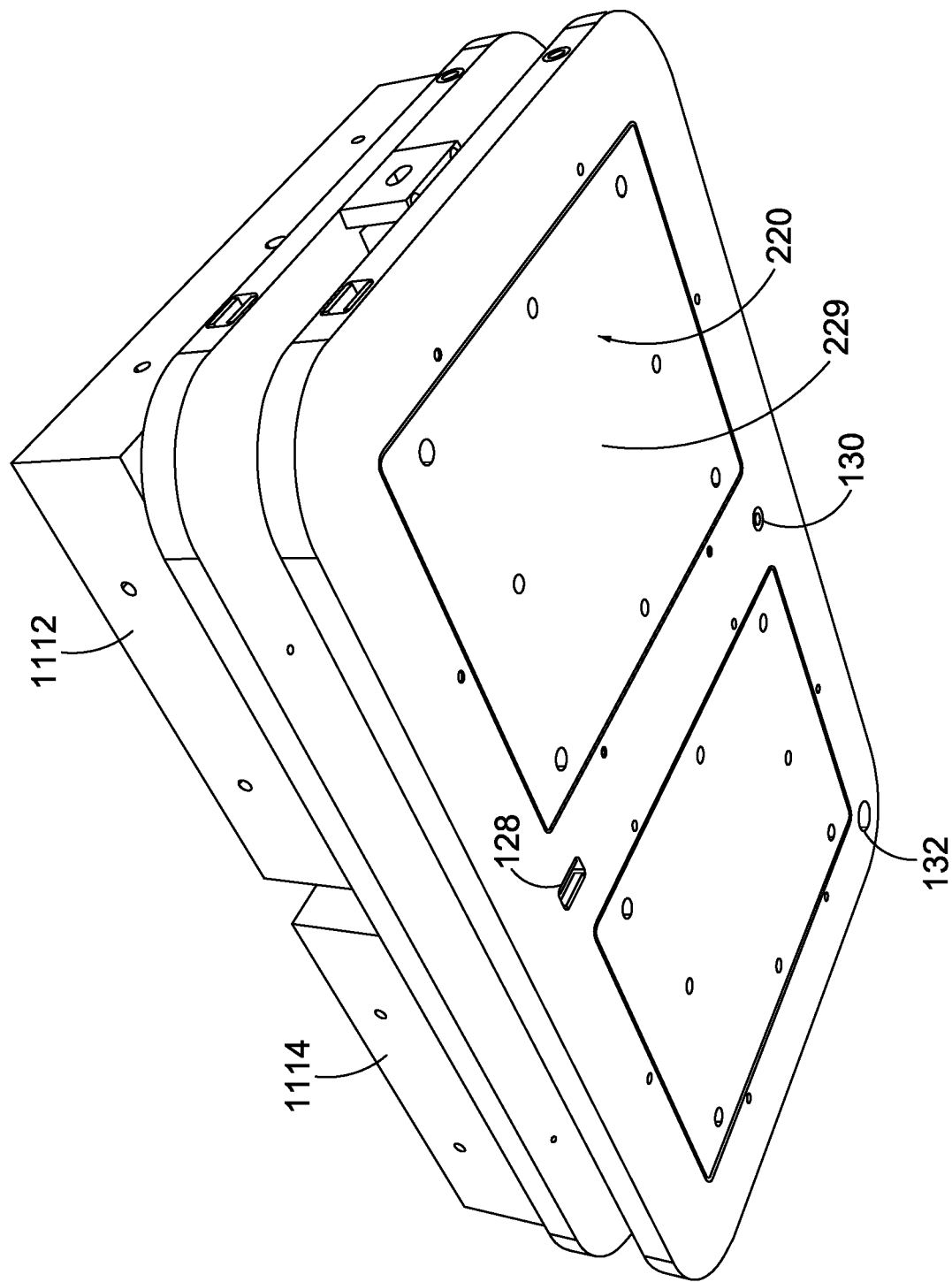
Figure 12C:
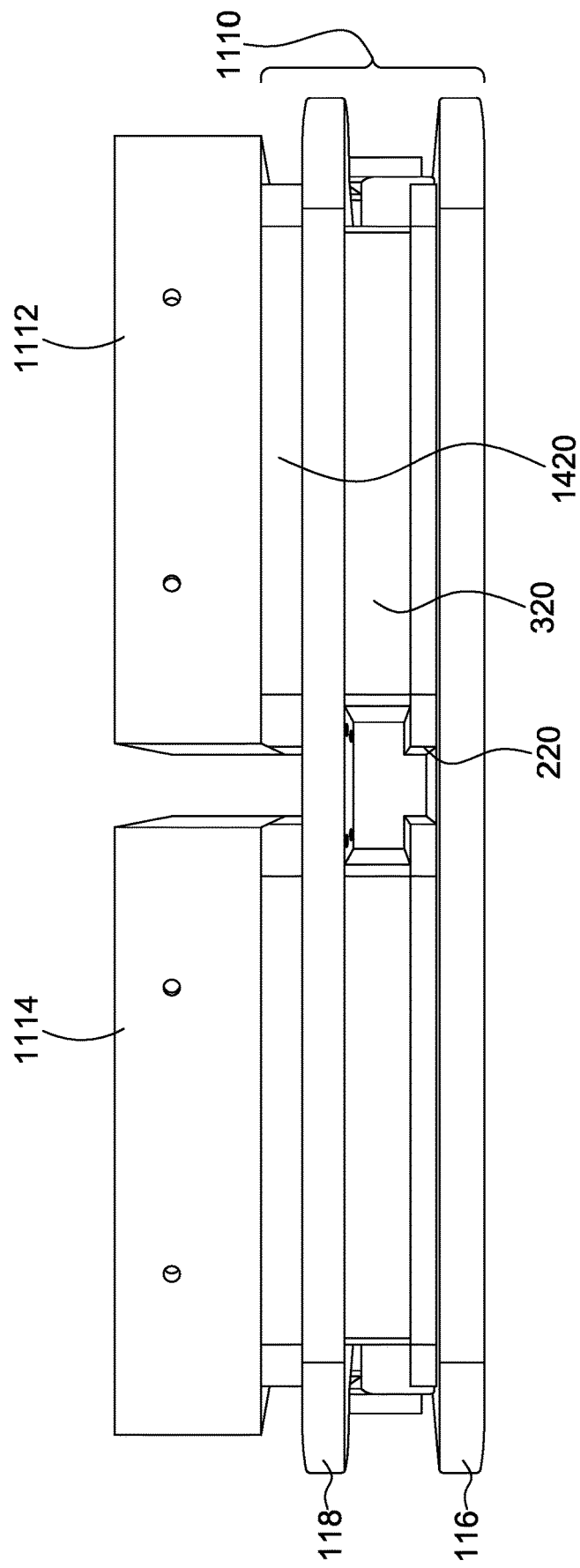
Figure 12D:
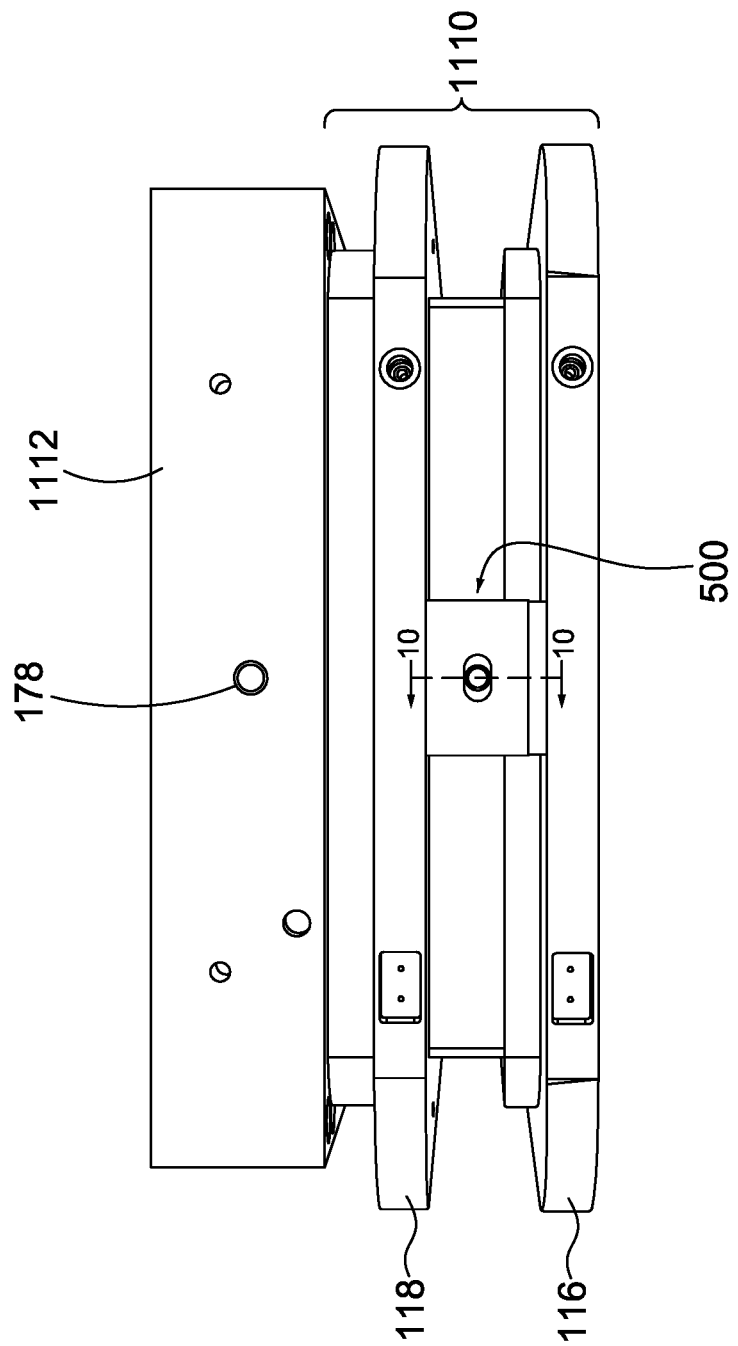

As shown in FIG. 12A, the single gate system includes a tooling assembly 1110 that is similar in many respects to tooling assembly 110 described above. Tooling assembly 1110 is illustrated in combination with a first hot-runner plate 1112 and a second hot runner plate 1114. The tooling assembly 1110 includes one or more injection molds coupled to a first carrier plate 116 and a second carrier plate 118, which may support the one or more molds during one or more stages of an injection-molding process (e.g., when the molds are being transported from one station to another station, when the part(s) are being unloaded, etc.). For instance, referring to FIG. 13, the hot-runner plates 1112 and 1114 and the carrier plates 116 and 118 have been omitted to unobstructedly illustrate a first mold 1120 and a second mold 1122. The first hot-runner plate 1112 interfaces with the first mold 1120, and the second hot-runner plate 1114 interfaces with the second mold 1122 to distribute one or more deposits or shots of thermoplastic elastomer composition (e.g., single-phase solution or other composition having a foaming agent) into mold cavities.

Figure 14:
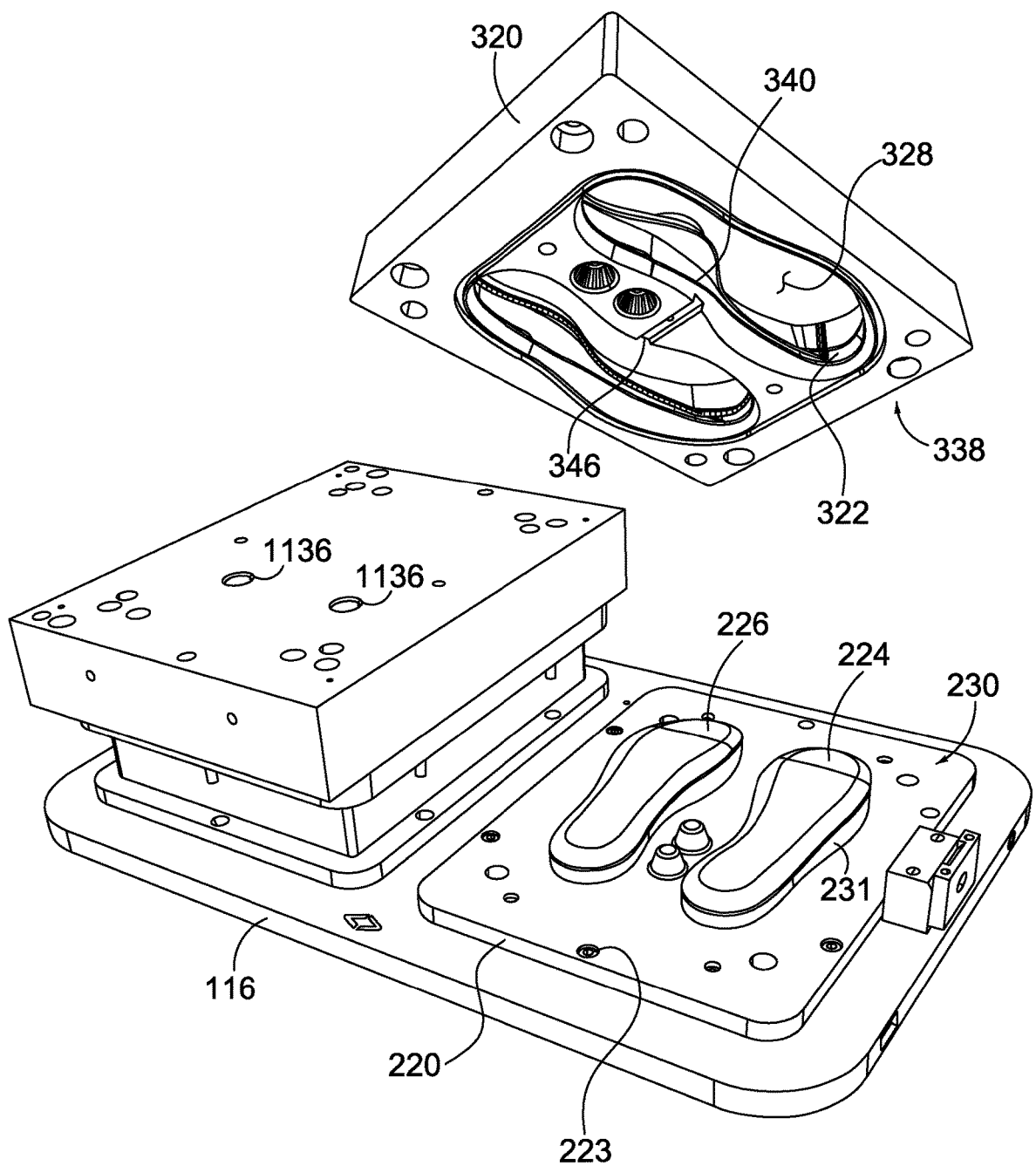
FIG. 14 depicts a partially exploded view of the tooling assembly of FIGS. 12A-12E, showing a mold ring plate separated from a first mold plate, in accordance with another aspect of the present disclosure.

For purposes of this disclosure, various elements of the first mold 1120 are described, and it is understood that the second mold 1122 may have similar elements, although not explicitly described. For example, the first mold 1120 includes a first mold plate 220, a mold ring plate 320, and a second mold plate 1420, and the second mold 1122 might also include a respective first mold plate 221, a respective mold ring plate 321, and a respective second mold plate 1421 having similar elements. The first mold plate 220, the mold ring plate 320, and the second mold plate 1420 are layerable (e.g., stackable) to form one or more cavities for receiving a deposit of a thermoplastic elastomer composition. For example, FIG. 14 depicts a partially exploded view including the first mold plate 220 and the mold ring plate 320 separated from one another. In this partially exploded view of FIG. 14, a portion of a first mold cavity and a portion of a second mold cavity can be seen, each of which is shaped to form at least a portion of a footwear sole. Although the first mold 1120 includes two mold cavities, in other aspects, a mold may include fewer or more mold cavities.

In this disclosure, various elements of the first mold cavity are described, and it is understood that the second mold cavity may have similar elements, although not explicitly described. For example, the first mold cavity may be at least partially enclosed by a mold core 224, and the second mold cavity may include a similar mold core 226 (although a mirror image). In one aspect of this disclosure, the mold core 224 is nestable in a mold-ring cavity 328 when the mold ring plate 320 is layered against or abutting the first mold plate 220.

Figure 15:
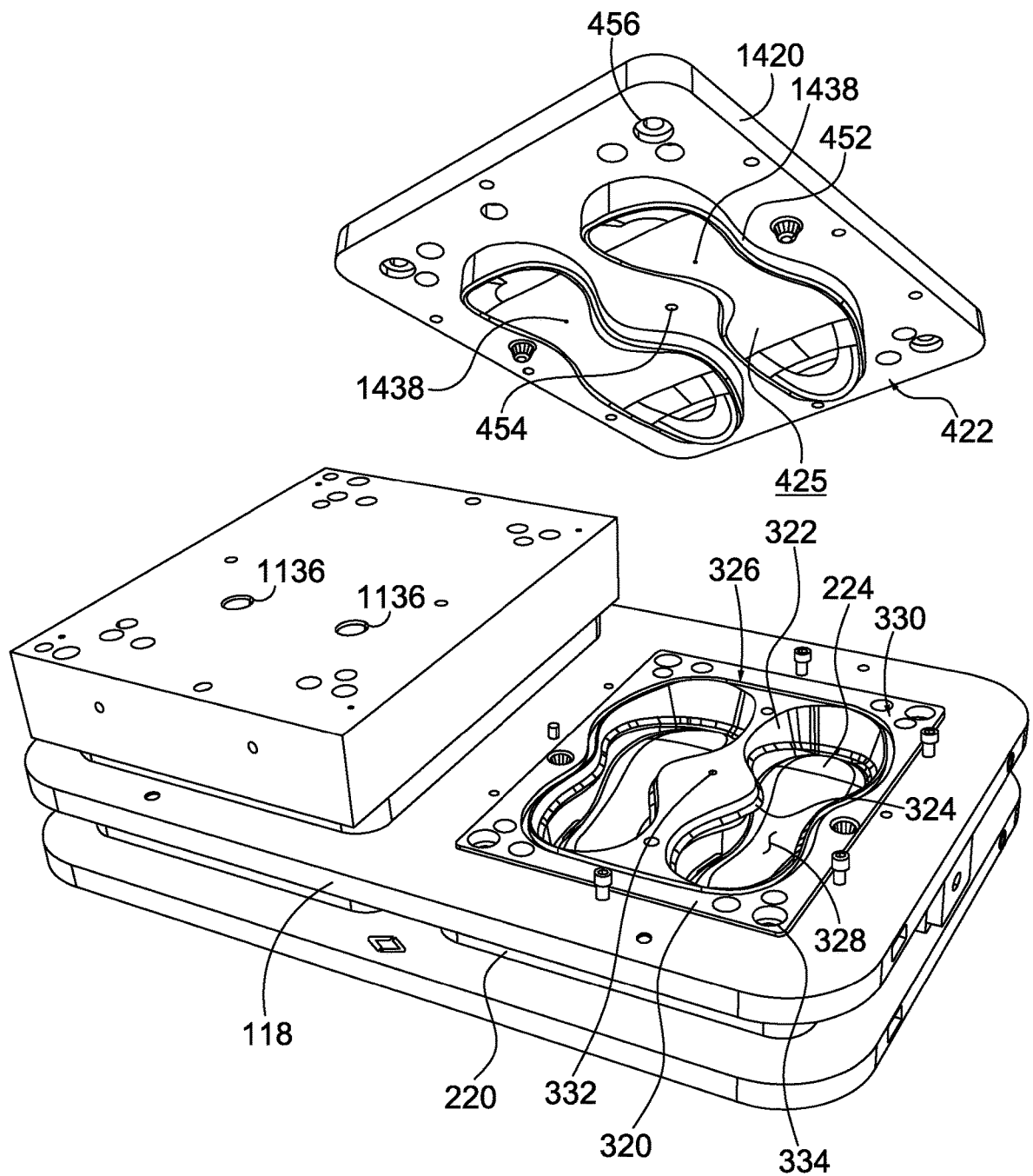
FIG. 15 depicts another partially exploded view of the tooling assembly of FIGS. 12A-12E, showing a second mold plate separated from the mold ring plate, in accordance with another aspect of the present disclosure.

Referring to FIG. 15, the mold ring plate 320 is illustrated as layered directly against and abutting the first mold plate 220, and the mold core 224 is depicted nested in the mold-ring cavity 328, such that the mold core 224 forms a first mold cavity wall. In addition, FIG. 15 depicts a partially exploded view with the second mold plate 1420 being separated from the mold ring plate 320. The second mold plate 1420 may be positioned directly against (e.g., abutting) the mold ring plate 320 to more fully enclose the mold-ring cavity 328. The second mold plate 1420 may also include one or more runners and gates through which the thermoplastic elastomer composition may flow when being deposited into the cavities, as further described below.

Figure 18A:
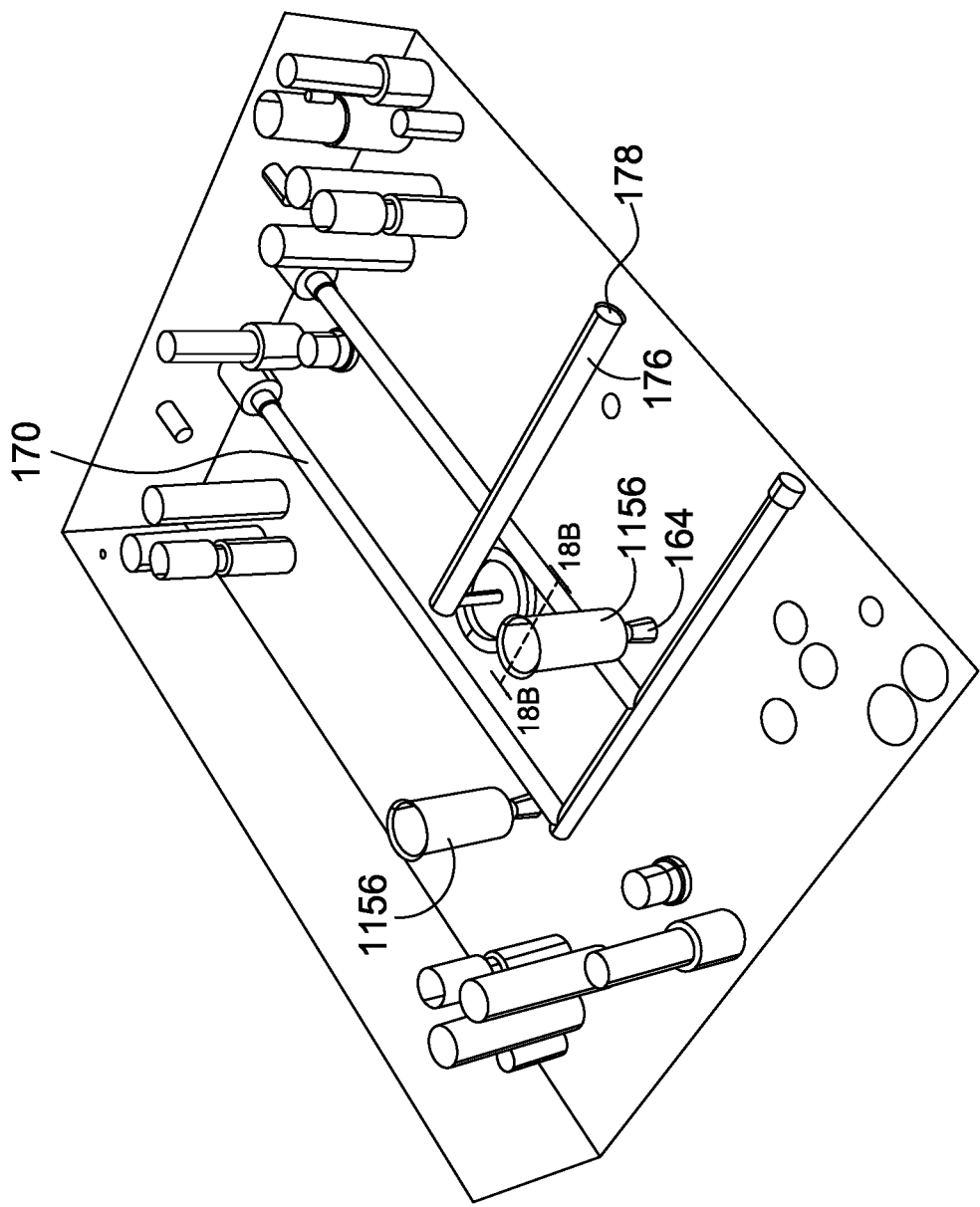
FIG. 18A depicts internal components of a hot-runner plate, in accordance with another aspect of the present disclosure.

To deliver the one or more deposits or shots of thermoplastic elastomer composition into mold cavities, the hot-runner plates 1112 and 1114 have at least one nozzle receiving opening 1136 for each mold cavity. As shown in FIG. 12A, the hot-runner plate 1112 has two nozzle receiving openings 1136, one for each mold cavity as further described below. Similarly, the hot-runner plate 1114 has two nozzle receiving openings 1136, one for each mold cavity. As shown in FIGS. 18A and 18B, some of the walls of the hot-runner plate 1112 are omitted to illustrate some interior components of the hot-runner plate 1112 in more detail. Each nozzle receiving opening 1136 is the entry point for a nozzle receiving sleeve 1156, similar to the nozzle receiving sleeve 156 described above with respect to FIGS. 7A and 7B. More specifically, each nozzle-receiving sleeve 1156 also includes a sleeve outlet (e.g., 158 in the cross-sectional view of FIG. 18B). The sleeve outlet 158 includes a perimeter rim 160 that forms a nozzle seat 162 against which a tip of a nozzle biases when the nozzle is fully inserted into the nozzle-receiving sleeve 156.

Figure 16:
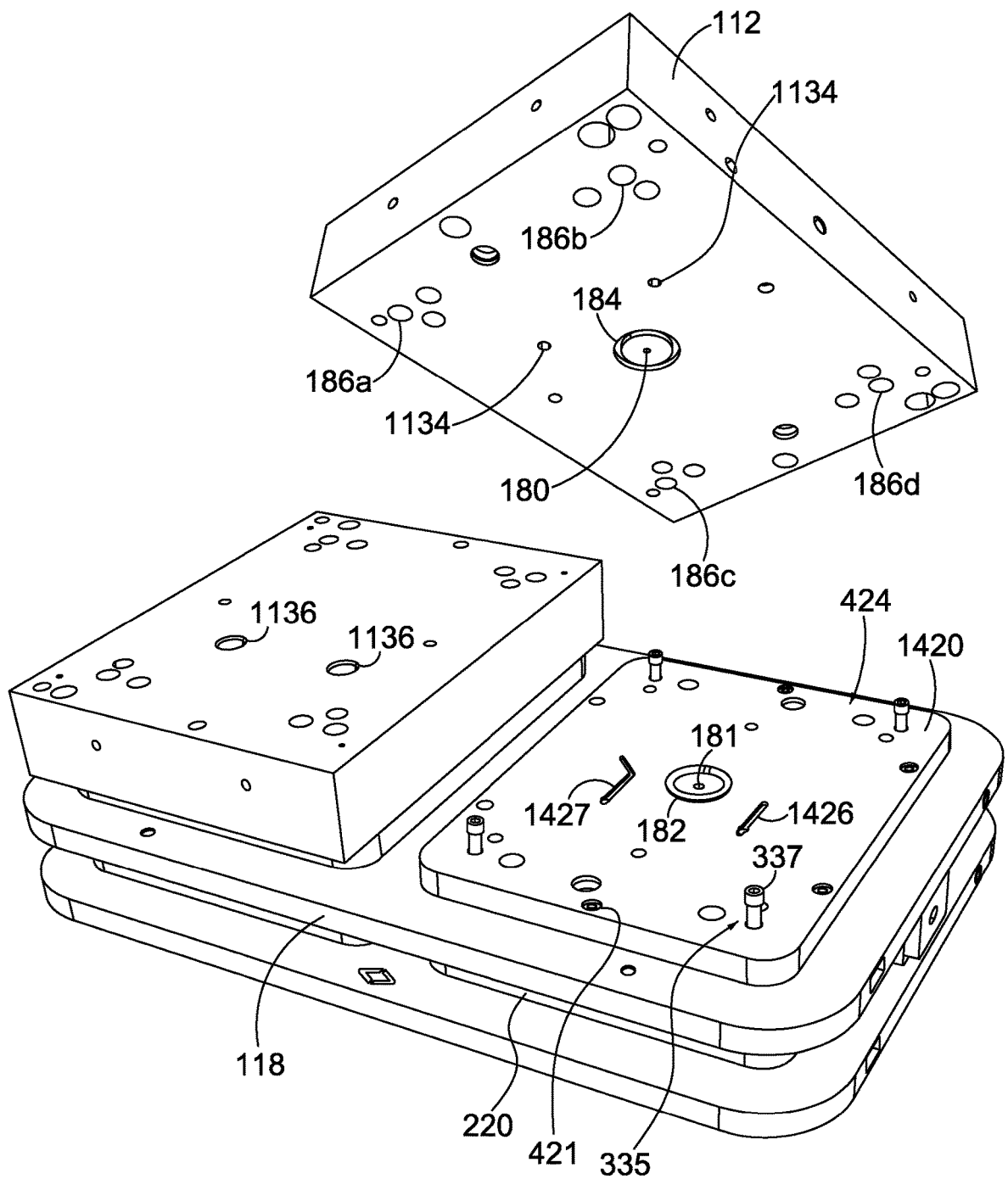
FIG. 16 depicts another partially exploded view of the tooling assembly of FIGS. 12A-12E, showing a hot-runner plate separated from the second mold plate, in accordance with another aspect of the present disclosure.

The hot-runner plate 1112 also includes hot runners (e.g., 164) that transport material from each nozzle after being dispensed. For example, each hot runner (e.g., 164) includes a hot-runner inlet (e.g., 166 in FIG. 18B) that fluidly connects with the sleeve outlet (e.g., 158 in the cross-sectional view of FIG. 18B) and includes a hot-runner outlet 1134 (see also FIG. 16 showing the hot-runner outlets 1134). In an aspect of the present disclosure, the hot-runner inlet 166 is spaced apart from the hot-runner outlet 1134 by a distance in a range of about 1 cm to about 3 cm. As such, when material is dispersed from the nozzle, a sprue is formed in the hot runner 164, the sprue having a length in a range of about 1 cm to about 3 cm. In an aspect of the present disclosure, this sprue length provides a grasping region at which a tool can grip the sprue for removing solidified material from the runners in the second mold plate 1420.

Figure 12E:
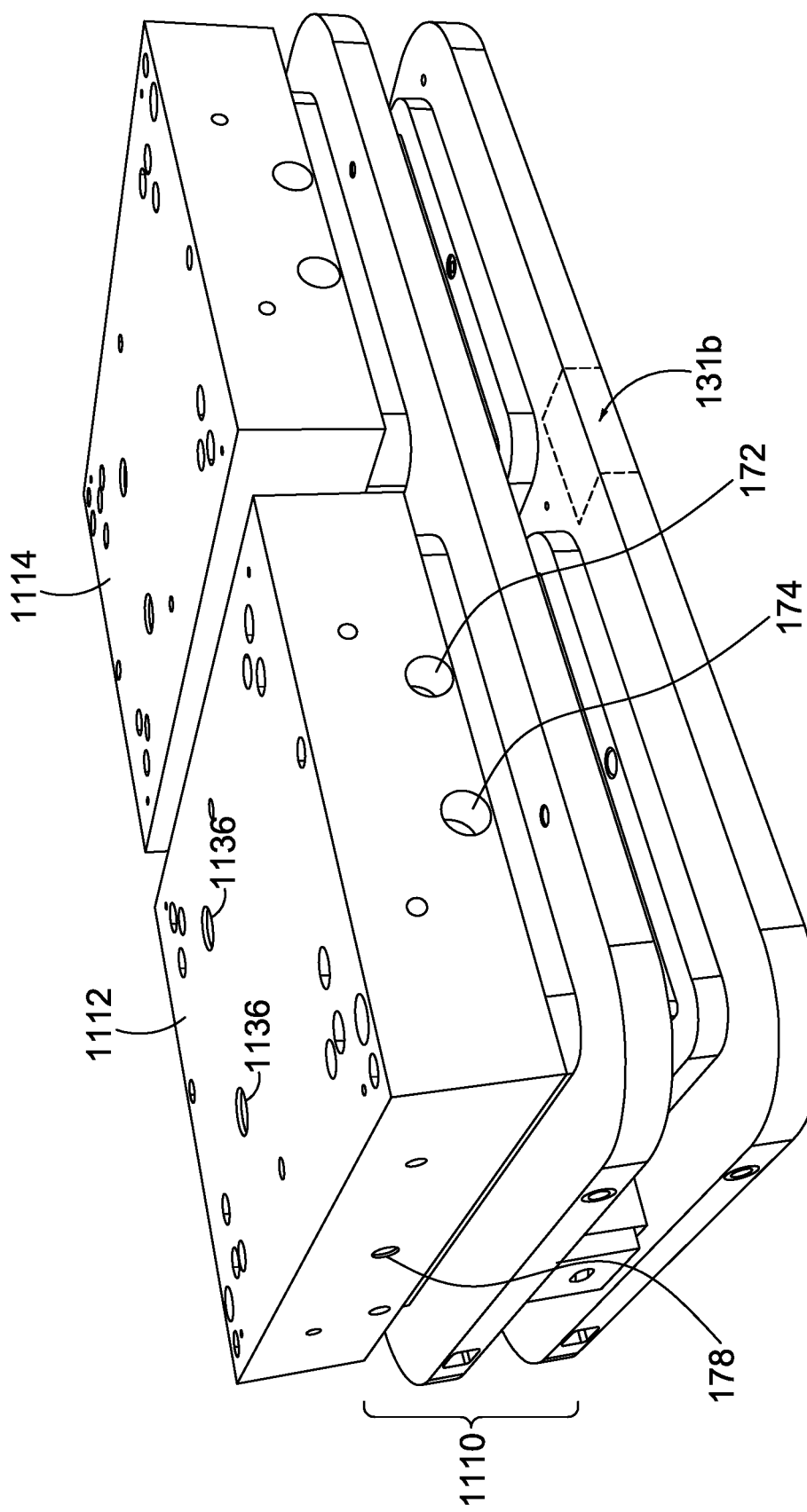

Like hot-runner plate 112, the hot-runner plate 1112 includes various components to help control conditions related to the injection-molding system. For example, the hot-runner plate 1112 includes conditioned-fluid lines 170 for transporting conditioned fluid throughout the hot-runner plate 1112. The conditioned fluid may be conditioned to include a temperature for maintaining, increasing, or decreasing a temperature of components of the hot-runner plate 1112, including the hot runners (e.g., 164), the nozzle-receiving sleeves 1156, and the nozzles 1138 (see FIG. 17) when inserted in the sleeves (see also FIG. 12E depicting a conditioned-fluid inlet 172 and a conditioned fluid outlet 174 positioned on an exterior wall of the hot-runner plate 1112). As such, when the thermoplastic elastomer composition (e.g., single-phase solution with supercritical fluid as physical foaming agent) is dispensed from a nozzle 1138, the temperature in the hot runner 164 may be maintained high enough to delay transition of the supercritical fluid to a gas.

In a further aspect, the hot-runner plate 1112 includes a gas conduit 176 having a first gas port 178 (see e.g., FIGS. 12A and 18A) for fluidly communicating with a gas counter pressure (GCP) system and a second gas port 180 or "gas-conduit port" (see e.g., FIG. 16) for fluidly communicating with a gas port 181 (also referred to as "fluid-channel port") of the second mold plate 1420. In addition, the side of the hot-runner plate 1112 facing towards the mold includes a seal assembly for a sealing and mating contact with the second mold plate 1420. For example, FIG. 16 depicts a seal groove 184 that receives a resilient seal 182. The second mold plate 1420 may additionally, or alternatively, include a seal groove. In some aspects of the present disclosure, the GCP system is fluidly connected from the gas port 178 on the hot-runner plate 1112 to the sleeve outlet (e.g., 158 in FIG. 18B). As such, when the thermoplastic elastomer composition (e.g., single-phase solution with supercritical fluid as physical foaming agent) is dispensed from a nozzle 1138, the pressure in the mold cavity and runners may be maintained high enough to delay transition of the supercritical fluid to a gas.

In one aspect of the present disclosure, the hot-runner plate 1112 is a universal hot-runner plate that is coupled directly to the manifold. For example, one or more fasteners may couple the hot-runner plate 1112 to the manifold 1140 shown in FIG. 17. Some conventional injection molding systems may, in contrast to the present disclosure, have separate hot-runner plates that each interfaces with a different cold-runner plate (or other plate that is not temperature conditioned) and that are connected and disconnected to the manifold or nozzles in each injection cycle. This aspect of the present disclosure includes a universal hot-runner plate that is mountable to the nozzles and that can interface with an array of different molds, each of which includes a different mold cavity, a different gate scheme, or any combination thereof. For example, the mold cavities may differ in volume and or shape as being used to mold parts of different sized shoes, and the gate scheme may differ by including different gate positions. In addition, the hot-runner plate 1112 is plumbed with all of the components used to control various aspects of the molding process, including the conditioned-fluid lines 170 and the gas conduit 176. Hot-runner plates are often associated with higher costs (e.g., added plumbing for temperature conditioning elements). Among other things, a universal hot-runner plate may reduce costs across multiple sets of molds, since only a single, common hot-runner plate may be used across the multiple sets, as opposed to having to make a hot-runner plate for each mold. In addition, it can reduce costs over time since there are fewer parts to store, maintain, repair, move, handle, etc. Although the figures of this present disclosure illustrate the hot-runner plates 1112 and 1114, which provide an interface between the injector nozzles 1138 and the first and second molds 1120 and 1122, in other aspects of this disclosure, universal cold-runner plates or other types of universal runner plates may provide the interface between the injector nozzles and the first and second molds 1120 and 1122.

Figure 17:
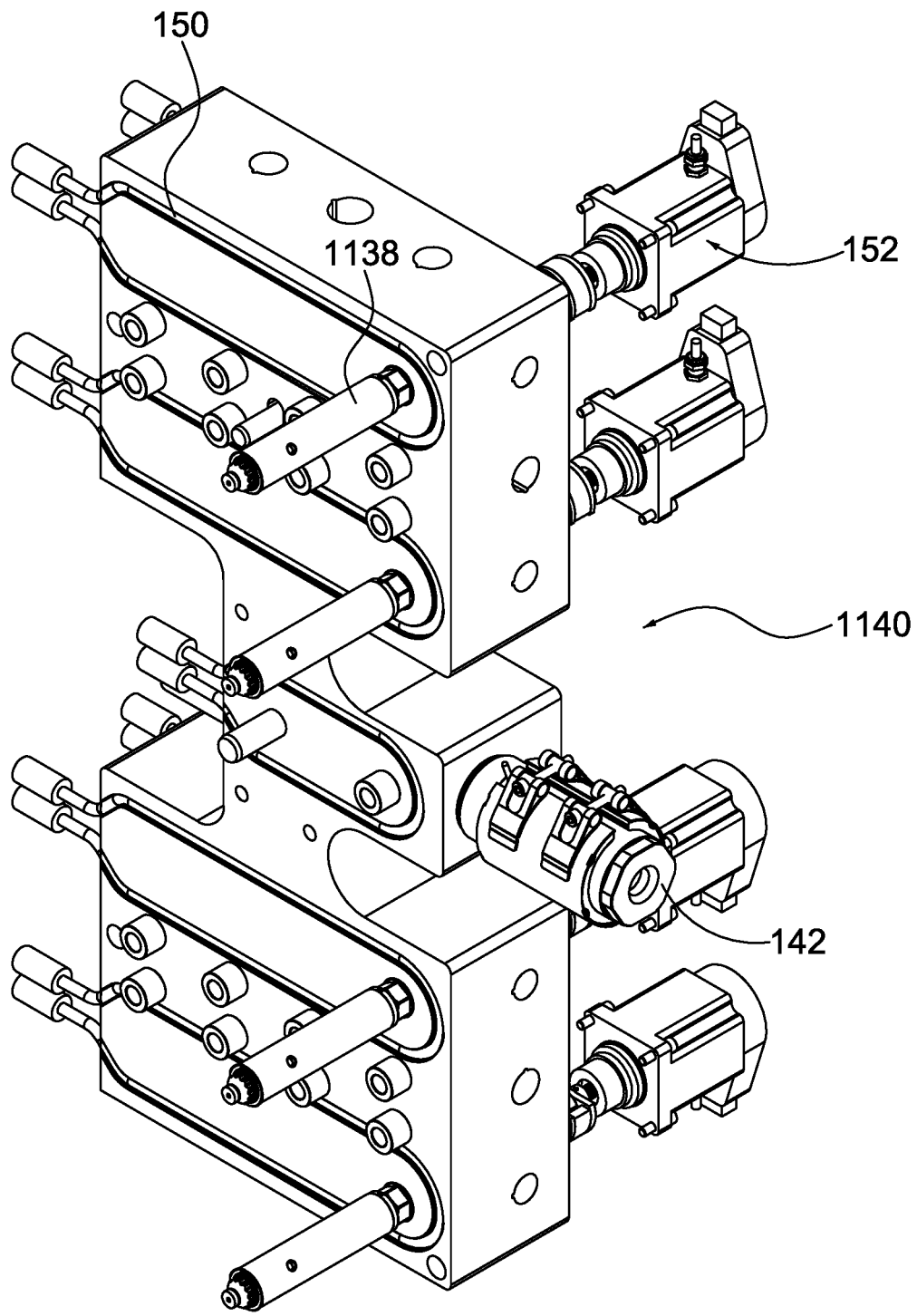
FIG. 17 depicts a manifold, in accordance with another aspect of the present disclosure.

Referring to FIG. 17, an example of a set of injection nozzles (e.g., 1138) is shown as part of an injection manifold 1140. That is, the injection manifold 1140 includes an injection port 142 that connects to an injector of an injection molding system. The injection manifold 1140 also includes a series of internal components (not shown) that receive a deposit/shot of thermoplastic elastomer composition from the injector and divides the shot into a number of deposits for separately distributing through the nozzles 1138. The injection manifold 1140 may also include one or more sensors (e.g., thermocouple) for monitoring conditions of the manifold (e.g., temperature, pressure, etc.) that may affect the thermoplastic elastomer composition, as well as a manifold temperature conditioning unit for maintaining, increasing, or decreasing a temperature of the manifold. For example, the manifold temperature conditioning unit may include conditioned-fluid lines 150 for holding and transporting coolant or heated conditioning fluid. As such, a state of the thermoplastic elastomer composition (e.g., single-phase solution) may be maintained while a deposit is distributed from each nozzle into the hot-runner plates 1112 and 1114. For example, the manifold 1140 may maintain the thermoplastic elastomer composition at conditions conducive to maintaining the foaming agent in a supercritical-fluid phase and to reducing the likelihood of transition to a gas. In a further aspect, the manifold includes an injector-pin assembly (e.g., 152) for each nozzle 1138, which may selectively insert a pin (or other obstruction) into a tip of each nozzle 1138 to impede a flow of material.

In a further aspect of the present disclosure, the nozzles 1138 are arranged to correspond to the number and placement of the nozzle receiving sleeves 1156. For example, in FIG. 17, there are four nozzles 1138, one for each nozzle receiving sleeve 1156. In one aspect of the present disclosure, each nozzle 1138 is configured to inject material into a single mold cavity having a three-dimensional shape of a footwear component (e.g., footwear sole). In one aspect, each nozzle 1138 and nozzle receiving sleeve 1156 are optimally positioned relative to the three-dimensional shape of the footwear component in a way that each shot foams and solidifies in a desired manner.

Figure 13:
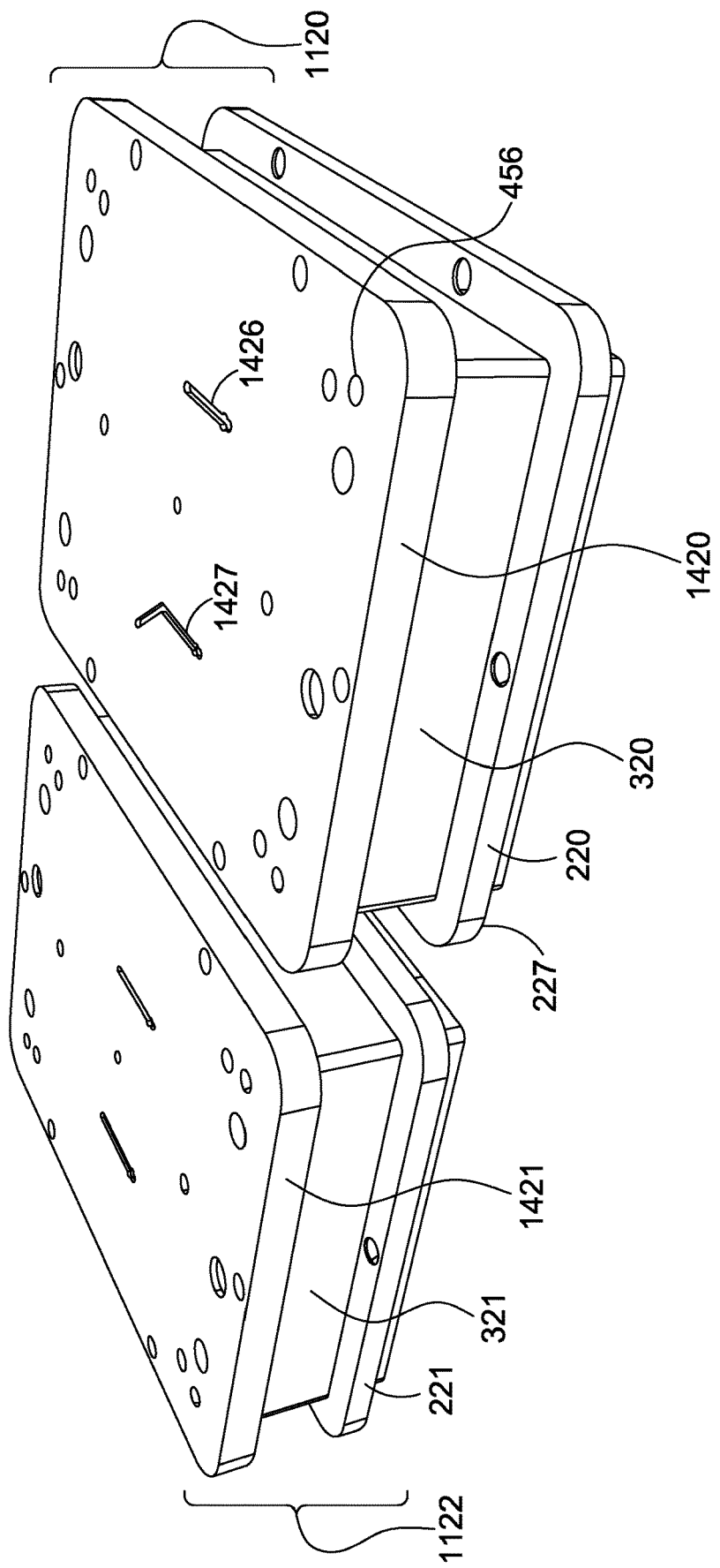
FIG. 13 depicts a pair of molds, in accordance with another aspect of the present disclosure.

The material exiting the hot-runner outlet 1134 leaves hot-runner plate 1112 or hot-runner plate 1114 and is deposited on and in a respective runner inlet 1426 or 1427 on second mold plate 1420 or second mold plate 1421 as seen in FIG. 13. FIG. 13 shows a one-to-one correspondence between the nozzle 1138, nozzle receiving sleeve 1156 and the runner inlet 1426 or 1427. In some aspects, there may be two or more nozzles 1138 for each runner inlet 1426 or runner inlet 1427. The following description details first mold 1120, but applies equally to second mold 1122. As best seen in FIGS. 19A, 19C and 20A-20C, the runner inlet 1426 (or runner inlet 1427) directs the material to a sprue 1437 that extends from a hole in the runner inlet 1426 or runner inlet 1427 to a gate outlet 1438. While runner inlet 1426 and runner inlet 1427 show two different runner inlet configurations, other runner inlet configurations are also possible, in other aspects, such as any of the configurations 426, 428, 430 and/or 432 shown in FIG. 8A. As seen in FIGS. 20A-20C, the geometry of sprue 1437 may vary. In some aspects, as shown in FIG. 20A, the sprue 1437 includes tapered walls, with a larger opening at runner inlet 1426 and tapering to a smaller gate outlet 1438. In one aspect, the sprue 1437 of FIG. 20A takes the form of a truncated cone. In other aspects, as shown in FIG. 20B, the sprue 1437 includes straight walls, such that the runner inlet 1426 is the same size as the gate outlet 1438. In one aspect, the sprue 1437 of FIG. 20B takes the form of a cylinder. In yet another aspect, as shown in FIG. 20C, the sprue 1437 may be formed with a constricted top portion and a wider bottom portion. As shown in FIG. 20C, the sprue 1437 may be formed with a runner inlet 1426 having a diameter X and a first section with straight walls. The sprue 1437 may then include a first outwardly-tapered section, with a taper at an angle A in a first tapered portion and may also include a second outwardly-tapered section with a taper at an angle B. In some aspects, the angle A is greater than the angle B, such that the first outwardly tapered section has a greater taper than the second outwardly tapered section. As shown in FIG. 20C, the sprue 1437 has a gate outlet 1438 that has a diameter Y that is greater than the diameter X of the runner inlet 1426, in some aspects. In some aspects, the diameter X is 2.5 mm and the diameter Y is between 8 mm and 12 mm. In some aspects, the angle A is 60 degrees and the angle B is 1.5 degrees. While three different configurations are shown and described for sprue 1437, other configurations are contemplated by, and within the scope of, this disclosure. As shown in FIG. 20D, the sprue 1437 may have an axis 1439. In some aspects, the axis 1439 is oriented perpendicularly to the surface of the mold ring cavity 328, such that the material leaving the gate outlet 1438 is deposited within the mold ring cavity 328 directly below the gate outlet 1438. In other aspects, as shown in FIG. 20D, the axis 1439 may be oriented at an angle (shown as angle D in FIG. 20D). In this aspect, the material leaving the gate outlet 1438 may be deposited on the surface of the mold ring cavity 328 in front of (when angled forwardly) or in back of (when angled rearwardly) the gate outlet 1438. Any of the sprue 1437 depicted in FIGS. 20A through 20C could have an axis 1439 that is angled forwardly or rearwardly. In some aspects, the angle D is between zero and forty-five degrees.

Figure 21A:
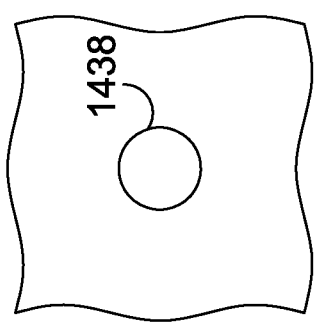
FIGS. 21A-21E depict aspects of various gate outlet geometries, in accordance with aspects of the present disclosure.
Figure 21B:
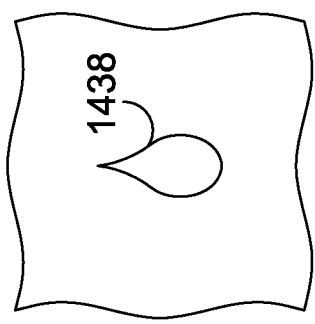
Figure 21C:
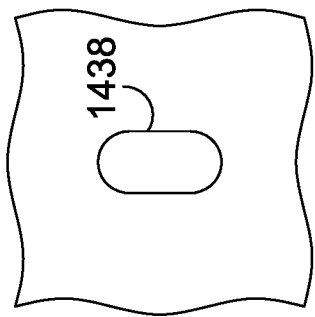
Figure 21D:
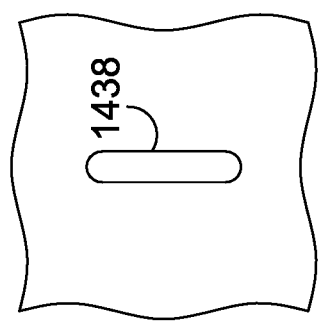
Figure 21E:
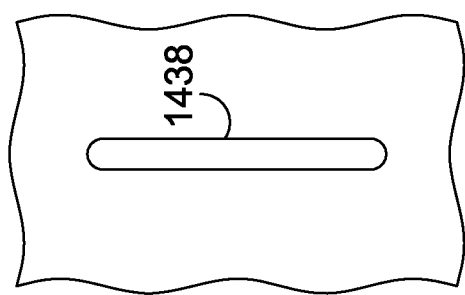

FIGS. 21A-21E show different geometries or configurations of the gate outlet 1438. As shown in FIG. 21A, gate outlet 1438 may be circular. In some aspects, the gate outlet 1438 in FIG. 21A may have a diameter of between 0.07 inches to 0.6 inches. In some aspects, the larger diameter circular gate outlet of FIG. 21A with a diameter of 0.5 inches produced a footwear component with desirable properties. Other geometric configurations of gate outlet 1438 may also be used, in some aspects. As additional examples, and without limitation, gate outlet 1438 could have a "carrot" or "tear-drop" shape, as shown in FIG. 21B; a "racetrack" shape as shown in FIG. 21C with two spaced-apart semi-circular ends; a narrow "fan" slit as shown in FIG. 21D; or an elongated slit or "spine" configuration as shown in FIG. 21E. In some aspects, the mold plate 1420 may be fitted with a removable gate outlet plate 1429, as shown in FIG. 20A, having the desired geometry for gate outlet 1438. In some aspects, the gate outlet 1438 may be changed in the second mold plate 1420 by changing the gate outlet plate 1429, allowing the shape of the gate outlet 1438 to change without requiring an entirely new second mold plate 1420.

Figure 19A:
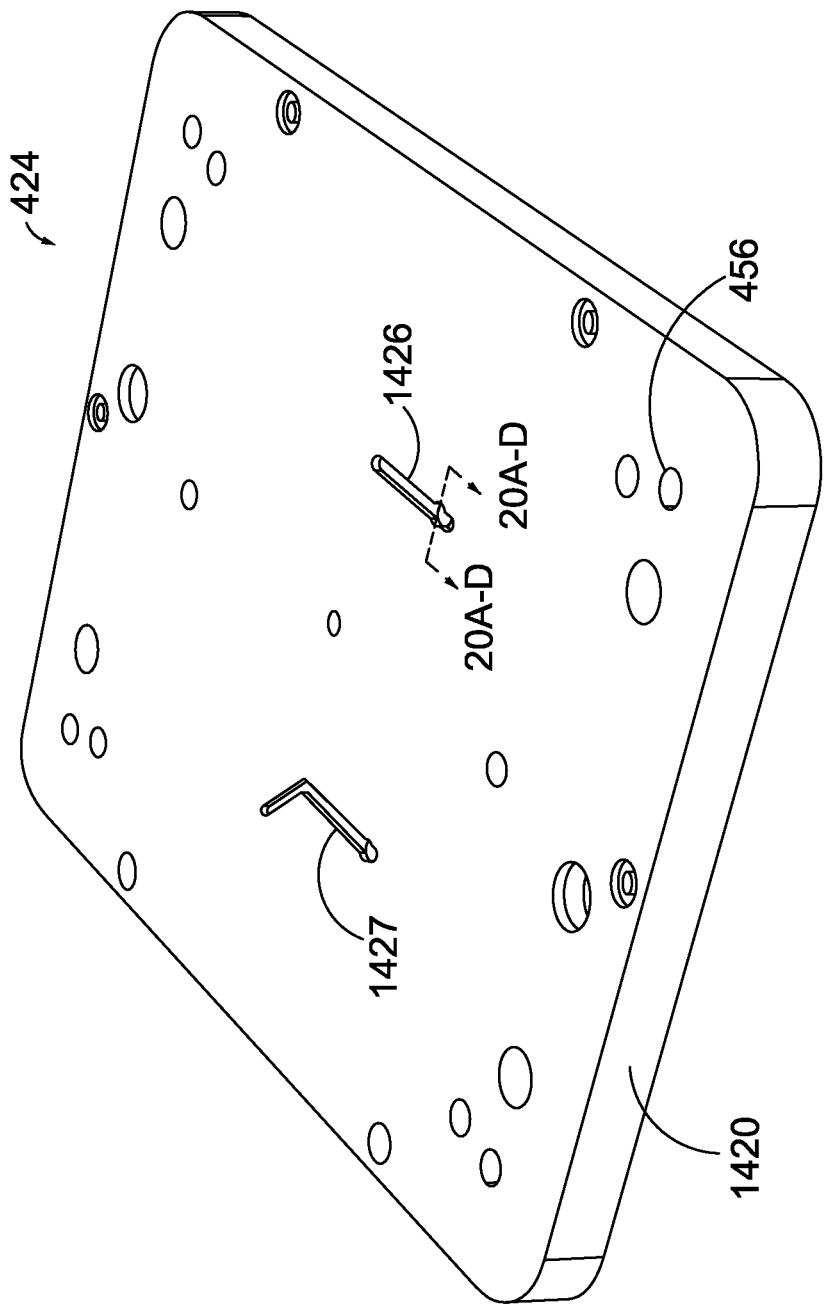
FIG. 19A depicts a second side of the second mold plate, in accordance with another aspect of the present disclosure.
Figure 19B:
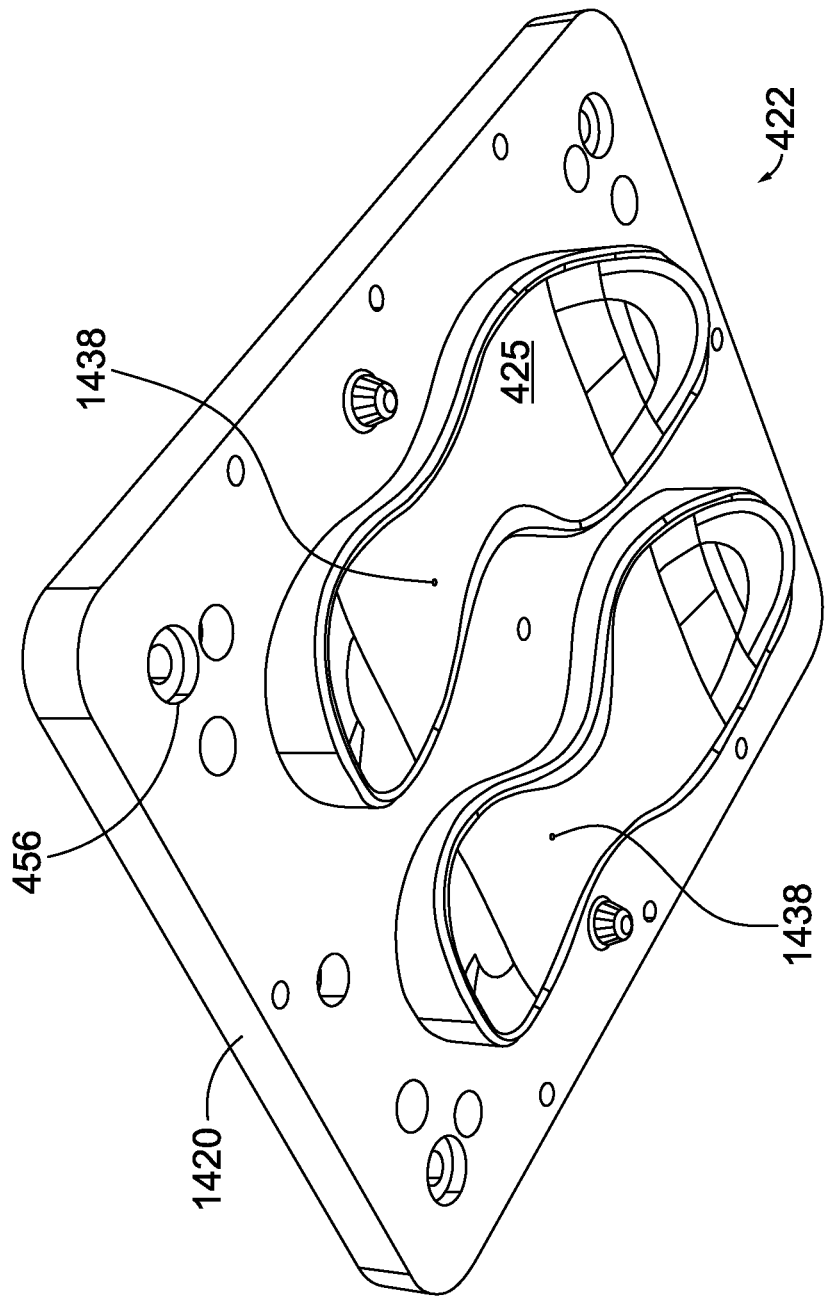
FIG. 19B depicts a first side of the second mold plate, in accordance with another aspect of the present disclosure.
Figure 19C:
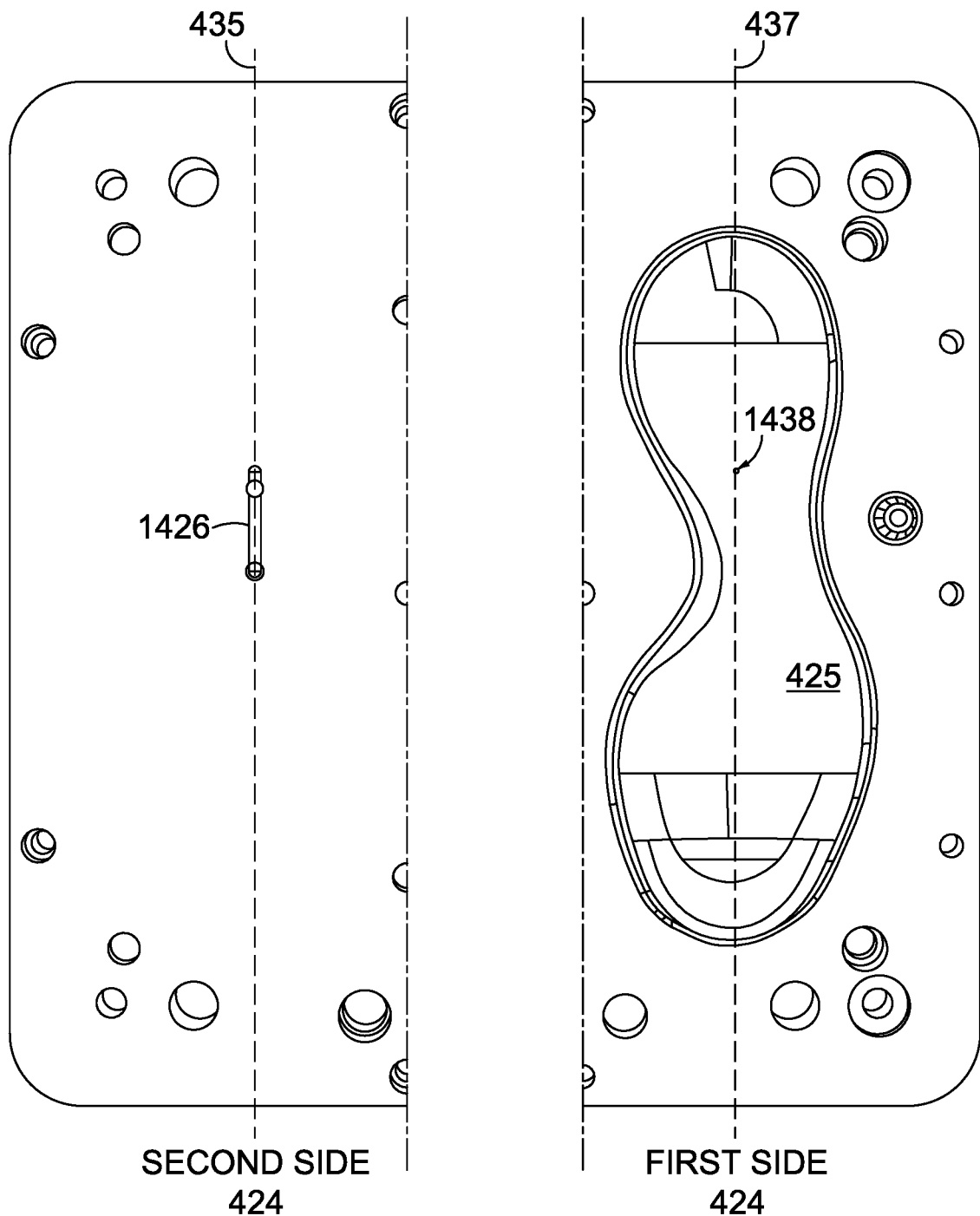
FIG. 19C depicts partial views of the first side and the second side of the second mold plate, in accordance with another aspect of the present disclosure.

The gate outlet 1438, in some aspects, is located just forward of the heel area of the footwear component (e.g. footwear sole), as best seen in FIG. 19B. It has been found that this location produces a foamed footwear component with desirable properties. In other aspects, the gate outlet 1438 could be located farther toward the heel area, and in some aspects, could be located in the forefoot or toe area.

In some aspects, the carrier plate 116 and carrier plate 118 and the tooling latch assembly 500 of the single gate system of FIGS. 12A-21E have similar features as described above with respect to FIGS. 1A-11D, and are not repeated here. Similarly, the features of the first mold plate 220 and the mold ring plate 320 are common between the multiple gate system of FIGS. 1A-11D and the single gate system of FIGS. 12A-21E, and are not repeated here.

In some aspects, the single gate system and method described above with respect to FIGS. 12A-21E offers advantages over the multiple-gate system of FIGS. 1A-11D. It has been found that the single gate system results in less waste associated with the runners, because there are fewer of them. Additionally, the single gate system produces parts with fewer gate "vestiges" (the small indicator left at each gate outlet) because the single gate system has only one gate outlet 1438 per mold cavity (as compared to six gate vestiges associated with the multiple gate system described with reference to FIGS. 1A-11D). Because the single gate system uses only one "shot" of material per mold cavity, in some aspects, the expanding foam of the single "shot" may take longer to expand and fill the mold cavity. The single gate system also avoids any issues associated with material flow and/or any issues associated with material boundaries between different regions of the article of footwear. For example, after shots of thermoplastic elastomer composition (e.g., single-phase solution or other composition having a foaming agent) enter the mold cavity of FIG. 4, through gate outlets 434, 436, 438, 440, 442 and 444, the expanding foam from the regions around each gate outlet expands, forming material boundaries. In the single gate system described above with reference to FIGS. 12A-21E, no such material boundaries exist. It has also been found, in some aspects, that a part with lower overall weight is achievable (for example, a men's size 10 midsole with a part weight of 112 grams), and part variability is lower with the single gate system, with a resultant foam that is more consistent with fewer large "voids" or bubbles in the foamed footwear sole, along with an energy efficiency of between about 65 percent and 80 percent.

Recyclate

Figure 22:
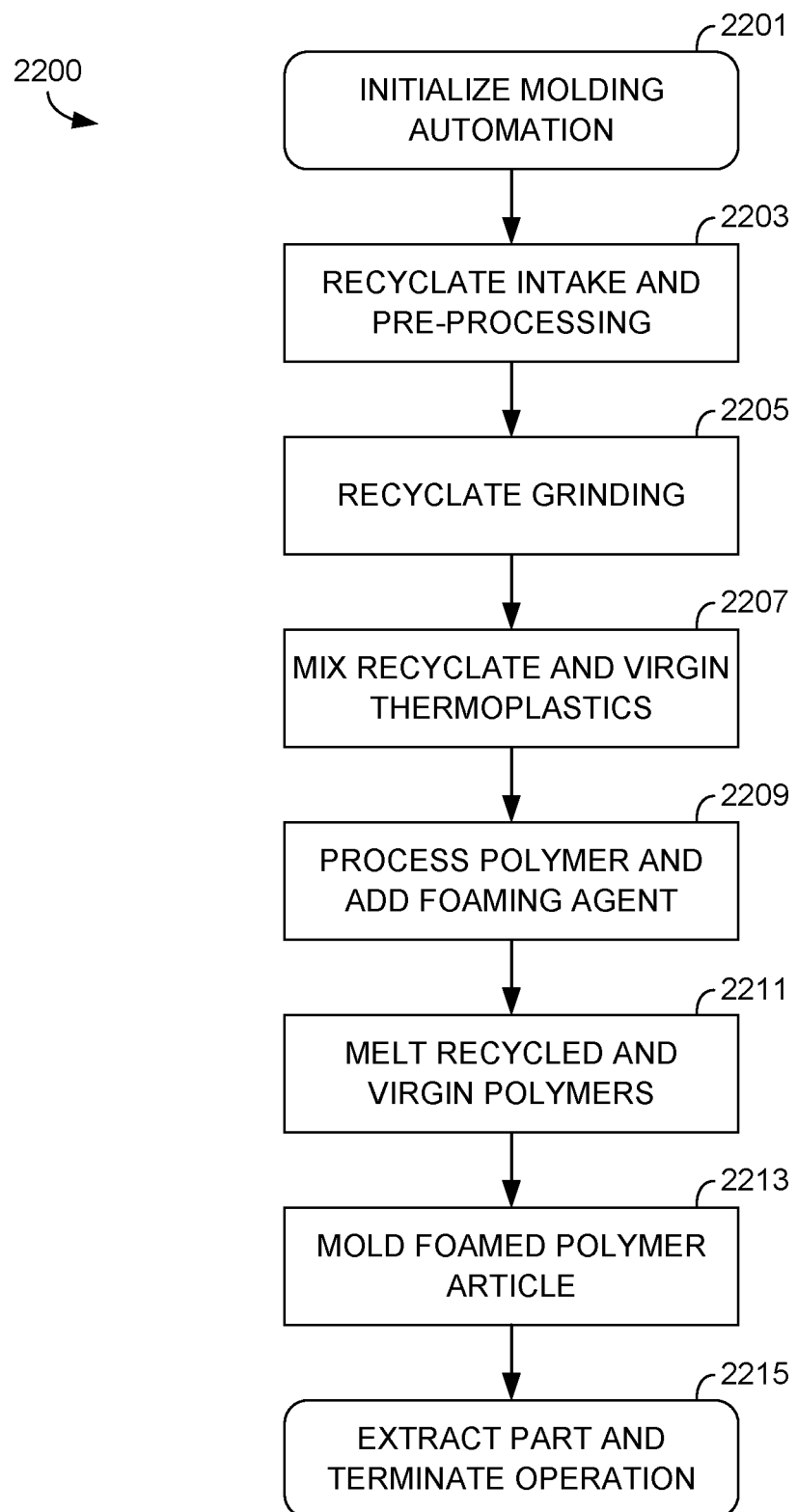
FIG. 22 depicts a flowchart illustrating a representative workflow process for manufacturing a foamed polymer article, such as a segment of an article of footwear, from virgin and recycled thermoplastic copolyester elastomer, which may correspond to memory-stored instructions executed by a manufacturing system controller, control-logic circuitry, programmable electronic control unit, or other integrated circuit (IC) device or a network of IC devices in accord with aspects of the disclosed concepts.

With reference next to the flowchart of FIG. 22, an improved method or control strategy for manufacturing a foamed polymer article, using a tooling assembly, such as tooling assembly 110 of FIG. 1A, is generally described at 2200 in accordance with aspects of the present disclosure. Some or all of the operations illustrated in FIG. 22 and described in further detail below may be representative of an algorithm that corresponds to processor-executable instructions that may be stored, for example, in main or auxiliary or remote memory, and executed, for example, by a local or remote controller, processing unit, control logic circuit, or other module or device or network of devices, to perform any or all of the above or below described functions associated with the disclosed concepts. One or more of the illustrated operations may be performed manually or assisted manually by an onsite technician. It should be recognized that the order of execution of the illustrated operation blocks may be changed, additional blocks may be added, and some of the blocks described may be modified, combined, or eliminated.

Method 2200 of FIG. 22 is initialized at block 2201, e.g., responsive to input of an activation command signal received from a human machine interface (HMI) of a central control terminal. Initial stages of the manufacturing process may comprise supplying, accessing, and/or utilizing (collectively "receiving") the various materials, tools, and machines needed to manufacture foamed polymer articles. At process block 2203, for example, a batch of recycled plastic material is accessed from an available store of polymer recyclate. As used herein, the term "recycled plastic" may encompass used or excess or scrapped plastic that is put into a recycling stream, including wholesale recycling of entire products, disassembly of products and recycling only selected parts thereof, recycling of manufacturing byproduct, all of which may require sorting and cleaning of any collected materials. For at least some embodiments, scrap and waste thermoplastic polyester elastomer (TPE-E) composition may be recovered (e.g., reclaimed from foamed or unfoamed virgin TPE-E material and/or virgin TPE-E compositions), and then incorporated into foamed articles produced with at least some virgin TPE-E and/or virgin TPE-E compositions. The recycled TPE-E and/or virgin TPE-E compositions may be derived from one or more reactants, such as a poly(alkylene oxide)diol material and/or an aromatic dicarboxylic acid material. The recycled thermoplastic polyester elastomer and/or virgin TPE-E compositions may have a weight average molecular weight ranging from about 50,000 Daltons to about 200,000 Daltons.

Once the batch of recycled plastic is received and any attendant sorting, cleaning, and other pre-processing is complete at process block 2203, the method 2200 shreds, chops, cuts, and/or grinds (collectively "grind") the batch of recycled plastic at process block 2205. By way of non-limiting example, a dedicated recycling station may be responsible for grinding recycled TPE-E into granular or pelletized form; ground recycled material may be produced in real-time or stored in inventory and reused when desired. Alternatively, "grinding" may comprise feeding a hot compound of recyclate into an extruder fitted with a perforated die; a cutter immediately in front of the die slices extruded strings of compound into granulized pellets. Cut pellets are then cooled as they are transported to a sieve grader to separate out irregularly sized pellets. A "regrind" thermoplastic polymer and/or virgin TPE-E composition may originate from re-extruded material, such as unfoamed, mold-runner derived TPE-E and/or virgin TPE-E composition waste that is put through an extruder, pelletized, and turned back into resin. Regrind may also originate from injected foam material, such as virgin TPE-E and/or virgin TPE-E composition resin that is injected and foamed during normal processing, scrapped, then shredded and re-introduced as regrind. The ground recyclate material may have an irregular shape with a major length size of about 1-10 mm, and the virgin polymer material has a pellet size of about 1-10 mm.

At process block 2207, the ground recycled material is mixed with a composition of virgin polymer material. As used herein, the terms "mixing" and "blending" may be used interchangeably and synonymously to mean to combine or intermingle, where the resultant mixed batch may or may not be homogenous throughout the mixture. A recycled material may be contrasted with a virgin material in that a raw "virgin" material has neither been injected into a mold assembly nor expanded through activation of an intermixed foaming agent and formed into an end product. The virgin polymer composition may be the same or similar general polymer composition as the recyclate or, alternatively, may be a distinguishable polymer composition from the recyclate. To properly calibrate the operating parameters of the injection molding system and control the functional properties of the resultant foamed polymer article, a metered amount of the ground recyclate material is mixed with a predetermined amount of virgin polymer material to form a mixed batch of virgin and recycled material. In at least some implementations, the metered amount is limited to about 20% by mass or less of a total mass of the mixed batch. It may be desirable, depending on an intended application, that about 10 to about 50 parts of recycled TPE-E composition per about 80 to about 100 parts virgin TPE-E composition be incorporated into newly foamed TPE-E articles by the methods described herein.

With continuing reference to FIG. 22, method 2200 continues to process block 2209 with instructions to treat the recycled material, either before, during, or after admixture with the virgin material. Processing the recyclate may include the addition of blowing/foaming agents, fillers, pigments, and/or processing aids. In at least some implementations, a foaming agent is incorporated as a separate ingredient into the mixture of recycled and virgin polymer material for invoking the expansion of the mixture during molding. The foaming agent may comprise a suitable stimulant that, alone or in combination with other substances, is capable of producing a cellular structure in a plastic. Foaming agents may include fluids that expand when pressure is released.

It may be desirable, for at least some applications, to add a physical foaming agent to the mixture of recycled and virgin material during the melting of the mixture or after the mixture has melted. When injection molding a midsole cushioning element with the injection molding system described above with respect to FIG. 1A through FIG. 21E, it may be desirable to inject a physical foaming agent into the polymer melt composition while the polymer melt composition is contained in one or more of the injection barrels inside of the hot-runner plates 112 and 114 or the hot-runner plates 1112 and 1114. The physical foaming agent may be composed of one or more supercritical fluids (SCF), such as supercritical nitrogen or carbon dioxide, which is/are dissolved into the polymer melt composition under pressure to form a single-phase solution (SPS). As a further option, the method 2200 may be characterized by a lack of a chemical foaming agent for the forming of the foamed polymer article. SCF concentration may be dictated by, among other things, a desired solubility and a desired density. For some embodiments, a chemical blowing agent may be utilized in addition to, or as a substitute for, the physical foaming agent.

Numerous other additives may be incorporated into the recyclate batch prior to introduction into the final mold for forming the foamed polymer article, including fillers, activators, homogenizing agents, pigments, fire retardants, lubricants, and other suitable additives. Non-limiting examples of filler materials include talcum powder, mica silicate, bearing sulfate, magnesium hydroxide, magnesium carbonate, magnesium silicate, calcium carbonate, and other commercially available fillers. The polymer compositions can also contain rubber fillers, such as ethylene propylene rubber (EPR), styrene isoprene styrene (SIS) copolymer rubber, styrene butadiene rubber, as well as other polyolefin resins, in addition to ethylene-vinyl acetate (EVA) or TPE-based materials. In other examples, polyethylene wax may be used as a processing agent, stearic acid may be used as a lubricant, dicumyl peroxide may be used as a polymerization initiator, zinc oxide may be used as an activator for the foaming agent, while titanium dioxide may be used as a white pigment or carbon black may be used as a black pigment.

Process block 2211 of FIG. 22 includes memory-stored, processor-executable instructions to melt the ground recyclate material and the virgin polymer material into a polymer melt composition. It should be appreciated that the ground recyclate and virgin polymer materials may be separately melted and then flowed into a mixed polymer melt composition. Otherwise, the mixed batch of recyclate and virgin polymer materials produced at process block 2207 may be heated into the polymer melt composition. For at least some embodiments, the mixture of ground recyclate and virgin polymer materials has a set point temperature ranging from about 190° C. to about 215° C. Moreover, the mixed batch of the ground recyclate material and the virgin polymer material may have an average peak crystallization temperature ranging from about 135° C. to about 165° C.

Once the polymer composition is complete and ready for molding, the processed recycled and virgin material is pressurized and injected—colloquially "shot"—into the internal cavity or cavities of a mold assembly to form the foamed polymer article, as indicated at process block 2213. After the SCF is injected into the polymer melt composition contained in the barrel(s) of hot-runner plates 112 and 114 of FIG. 1A, for example, where the SCF dissolves in the melt to form a molten SPS, the molten SPS is flowed into the internal mold cavities of the first mold 120 and the second mold 122. The SCF is employed as a physical blowing agent to expand the melted TPE-E composition and thereby fill the mold cavities. The pressure within the mold cavities is reduced or eliminated to release the SCF from the SPS, and the expanded melt is allowed to cool and solidify. To provide a "closed loop" molding system with circular sustainability that eliminates most if not all manufacturing scrap and waste, the mass of recycled thermoplastic resin within the internal mold cavities may be greater than or equal to a mass of the mixed thermoplastic resin within any filling portions fluidly coupled to the cavities.

To ensure the integrity and desired performance characteristics of the resultant foamed polymer article, one or more operating parameters of the injection molding system may be modulated to accommodate the percent mass of recyclate being incorporated into the polymer mixes. For instance, the injection molding system may be set to a molding melt temperature of between about 210° C. and about 215° C. with a batch melt temperature of approximately 190° C. and a crystallization temperature of approximately 147° C. In addition to the selective control of mold temperatures, gas counter-pressure release rates and hold times may be recalibrated to a TPE-E polymer melt composition with approximately 20% by mass recycled TPE-E composition, e.g., to regulate cooling rates within the mold cavities (e.g., higher pressure drop provides faster cooling rate with less cooling time). System operating parameters may be selectively modified to ensure that the polymer melt composition stays within a pre-calculated melt temp-crystallization temp sweet spot for a selected timeframe within the processing cycle.

The foamed polymer article is ejected from the internal mold cavity at process block 2215. For at least some embodiments, the formed foamed polymer article has a cell size average, e.g., by volume of a longest cell dimension, of less than about 0.68 mm or, in some embodiments, about 0.18 mm to about 0.58 mm. For at least some implementations, the foamed polymer article may exhibit some and/or all of the following characteristics: (1) an energy efficiency of about 55% to about 95% or, in some preferred configurations, a target efficiency of 70% to 85%; (2) an energy return of about 1000 millijoules (mJ) to about 7000 mJ or, in some preferred configurations, a target return of 4500 mJ to 5500 mJ (e.g., assuming a standard midsole geometry); and/or (3) a density of about 0.15 grams/cubic centimeter (g/cc) to about 0.25 g/cc or, in some preferred configurations, a target density of 0.18 g/cc to 0.20 g/cc.

As yet a further option, a formed foamed polymer article may exhibit a ratio of energy efficiency to energy intensity (EE/EI) that is greater than about 1.125 or, for some embodiments, greater than about 1.35 or, for some desired embodiments, greater than about 1.5 or, optionally, between about 1.6 and 2.1. Likewise, a formed foamed polymer article may exhibit a ratio of energy efficiency to the product of energy intensity and density (EE/(EI*$\rho$)) that is greater than about 5.25 or, for some embodiments, greater than about 6.3 or, for some desired embodiments, greater than about 7.0 or, optionally, between about 8.8 and 11.2. Moreover, a formed foamed polymer article may exhibit a ratio of energy return to energy intensity (ER/EI) that is greater than about 6,375 or, for some embodiments, greater than about 7,650 or, for some desired embodiments, greater than about 8,500 or, optionally, between about 9,900 and 11,300. A formed foamed polymer article may exhibit a ratio of energy return to the product of energy intensity and density (ER/(EI*$\rho$)) that is greater than about 33,750 or, for some embodiments, greater than about 40,500 or, for some desired embodiments, greater than about 45,000 or, optionally, between about 55,400 and 62,500.

As used herein, the term "energy intensity" may be defined to include a measure of the energy used in forming a particular foam article, for example, in kilowatt hours (kW-h). To obtain the energy intensity of a foam article, the energy expended to produce a run, or batch, of articles, such as pairs of footwear midsoles, is first calculated, determined or measured (e.g., from pellet to finished component). For a physical foaming process, the measured energy may include the energy required for all energy consuming steps, such as: preheating the molds and hot runners (if utilized), melting the pellets, generating gas counter-pressure, injecting the molten plastic, introducing the supercritical fluid, cooling the molds and/or work-pieces, and ejecting the work-pieces from the mold. The overall energy required to produce the run of cushioning element pairs is then divided by the number of cushioning element pairs produced in the run.

For at least some embodiments, a foamed polymer sole component fabricated from both recyclate and virgin thermoplastic materials may have an energy return measurement that is within a predefined tolerance of an energy return measurement of a comparable shoe sole component formed solely from virgin thermoplastic materials. This predefined tolerance may be about 75% to about 99% of the energy return measurement of the comparable shoe sole component. The foamed sole component and the comparable shoe sole component may share a comparable shape, size, and/or method of molding. At this juncture, the method 2200 may terminate or may loop back to block 2201 and run in a repeatable or continuous loop.

It is envisioned that disclosed manufacturing systems and processes may utilize any logically relevant source of recycled plastic material in order to conserve natural resources, minimize use of raw materials, and divert waste from landfills with the aspiration of reaching a "circular economy". In this regard, aspects of this disclosure are directed to "closed-loop" manufacturing processes that limit usable recyclate sources to manufacturing byproducts (e.g., gate or runner trimmings) and reground defective articles (e.g., visually or mechanically flawed foamed polymer footwear sole elements). Implementing such "closed-loop" manufacturing processes may desirably optimize material use efficiencies by achieving, for example, a zero-waste or near-zero-waste of polymer materials in the manufacture of foamed polymer articles.

As an extension of, a modification to, or a standalone process from the method 2200 of FIG. 22, a method of producing foamed polymer articles may be composed of a series of controlled manufacturing steps, including executing one or more production runs to form one or more types of foamed polymer articles. A "production run" may be typified by a predefined number of articles (e.g., 220-260 articles/hr) of a designated design/model (e.g., NIKE® REACT FLYKNIT™) having a preset shape, size and material composition (e.g., single-piece TPE-E midsole for women's size 7 running shoe) produced substantially contiguously by a particular production line. Individual runs may exhibit different quantifiable production variables, including: an average article mass $m_{AA}$ of the foamed polymer articles (e.g., average total mass of all articles per run or average individual article mass or all articles per run), and an average article defect rate $\dot{D}_A$ (e.g., ratio of total defective articles to total articles produced per run). Because the process may produce multiple envelopes of products, e.g., distinguishable from each other in quantity and geometry, the tooling for each geometry may consume a distinct volume of raw materials and generate a distinct volume of manufacturing byproduct.

As will be explained in further detail below, a production line may generate a baseline average byproduct value (e.g., unfoamed byproduct generated upstream of tooling and/or foamed byproduct generated downstream of tooling). For a particular production run, an average byproduct mass amount may be calculated as the sum of: (1) an amount of byproduct generated for each geometry produced in a run divided by the quantity of each geometry in the run; and (2) a remnant upstream byproduct mass per run. By way of non-limiting example, a run size for a production run may include 100 total articles, including twenty of a first geometry, twenty of a second geometry, and sixty of a third geometry. In this instance, byproduct mass may be calculated as: (total byproduct mass for first geometry)/20+(total byproduct mass fir second geometry)/20+(total byproduct mass for third geometry)/60+upstream and/or downstream byproduct mass.

For at least some implementations, a production run may be limited to a single run for fabricating a preset number of a singular article design having a predefined shape and size. Alternatively, a mass production run may include multiple batch runs of different types of polymer articles, with each type having a respective shape and size. These batch production runs may be performed simultaneously or sequentially, with each run producing the same number of articles or a distinct number of articles. When carrying out multiple batch runs as part of a larger mass production run, the average article mass $m_{AA}$ for the mass run may be calculated as the arithmetic sum of the individual average article masses for all of the discrete runs, namely: $m_{AA-1} + m_{AA-2} + \ldots + m_{AA-n}$. Likewise, the average article defect rate $\dot{D}_A$ for the mass run may be calculated as the arithmetic mean of the individual average article defect rates for all of the discrete batch runs, namely: $(\dot{D}_{A-1} + \dot{D}_{A-2} + \ldots + \dot{D}_{A-n})/n$.

After completing a single production run or a group of discretized batch runs of foamed polymer articles, the method may include reclaiming and recycling one or more batches of manufacturing byproduct incidental to the run or runs. Recyclate byproduct material may be recovered from sections of the molding system upstream from the mold tool (e.g., from hot-runner or cold runner plates), downstream from the mold tool (e.g., mold flash and trimmings), and/or from within the mold tool itself (e.g., inlet and outlet gates to the mold-ring cavities). In this example, the manufacturing byproduct may have an average byproduct mass $m_{AB}$ (e.g., average total byproduct mass per run or average byproduct mass per article per run). When carrying out multiple batch runs, the average byproduct mass for the entire mass production run may be calculated as the arithmetic sum of the individual average byproduct masses, namely: $m_{AB-1} + m_{AB-2} + \ldots + m_{AB-n}$. Alternatively, the average byproduct mass may be calculated as the arithmetic sum of: (1) a first byproduct mass incidental to a first batch run divided by a first number of first polymer articles in that run; (2) a second byproduct mass incidental to a second batch run divided by a second number of second polymer articles in that run; ... and (n) an $n^{th}$ byproduct mass incidental to an $n^{th}$ batch run divided by an $n^{th}$ number of polymer articles in that run.

Prior to, contemporaneous with, or after retrieving the batch of manufacturing byproducts, the method may also include reclaiming and recycling one or more lots of defective articles incidental to the production run(s). In accord with the abovementioned footwear example, recycled defect material may be recovered from pre-consumer footwear and, if desired, from post-consumer footwear. For pre-consumer products, a defective foamed article may be identified through any commercially available technique for identifying manufacturing defects. For instance, the injection molding system may incorporate a system-automated visual inspection station and a system-automated mechanical testing station downstream from the tooling assembly of FIG. 1A through FIG. 21E. The visual inspection station may utilize a high-definition digital camera and a machine-learning algorithm to search for and flag any of a multitude of predefined visual defects (e.g., dimensional flaws, superficial blemishes, contour defects, etc.). Moreover, the mechanical testing station may be in the nature of an impact-testing machine with a linear force transducer operatively coupled to a motor-driven, last-shaped plunger. The plunger and transducer collectively measure each foam article's stiffness, energy efficiency, energy return, etc., and flag the article as defective if any of these measurements fall outside of corresponding manufacturing tolerance ranges.

Continuing the discussion of pre-consumer defective products, there will be an associated average defect mass $m_{AD}$ (per run) in the manufacturing system. This average defect mass $m_{AD}$ may be calculated as the arithmetic product of the article defect rate $\dot{D}_A$ and the average article mass $m_{AA}$, or $m_{AD} = \dot{D}_A * m_{AA}$. For implementations that execute multiple batch runs as part of a larger mass production run, the average defect mass $m_{AD}$ may be the arithmetic mean of the individual average defect masses incidental to the various production runs, namely: $(m_{AD-1} + m_{AD-2} + \ldots + m_{AD-n})/n$. To achieve a "closed-loop" manufacturing process, the system may be restricted as follows:

$$(m_{AB} + m_{AD})/m_{AA} \leq 0.2$$

During a closed-loop manufacturing process, foam polymer waste—the manufacturing byproducts and defective articles—may be added directly into the injection barrel for subsequent injection into the mold tool cavity. The foam polymer waste may be crushed or shredded, mixed with virgin pellets, and fed together into the same injection barrel. In this instance, a power-screw type "crammer" feeder may be used to force the waste material back into the tooling assembly. Prior to re-feeding the material, the foam polymer waste may be shredded at least once or, in at least some applications, two or more times to ensure that the discretized waste elements are generally uniform in shape and size. If it determined that the foam polymer waste cannot be added directly to the injection barrel, the foam waste may need to be processed, melted down, and re-pelletized. In this case, the waste material would be shredded a single time or multiple times, fed into a separate extrusion line where it is melted and extruded, and thereafter pelletized to form pellets akin in geometry and density to virgin pellets. These "new" waste material pellets may then be combined with virgin pellets in the injection barrel.

An injection molding system's operating parameters will potentially change depending on the type and volume of recyclate being used to form the foamed polymer articles. For instance, the melt temperatures will likely be modified to successfully process recycled material: when foamed, the recyclate material's crystallization temperature may increase (i.e., crystallization temperature gets closer to the melt temperature). As such, the melt composition may need to be processed at higher temperatures compared to processing temperatures that would typically be used for pure virgin material. For at least some footwear midsole embodiments, the production variables per run may be based on the following parameters: about 0.2 kg/pair, about two pair (four midsoles)/minute, eight hour shift, about 10% to about 15% runner waste relative to midsole weight per pair.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a solid-state memory, a CD-ROM, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

From the foregoing, it will be seen that this subject matter is well adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible embodiments may be made of the subject matter without departing from the scope of this disclosure, it is to be understood that all matter herein set forth or shown in the accompanying drawings is to be interpreted as illustrative and not in a limiting sense.

The invention claimed is:

1. A mold assembly for injection molding a component of an article of footwear, the mold assembly comprising:
   a first carrier plate;
   a first mold plate coupled to the first carrier plate and comprising:
      a first mold cavity wall; and
      a mold core comprising a mold core perimeter wall;
   a mold ring plate abutting the first mold plate and comprising a mold ring plate perimeter wall and a second mold cavity wall;
   a second mold plate abutting the mold ring plate and comprising a third mold cavity wall; and
   a second carrier plate coupled to the second mold plate;
   wherein the first mold cavity wall, the second mold cavity wall, and the third mold cavity wall define a mold cavity, and the mold core perimeter wall and the mold ring plate perimeter wall define an at least partially enclosed space separate from the mold cavity.

2. The mold assembly of claim 1, wherein at least one of the first carrier plate and the second carrier plate compositionally comprises steel, and wherein the at least one of the first carrier plate and the second carrier plate compositionally comprising steel also comprises a plate-manipulator interface to releasably engage a plate manipulator.

3. The mold assembly of claim 2, wherein the plate manipulator further comprises a protrusion, and wherein the plate-manipulator interface of the at least one of the first carrier plate and the second carrier plate comprises a recess to receive the protrusion of the plate manipulator.

4. The mold assembly of claim 1 further comprising, a tooling latch assembly that is selectively convertible back and forth between a connected state and a disconnected state and that is coupled to the first carrying plate, the second carrying plate, or any combination thereof, wherein in a connected state the releasable latch connects the first carrying plate to the second carrying plate, such that the releasable latch impedes the second carrying plate from moving away from the first carrying plate, and wherein in a disconnected state the second carrying plate is free to move away from the first carrying plate.

5. The mold assembly of claim 1 further comprising, a seal assembly positioned between the first mold plate and the mold ring plate.

6. The mold assembly of claim 1 further comprising, a seal assembly positioned between the ring mold plate and the second mold plate.

7. The mold assembly of claim 1, wherein the second mold plate includes a plurality of gates having a gate outlet in the third mold cavity wall.

8. The mold assembly of claim 7, wherein the plurality of gate outlets are spaced a distance from the first mold cavity wall in a range of about 16 millimeters to about 40 millimeters.

9. The mold assembly of claim 1, wherein the second mold plate includes a single gate having a single gate outlet in the third mold cavity wall.

10. The mold assembly of claim 1, wherein the second mold plate includes a side facing away from the mold ring plate and a plate body between the side and the third mold cavity wall; and wherein the second mold plate includes one or more runners having a runner inlet in the side facing away from the mold ring plate.

11. The mold assembly of claim 10, wherein the second mold plate includes fewer runner inlets than gates.

12. The mold assembly of claim 10, wherein each runner of the one or more runners is in fluid connection with one or more gates.

13. The mold assembly of claim 1, wherein the mold ring plate includes a first pin-receiving aperture having a threaded interior wall and the second mold plate includes a second pin-receiving aperture aligned with the first pin-receiving aperture, the second pin-receiving aperture extending entirely though a thickness of the second mold plate; and wherein the mold assembly includes a threaded fastener with a set of threads at one end engaged with the threaded interior wall, a head at the other end, and a fastener body that extends between the set of threads and the head and that includes a length larger than the thickness of the second mold plate.

14. The mold assembly of claim 1, wherein the first mold plate, the mold ring plate, and the second mold plate comprise a first mold; and wherein the mold assembly further comprises a second mold comprising a third mold plate, another mold ring plate, and a fourth mold plate, the second mold being coupled to the first carrier plate and the second carrier plate.

15. The mold assembly of claim 14, wherein the first mold comprises a first mold cavity enclosed by the first mold cavity wall, the second mold cavity wall, and the third mold cavity wall; wherein the first mold comprises a second mold cavity; and wherein the second mold comprises a third mold cavity and a fourth mold cavity.

16. The mold assembly of claim 15, wherein the first mold cavity, the second mold cavity, the third mold cavity, and the fourth mold cavity each comprise a respective three-dimensional (3D) shape of a footwear sole, and wherein the respective 3D shape of the first mold cavity and the third mold cavity comprises a left footwear sole and the respective 3D shape of the second mold cavity and the fourth mold cavity comprises a right footwear sole.

17. A mold assembly for injection molding a component of an article of footwear, the mold assembly comprising: a first mold plate comprising a first mold cavity wall and a mold core comprising a mold core perimeter wall; a mold ring plate abutting the first mold plate and comprising a second mold cavity wall and a mold ring plate perimeter wall; and a second mold plate abutting the mold ring plate and comprising a third mold cavity wall, wherein the second mold plate comprises a first side facing towards the mold ring plate, a second side facing away from the mold ring plate, and a plate body between the first side and the second side; and wherein the second mold plate comprises one or more runner inlets on the second side and one or more gate outlets in the third mold cavity wall; and wherein the mold core perimeter wall and the mold ring plate perimeter wall define an at least partially enclosed space.

18. The mold assembly of claim 17, wherein the second mold plate includes a first gas channel extending entirely through the plate body from the first side to the second side; wherein the mold ring plate includes a second gas channel extending entirely through a plate body of the mold ring plate; wherein the mold assembly includes a vent positioned between the mold ring plate and the first mold plate; and wherein the second gas channel fluidly connects with the first fluid passage and fluidly connects with the vent.

19. The mold assembly of claim 17, wherein the mold assembly comprises a mold cavity enclosed by the first mold cavity wall, the second mold cavity wall, and the third mold cavity wall; wherein the mold cavity comprises a 3D shape of a footwear sole; and wherein a vent is positioned at least partially around a perimeter of the mold cavity.

20. The mold assembly of claim 17, wherein the mold assembly comprises a mold cavity enclosed by the first mold cavity wall, the second mold cavity wall, and the third mold cavity wall; wherein the mold cavity comprises a 3D shape of a footwear sole; wherein the one or more gate outlets comprises a single gate outlet that is in the third mold cavity wall and that is in fluid communication with the four runner inlets.

\* \* \* \* \*